(12) United States Patent
Ying et al.

(10) Patent No.: US 12,133,235 B2
(45) Date of Patent: Oct. 29, 2024

(54) USER EQUIPMENTS, BASE STATIONS AND METHODS FOR ACTIVATION AND RELEASE OF MULTIPLE CONFIGURED GRANTS

(71) Applicant: SHARP KABUSHIKI KAISHA, Sakai (JP)

(72) Inventors: Kai Ying, Vancouver, WA (US); Tatsushi Aiba, Sakai (JP); John Michael Kowalski, Vancouver, WA (US); Kazunari Yokomakura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 362 days.

(21) Appl. No.: 17/772,031

(22) PCT Filed: Oct. 27, 2020

(86) PCT No.: PCT/JP2020/040283
§ 371 (c)(1),
(2) Date: Apr. 26, 2022

(87) PCT Pub. No.: WO2021/090734
PCT Pub. Date: May 14, 2021

(65) Prior Publication Data
US 2022/0386363 A1    Dec. 1, 2022

Related U.S. Application Data

(60) Provisional application No. 62/932,408, filed on Nov. 7, 2019.

(51) Int. Cl.
*H04W 72/14* (2009.01)
*H04L 1/18* (2023.01)
(Continued)

(52) U.S. Cl.
CPC ........... *H04W 72/23* (2023.01); *H04L 1/1864* (2013.01)

(58) Field of Classification Search
CPC ... H04L 5/0055; H04L 1/1896; H04L 1/1864; H04L 1/1887; H04L 5/0007; H04L 1/0073; H04W 72/23
See application file for complete search history.

(56) References Cited

U.S. PATENT DOCUMENTS 12,010,689 B2 * 6/2024 Shin .................. H04W 72/53
2021/0057108 A1 * 2/2021 Fisher .................... G16H 70/20
(Continued)

OTHER PUBLICATIONS

Samsung, "UL configured grants for eURLLC", R1-1910488, 3GPP TSG RAN WG1 #98bis, Chongqing, China, Oct. 14-20, 2019, Oct. 8, 2019.

(Continued)

*Primary Examiner* — Brian D Nguyen
(74) *Attorney, Agent, or Firm* — ScienBiziP, P.C.

(57) ABSTRACT

A user equipment (UE) is described. The UE includes receiving circuitry configured to receive a hybrid automatic repeat request (HARQ) process number (HPN). The HPN indicates one or more configured grant (CG) configurations that are activated and/or released/deactivated. The UE also includes processing circuitry configured to activate and/or release/deactivate one or more CG configurations based on the HPN.

3 Claims, 11 Drawing Sheets

(51) Int. Cl.
H04L 1/1829 (2023.01)
H04W 72/23 (2023.01)

(56) References Cited

U.S. PATENT DOCUMENTS

| | | | | |
|---|---|---|---|---|
| 2023/0148270 A1* | 5/2023 | Li | ............... | H04W 72/1268 |
| | | | | 370/329 |
| 2023/0164826 A1* | 5/2023 | Zhang | ............... | H04L 1/00 |
| | | | | 370/329 |
| 2023/0247649 A1* | 8/2023 | Takahashi | ............... | H04W 72/232 |
| | | | | 370/329 |
| 2023/0291505 A1* | 9/2023 | Park | ............... | H04L 5/0096 |
| 2023/0319822 A1* | 10/2023 | Park | ............... | H04W 72/232 |
| | | | | 370/329 |

OTHER PUBLICATIONS

3GPP TS 38.321 V15.6.0 (Jun. 2019) 3rd Generation Partnership Project; Technical Specification Group Radio Access Network; NR; Medium Access Control (MAC) protocol specification (Release 15).
3GPP TR 38.824 V16.0.0 (Mar. 2019) 3rd Generation Partnership Project; Technical Specification Group Radio Access Network; Study on physical layer enhancements for NR ultra-reliable and low latency case (URLLC) (Release 16).
3GPP TS 38.331 V15.6.0 (Jun. 2019) 3rd Generation Partnership Project; Technical Specification Group Radio Access Network; NR; Radio Resource Control (RRC) protocol specification (Release 15).
3GPP TS 38.211 V15.6.0 (Jun. 2019) 3rd Generation Partnership Project; Technical Specification Group Radio Access Network; NR; Physical channels and modulation (Release 15).
3GPP TS 38.212 V15.6.0 (Jun. 2019) 3rd Generation Partnership Project; Technical Specification Group Radio Access Network; NR; Multiplexing and channel coding (Release 15).
3GPP TS 38.214 V15.6.0 (Jun. 2019) 3rd Generation Partnership Project; Technical Specification Group Radio Access Network; NR; Physical layer procedures for data (Release 15).
3GPP TS 38.213 V15.6.0 (Jun. 2019) 3rd Generation Partnership Project; Technical Specification Group Radio Access Network; NR; Physical layer procedures for control (Release 15).
Huawei, Hisilicon, "Enhanced UL configured grant transmission", R1-1906062 3GPP TSG RAN WG1 Meeting #97, Reno, USA, May 13-17, 2019.
Wilus Inc., "Discussion on UL configured grant enhancements for NR URLLC", R1-1911319 3GPP TSG RAN WG1 #98bis, Chongqing, China, Oct. 14-20, 2019.

* cited by examiner

Supported Transmission Numerologies

| $\mu$ | $\Delta f = 2^{\mu} \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |
| 5 | 480 | Normal |

Number of OFDM Symbols Per Slot

| | | Slot configuration | | | |
|---|---|---|---|---|---|
| | | 0 | | 1 | |
| $\mu$ | $N_{symb}^{slot}$ | $N_{slot}^{frame,\mu}$ | $N_{slot}^{subframe,\mu}$ | $N_{symb}^{slot}$ | $N_{slot}^{frame,\mu}$ | $N_{slot}^{subframe,\mu}$ |
| 0 | 14 | 10 | 1 | 7 | 20 | 2 |
| 1 | 14 | 20 | 2 | 7 | 40 | 4 |
| 2 | 14 | 40 | 4 | 7 | 80 | 8 |
| 3 | 14 | 80 | 8 | - | - | - |
| 4 | 14 | 160 | 16 | - | - | - |
| 5 | 14 | 320 | 32 | - | - | - |

FIG. 2

USER EQUIPMENTS, BASE STATIONS AND METHODS FOR ACTIVATION AND RELEASE OF MULTIPLE CONFIGURED GRANTS

CROSS REFERENCE

This Nonprovisional application claims priority under 35 U.S.C. § 119 on provisional Application No. 62/932,408 on Nov. 7, 2019, the entire contents of which are hereby incorporated by reference.

TECHNICAL FIELD

The present disclosure relates generally to communication systems. More specifically, the present disclosure relates to new signaling, procedures, user equipment (UE) and base stations for multiple active configured grants.

BACKGROUND ART

Wireless communication devices have become smaller and more powerful in order to meet consumer needs and to improve portability and convenience. Consumers have become dependent upon wireless communication devices and have come to expect reliable service, expanded areas of coverage and increased functionality. A wireless communication system may provide communication for a number of wireless communication devices, each of which may be serviced by a base station. A base station may be a device that communicates with wireless communication devices.

As wireless communication devices have advanced, improvements in communication capacity, speed, flexibility and/or efficiency have been sought. However, improving communication capacity, speed, flexibility and/or efficiency may present certain problems.

For example, wireless communication devices may communicate with one or more devices using a communication structure. However, the communication structure used may only offer limited flexibility and/or efficiency. As illustrated by this discussion, systems and methods that improve communication flexibility and/or efficiency may be beneficial.

SUMMARY OF INVENTION

In one example, a user equipment (UE) that communicates with a base station apparatus, comprises: receiving circuitry configured to receive a hybrid automatic repeat request (HARQ) process number (HPN), wherein the HPN indicates one or more configured grant (CG) configurations that are activated and/or released/deactivated; and processing circuitry configured to activate and/or release/deactivate one or more CG configurations based on the HPN.

In one example, a base station apparatus that communicates with a user equipment (UE), comprises: processing circuitry configured to activate and/or release/deactivate one or more configured grant (CG) configurations; and transmitting circuitry configured to transmit a hybrid automatic repeat request (HARQ) process number (HPN), wherein the HPN indicates the one or more CG configurations that are activated and/or released/deactivated.

In one example, a communication method of a user equipment (UE) that communicates with a base station apparatus, comprises: receiving a hybrid automatic repeat request (HARQ) process number (HPN), wherein the HPN indicates one or more configured grant (CG) configurations that are activated and/or released/deactivated; and activating and/or releasing/deactivating one or more CG configurations based on the HPN.

In one example, a communication method of a base station apparatus that communicates with a user equipment (UE), comprises: activating and/or releasing/deactivating one or more configured grant (CG) configurations; and transmitting a hybrid automatic repeat request (HARQ) process number (HPN), wherein the HPN indicates the one or more CG configurations that are activated and/or released/deactivated.

BRIEF DESCRIPTION OF DRAWINGS

FIG. 2 shows examples of multiple numerologies.

DESCRIPTION OF EMBODIMENTS

Figure 1:
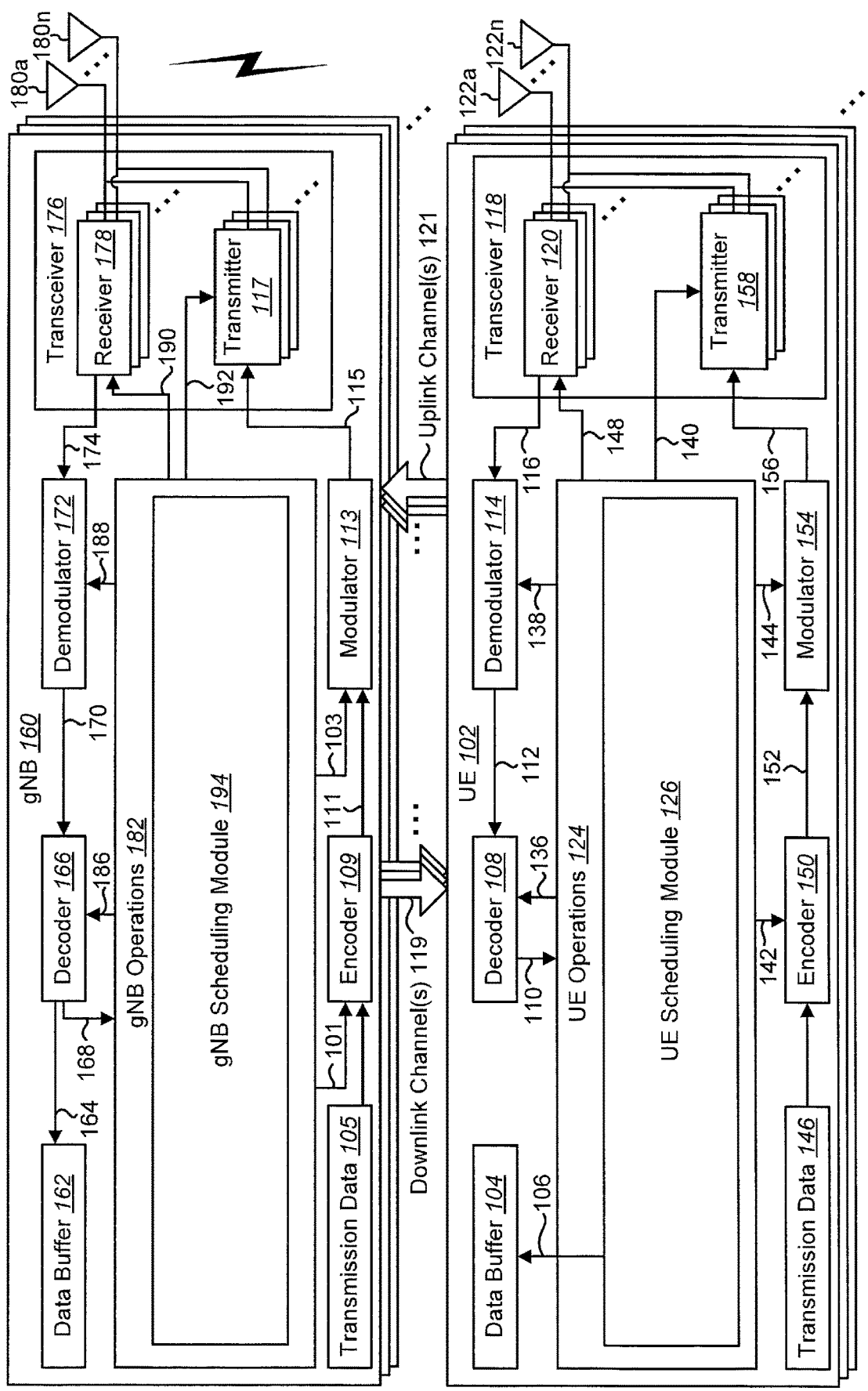
FIG. 1 is a block diagram illustrating one implementation of one or more base station apparatuses (gNBs) and one or more user equipments (UEs) in which systems and methods for activation and/or release/deactivation may be implemented.

A user equipment (UE) that communicates with a base station apparatus is described. The UE includes receiving circuitry configured to receive a hybrid automatic repeat request (HARQ) process number (HPN). The HPN indicates one or more configured grant (CG) configurations that are activated and/or released/deactivated. The UE also includes processing circuitry configured to activate and/or release/deactivate one or more CG configurations based on the HPN.

A base station apparatus that communicates with a user equipment (UE) is also described. The base station apparatus includes processing circuitry configured to activate and/or release/deactivate one or more configured grant (CG) configurations. The base station apparatus also includes transmitting circuitry configured to transmit a hybrid automatic repeat request (HARQ) process number (HPN). The HPN indicates the one or more CG configurations that are activated and/or released/deactivated.

A communication method of a user equipment (UE) that communicates with a base station apparatus is also described. The method includes receiving a hybrid automatic repeat request (HARQ) process number (HPN). The HPN indicates one or more configured grant (CG) configurations that are activated and/or released/deactivated. The method also includes activating and/or releasing/deactivating one or more CG configurations based on the HPN.

A communication method of a base station apparatus that communicates with a user equipment (UE) is also described. The method includes activating and/or releasing/deactivating one or more configured grant (CG) configurations. The method also includes transmitting a hybrid automatic repeat request (HARQ) process number (HPN). The HPN indicates the one or more CG configurations that are activated and/or released/deactivated.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE, LTE-Advanced (LTE-A) and other standards (e.g., 3GPP Releases 8, 9, 10, 11, 12, 13, 14 and/or 15). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a UE, an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a UE. However, as the scope of the present disclosure should not be limited to the 3GPP standards, the terms "UE" and "wireless communication device" may be used interchangeably herein to mean the more general term "wireless communication device." A UE may also be more generally referred to as a terminal device.

In 3GPP specifications, a base station is typically referred to as a Node B, an evolved Node B (eNB), a home enhanced or evolved Node B (HeNB) or some other similar terminology. As the scope of the disclosure should not be limited to 3GPP standards, the terms "base station," "Node B," "eNB," "gNB" and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station. An eNB may also be more generally referred to as a base station device.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands (e.g., frequency bands) to be used for communication between an eNB and a UE. It should also be noted that in E-UTRA and E-UTRAN overall description, as used herein, a "cell" may be defined (e.g., specified) as a "combination of downlink and optionally uplink resources." The linking between the carrier frequency of the downlink resources and the carrier frequency of the uplink resources may be indicated in the system information transmitted on the downlink resources.

The 5th generation communication systems, dubbed NR (New Radio technologies) by 3GPP, envision the use of time, frequency, and/or space resources to allow for services, such as eMBB (enhanced Mobile Broad-Band) communication, URLLC (Ultra Reliable and Low Latency Communication), and MMTC (massive Machine Type Communication). And, in NR, transmissions for different services may be specified (e.g., configured) for one or more bandwidth parts (BWPs) in a serving cell and/or for one or more serving cells. A user equipment (UE) may receive a downlink signal(s) and/or transmit an uplink signal(s) in the BWP(s) of the serving cell and/or the serving cell(s).

In order for the services to use the time, frequency, and/or space resources efficiently, it would be useful to be able to efficiently control downlink and/or uplink transmissions. Therefore, a procedure for efficient control of downlink and/or uplink transmissions should be designed. Accordingly, a detailed design of a procedure for downlink and/or uplink transmissions may be beneficial. To meet a latency target and to provide high reliability, mini-slot-based repetitions with flexible transmission occasions may be supported. Some approaches for applying mini-slot-based repetitions are described herein.

Various examples of the systems and methods disclosed herein are now described with reference to the Figures, where like reference numbers may indicate functionally similar elements. The systems and methods as generally described and illustrated in the Figures herein could be arranged and designed in a wide variety of different implementations. Thus, the following more detailed description of several implementations, as represented in the Figures, is not intended to limit scope, as claimed, but is merely representative of the systems and methods.

FIG. 1 is a block diagram illustrating one implementation of one or more gNBs 160 and one or more UEs 102 in which systems and methods for activation and/or release/deactivation may be implemented. The one or more UEs 102 communicate with one or more gNBs 160 using one or more physical antennas 122*a-n*. For example, a UE 102 transmits electromagnetic signals to the gNB 160 and receives electromagnetic signals from the gNB 160 using the one or more physical antennas 122*a-n*. The gNB 160 communicates with the UE 102 using one or more physical antennas 180*a-n*. In some implementations, the term "base station," "eNB," and/or "gNB" may refer to and/or may be replaced by the term "Transmission Reception Point (TRP)." For example, the gNB 160 described in connection with FIG. 1 may be a TRP in some implementations.

The UE 102 and the gNB 160 may use one or more channels and/or one or more signals 119, 121 to communicate with each other. For example, the UE 102 may transmit information or data to the gNB 160 using one or more uplink channels 121. Examples of uplink channels 121 include a physical shared channel (e.g., PUSCH (physical uplink shared channel)) and/or a physical control channel (e.g., PUCCH (physical uplink control channel)), etc. The one or more gNBs 160 may also transmit information or data to the one or more UEs 102 using one or more downlink channels 119, for instance. Examples of downlink channels 119 include a physical shared channel (e.g., PDSCH (physical downlink shared channel) and/or a physical control channel (PDCCH (physical downlink control channel)), etc. Other kinds of channels and/or signals may be used.

Each of the one or more UEs 102 may include one or more transceivers 118, one or more demodulators 114, one or more decoders 108, one or more encoders 150, one or more modulators 154, a data buffer 104 and a UE operations module 124. For example, one or more reception and/or transmission paths may be implemented in the UE 102. For convenience, only a single transceiver 118, decoder 108, demodulator 114, encoder 150 and modulator 154 are illustrated in the UE 102, though multiple parallel elements (e.g., transceivers 118, decoders 108, demodulators 114, encoders 150 and modulators 154) may be implemented.

The transceiver 118 may include one or more receivers 120 and one or more transmitters 158. The one or more receivers 120 may receive signals from the gNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the gNB 160 using one or more physical antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce decoded signals 110, which may include a UE-decoded signal 106 (also referred to as a first UE-decoded signal 106). For example, the first UE-decoded signal 106 may include received payload data, which may be stored in a data buffer 104. Another signal included in the decoded signals 110 (also referred to as a second UE-decoded signal) may include overhead data and/or control data. For example, the second UE decoded signal may provide data that may be used by the UE operations module 124 to perform one or more operations.

In general, the UE operations module 124 may enable the UE 102 to communicate with the one or more gNBs 160. The UE operations module 124 may include a UE scheduling module 126.

The UE 102 may utilize the UE scheduling module 126 to perform downlink reception(s) and/or uplink transmission(s). The downlink reception(s) may include reception of data, reception of downlink control information, and/or reception of downlink reference signals. Also, the uplink transmissions may include transmission of data, transmission of uplink control information, and/or transmission of uplink reference signals. In some examples, the UE scheduling module 126 may perform one or more operations for SPS configuration(s) and/or CG configuration(s) activation and/or release/deactivation.

In a radio communication system, physical channels (uplink physical channels and/or downlink physical channels) may be defined. The physical channels (uplink physical channels and/or downlink physical channels) may be used for transmitting information that is delivered from a higher layer.

For example, in uplink, a PRACH (Physical Random Access Channel) may be defined. In some approaches, the PRACH (e.g., the random access procedure) may be used for an initial access connection establishment procedure, a handover procedure, a connection re-establishment, a timing adjustment (e.g., a synchronization for an uplink transmission, for UL synchronization) and/or for requesting an uplink shared channel (UL-SCH) resource (e.g., an uplink physical shared channel (PSCH) (e.g., PUSCH) resource).

In another example, a physical uplink control channel (PUCCH) may be defined. The PUCCH may be used for transmitting uplink control information (UCI). The UCI may include hybrid automatic repeat request-acknowledgement (HARQ-ACK), channel state information (CSI) and/or a scheduling request (SR). The HARQ-ACK is used for indicating a positive acknowledgement (ACK) or a negative acknowledgment (NACK) for downlink data (e.g., Transport block(s), Medium Access Control Protocol Data Unit (MAC PDU) and/or Downlink Shared Channel (DL-SCH)). The CSI is used for indicating state of downlink channel (e.g., a downlink signal(s)). Also, the SR is used for requesting resources of uplink data (e.g., Transport block(s), MAC PDU and/or Uplink Shared Channel (UL-SCH)).

In some examples, the DL-SCH and/or the UL-SCH may be a transport channel that is used in the MAC layer. Also, a transport block(s) (TB(s)) and/or a MAC PDU may be defined as a unit(s) of the transport channel used in the MAC layer. The transport block may be defined as a unit of data delivered from the MAC layer to the physical layer. The MAC layer may deliver the transport block to the physical layer (e.g., the MAC layer delivers the data as the transport block to the physical layer). In the physical layer, the transport block may be mapped to one or more codewords.

In downlink, a physical downlink control channel (PDCCH) may be defined. The PDCCH may be used for transmitting downlink control information (DCI). In some examples, more than one DCI formats may be defined for DCI transmission on the PDCCH. For instance, fields may be defined in the DCI format(s), and the fields are mapped to the information bits (e.g., DCI bits).

For example, a DCI format 1_0 that is used for scheduling of the PDSCH in the cell may be defined as the DCI format for the downlink. Also, as described herein, one or more Radio Network Temporary Identifiers (e.g., the Cell RNTI(s) (C-RNTI(s)), the Configured Scheduling RNTI(s) (CS-RNTI(s)), the System Information RNTI(s) (SI-RNTI(s)), and/or the Random Access RNTI(s) (RA-RNTI(s)) may be used to transmit the DCI format 1_0. Also, the DCI format 1_0 may be monitored (e.g., transmitted, mapped) in the Common Search Space (CSS) and/or the UE Specific Search space (USS). IN some examples, the DCI format 1_0 may be monitored (e.g., transmitted, mapped) in the CSS only.

For example, the DCI included in the DCI format 1_0 may be a frequency domain resource assignment (for the PDSCH, for instance). Additionally or alternatively, the DCI included in the DCI format 1_0 may be a time domain resource assignment (for the PDSCH, for instance). Additionally or alternatively, the DCI included in the DCI format 1_0 may be a modulation and coding scheme (for the PDSCH, for instance). Additionally or alternatively, the DCI included in the DCI format 1_0 may be a new data indicator. Additionally or alternatively, the DCI included in the DCI format 1_0 may be a HARQ process number (HPN). Additionally or alternatively, the DCI included in the DCI format 1_0 may be a TPC (e.g., Transmission Power Control) command for scheduled PUCCH.

Additionally or alternatively, a DCI format 1_1 that is used for scheduling of the PDSCH in the cell may be defined as the DCI format for the downlink. Additionally or alternatively, the C-RNTI and/or the CS-RNTI may be used to transmit the DCI format 1_1. Additionally or alternatively, the DCI format 1_1 may be monitored (e.g., transmitted and/or mapped) in the CSS and/or the USS.

For example, the DCI included in the DCI format 1_1 may be a BWP indicator (for the PDSCH, for instance). Additionally or alternatively, the DCI included in the DCI format 1_1 may be frequency domain resource assignment (for the PDSCH, for instance). Additionally or alternatively, the DCI included in the DCI format 1_1 may be a time domain resource assignment (for the PDSCH, for instance). Additionally or alternatively, the DCI included in the DCI format 1_1 may be a modulation and coding scheme (for the PDSCH, for instance). Additionally or alternatively, the DCI included in the DCI format 1_1 may be a new data indicator. Additionally or alternatively, the DCI included in the DCI format 1_1 may be a HARQ process number (HPN). Additionally or alternatively, the DCI included in the DCI format 1_1 may be a TPC command for scheduled PUCCH. Additionally or alternatively, the DCI included in the DCI format 1_1 may be a CSI request that is used for requesting (e.g., triggering) transmission of the CSI (e.g., CSI reporting (e.g., aperiodic CSI reporting)). Additionally or alternatively, as described below, the DCI included in the DCI format 1_1 may be information (e.g., SPS configuration index) used for indicating an index of a configuration of a DL Semi-Persistent Scheduling (SPS).

Additionally or alternatively, a new DCI format (e.g., DCI format 1_2) that is used for scheduling of the PDSCH in the cell may be defined as the DCI format for the downlink. Additionally or alternatively, the C-RNTI and/or the CS-RNTI may be used to transmit the new DCI format (e.g., DCI format 1_2). Additionally or alternatively, the DCI format 1_2 may be monitored (e.g., transmitted and/or mapped) in the CSS and/or the USS.

For example, the DCI included in the DCI format 1_2 may be a BWP indicator (for the PDSCH, for instance). Additionally or alternatively, the DCI included in the DCI format 1_2 may be frequency domain resource assignment (for the PDSCH, for instance). Additionally or alternatively, the DCI included in the DCI format 1_2 may be a time domain resource assignment (for the PDSCH, for instance). Additionally or alternatively, the DCI included in the DCI format 1_2 may be a modulation and coding scheme (for the PDSCH, for instance). Additionally or alternatively, the DCI included in the DCI format 1_2 may be a new data indicator. Additionally or alternatively, the DCI included in the DCI format 1_2 may be a HARQ process number (HPN). Additionally or alternatively, the DCI included in the DCI format 1_2 may be a TPC command for scheduled PUCCH. Additionally or alternatively, the DCI included in the DCI format 1_2 may be a CSI request that is used for requesting (e.g., triggering) transmission of the CSI (e.g., CSI reporting (e.g., aperiodic CSI reporting)). Additionally or alternatively, the DCI included in the DCI format 1_2 may be a configurable field(s), e.g., Antenna port(s) [0~2 bits], Transmission configuration indication [0~3 bits], Rate matching indicator [0~2 bits], SRS request [0~3 bits], PRB bundling size indicator [0~1 bit], Carrier indicator [0~3 bits], CSI request [0~3 bits], ZP CSI-RS triggering [0~2 bits], Beta offset indicator [0~2 bits], SRS resource indicator [0~4 bits], Repetition factor [0~2 bits], and/or Priority indication [0~3 bits]. Additionally or alternatively, as described below, the DCI included in the DCI format 1_2 may be information (e.g., SPS configuration index) used for indicating an index of a configuration of a DL Semi-Persistent Scheduling (SPS).

Additionally or alternatively, a DCI format 0_0 that is used for scheduling of the PUSCH in the cell may be defined as the DCI format for the uplink. Additionally or alternatively, the C-RNTI, the CS-RNTI, and/or the Temporary C-RNTI may be used to transmit the DCI format 0_0. Additionally or alternatively, the DCI format 0_0 may be monitored (e.g., transmitted, mapped) in the CSS and/or the USS. In some examples, the DCI format 0_0 may be monitored (e.g., transmitted, mapped) in the CSS only.

For example, the DCI included in the DCI format 0_0 may be a frequency domain resource assignment (for the PUSCH, for instance). Additionally or alternatively, the DCI included in the DCI format 0_0 may be a time domain resource assignment (for the PUSCH, for instance). Additionally or alternatively, the DCI included in the DCI format 0_0 may be a modulation and coding scheme (for the PUSCH, for instance). Additionally or alternatively, the DCI included in the DCI format 0_0 may be a new data indicator. Additionally or alternatively, the DCI included in the DCI format 0_0 may be a HARQ process number (HPN). Additionally or alternatively, the DCI included in the DCI format 0_0 may be a redundancy version. Additionally or alternatively, the DCI included in the DCI format 0_0 may be a TPC command for scheduled PUSCH.

Additionally or alternatively, a DCI format 0_1 that is used for scheduling of the PUSCH in the cell may be defined as the DCI format for the uplink. Additionally or alternatively, the C-RNTI and/or the CS-RNTI may be used to transmit the DCI format 0_1. Additionally or alternatively, the DCI format 0_1 may be monitored (e.g., transmitted, mapped) in the CSS and/or the USS.

For example, the DCI included in the DCI format 0_1 may be a BWP indicator (for the PUSCH, for instance). Additionally or alternatively, the DCI included in the DCI format 0_1 may be a frequency domain resource assignment (for the PUSCH, for instance). Additionally or alternatively, the DCI included in the DCI format 0_1 may be a time domain resource assignment (for the PUSCH, for instance). Additionally or alternatively, the DCI included in the DCI format 0_1 may be a modulation and coding scheme (for the PUSCH, for instance). Additionally or alternatively, the DCI included in the DCI format 0_1 may be a new data indicator. Additionally or alternatively, the DCI included in the DCI format 0_1 may be a HARQ process number (HPN). Additionally or alternatively, the DCI included in the DCI format 0_1 may be a TPC command for scheduled PUSCH. Additionally or alternatively, the DCI included in the DCI format 0_1 may be a CSI request that is used for requesting the CSI reporting. Additionally or alternatively, as described below, the DCI included in the DCI format 0_1 may be information (e.g., CG configuration index) used for indicating an index of a configuration of a configured grant.

Additionally or alternatively, a new DCI format (e.g., DCI format 0_2) that is used for scheduling of the PUSCH in the cell may be defined as the DCI format for the uplink. Additionally or alternatively, the C-RNTI and/or the CS-RNTI may be used to transmit the DCI format 0_2. Additionally or alternatively, the DCI format 0_2 may be monitored (e.g., transmitted, mapped) in the CSS and/or the USS.

For example, the DCI included in the DCI format 0_2 may be a BWP indicator (for the PUSCH, for instance).

Additionally or alternatively, the DCI included in the DCI format 0_2 may be a frequency domain resource assignment (for the PUSCH, for instance). Additionally or alternatively, the DCI included in the DCI format 0_2 may be a time domain resource assignment (for the PUSCH, for instance). Additionally or alternatively, the DCI included in the DCI format 0_2 may be a modulation and coding scheme (for the PUSCH, for instance). Additionally or alternatively, the DCI included in the DCI format 0_2 may be a new data indicator. Additionally or alternatively, the DCI included in the DCI format 0_2 may be a HARQ process number (HPN). Additionally or alternatively, the DCI included in the DCI format 0_2 may be a TPC command for scheduled PUSCH. Additionally or alternatively, the DCI included in the DCI format 0_2 may be a CSI request that is used for requesting the CSI reporting. Additionally or alternatively, the DCI included in the DCI format 0_2 may be a configurable field(s), e.g., Antenna port(s) [0~2 bits], Transmission configuration indication [0~3 bits], Rate matching indicator [0~2 bits], SRS request [0~3 bits], PRB bundling size indicator [0~1 bit], Carrier indicator [0~3 bits], CSI request [0~3 bits], ZP CSI-RS triggering [0~2 bits], Beta offset indicator [0~2 bits], SRS resource indicator [0~4 bits], Repetition factor [0~2 bits], and/or Priority indication [0~3 bits]. Additionally or alternatively, as described below, the DCI included in the DCI format 0_2 may be information (e.g., CG configuration index) used for indicating an index of a configuration of a configured grant.

Additionally or alternatively, in a case that the DCI format 1_0 and/or the DCI format 1_1 and/or DCI format 1_2 is received (e.g., based on the detection of the DCI format 1_0 and/or the DCI format 1_1 and/or DCI format 1_2), the UE 102 may perform the PDSCH reception. Additionally or alternatively, in a case that the DCI format 0_0 and/or the DCI format 0_1 and/or DCI format 0_2 is received (e.g., based on the detection of the DCI format 0_0 and/or the DCI format 0_1 and/or DCI format 0_2), the UE 102 may perform the PUSCH transmission.

In some examples, as described above, a RNTI(s) (e.g., a Radio Network Temporary Identifier(s)) assigned to the UE 102 may be used for transmission of DCI (e.g., the DCI format(s), DL control channel(s) (e.g., the PDCCH(s)). For instance, the gNB 160 may transmit, (by using the RRC message, for example), information used for configuring (e.g., assigning) the RNTI(s) to the UE 102.

For example, CRC (Cyclic Redundancy Check) parity bits (also referred to simply as CRC), which are generated based on DCI, are attached to DCI, and, after attachment, the CRC parity bits are scrambled by the RNTI(s). The UE 102 may attempt to decode (e.g., blind decoding, monitor, detect) DCI to which the CRC parity bits scrambled by the RNTI(s) are attached. For example, the UE 102 detects DL control channel (e.g., the PDCCH, the DCI, the DCI format(s)) based on the blind decoding. That is, the UE 102 may decode the DL control channel(s) with the CRC scrambled by the RNTI(s). In other words, the UE 102 may monitor the DL control channel(s) with the RNTI(s). For example, the UE 102 may detect the DCI format(s) with the RNTI(s).

In some examples, the RNTI(s) may include the C-RNTI(s) (Cell-RNTI(s)), the CS-RNTI(s) (Configured Scheduling C-RNTI(s)), the SI-RNTI(s) (System Information RNTI(s)), the RA-RNTI(s) (Random Access-RNTI(s)), and/or the Temporary C-RNTI(s).

For example, the C-RNTI(s) may be a unique identification used for identifying a RRC connection and/or scheduling. Additionally or alternatively, the CS-RNTI(s) may be a unique identification used for scheduling of transmission based on a configured grant. Additionally or alternatively, the SI-RNTI may be used for identifying system information (SI) (e.g., an SI message) mapped on the BCCH and dynamically carried on DL-SCH. Additionally or alternatively, the SI-RNTI may be used for broadcasting of SI. Additionally or alternatively, the RA-RNTI may be an identification used for the random access procedure (e.g., Msg.2 transmission). Additionally or alternatively, the Temporary C-RNTI may be used for the random access procedure (e.g., scheduling of Msg.3 (re)transmission (e.g., Msg.3 PUSCH (re)transmission)).

Additionally or alternatively, a physical downlink shared channel (PDSCH) and a physical uplink shared channel (PUSCH) may be defined. For example, in a case that the PDSCH (e.g., the PDSCH resource) is scheduled by using the DCI format(s), the UE 102 may receive the downlink data, on the scheduled PDSCH (e.g., the PDSCH resource). Additionally or alternatively, in a case that the PUSCH (e.g., the PUSCH resource) is scheduled by using the DCI format(s), the UE 102 transmits the uplink data, on the scheduled PUSCH (e.g., the PUSCH resource). For example, the PDSCH may be used to transmit the downlink data (e.g., DL-SCH(s), a downlink transport block(s)). Additionally or alternatively, the PUSCH may be used to transmit the uplink data (e.g., UL-SCH(s), an uplink transport block(s)).

Furthermore, the PDSCH and/or the PUSCH may be used to transmit information of a higher layer (e.g., a radio resource control (RRC)) layer, and/or a MAC layer). For example, the PDSCH (e.g., from the gNB 160 to the UE 102) and/or the PUSCH (e.g., from the UE 102 to the gNB 160) may be used to transmit a RRC message (a RRC signal). Additionally or alternatively, the PDSCH (e.g., from the gNB 160 to the UE 102) and/or the PUSCH (e.g., from the UE 102 to the gNB 160) may be used to transmit a MAC control element (a MAC CE). In some examples, the RRC message and/or the MAC CE are also referred to as a higher layer signal.

In some approaches, a physical broadcast channel (PBCH) may be defined. For example, the PBCH may be used for broadcasting the MIB (master information block). In some examples, system information may be divided into the MIB and a number of SIB(s) (system information block(s)). For example, the MIB may be used for carrying include minimum system information. Additionally or alternatively, the SIB(s) may be used for carrying system information messages.

In some approaches, in downlink, a SS (Synchronization Signal) may be defined. The SS may be used for acquiring time and/or frequency synchronization with a cell. Additionally or alternatively, the SS may be used for detecting a physical layer cell ID of the cell.

In the radio communication for uplink, UL RS(s) may be used as uplink physical signal(s). Additionally or alternatively, in the radio communication for downlink, DL RS(s) may be used as downlink physical signal(s). The uplink physical signal(s) and/or the downlink physical signal(s) may not be used to transmit information that is provided from the higher layer, but is used by a physical layer.

In some examples, the downlink physical channel(s) and/or the downlink physical signal(s) described herein may be assumed to be included in a downlink signal (e.g., a DL signal(s)) in some implementations for the sake of simple descriptions. Additionally or alternatively, the uplink physical channel(s) and/or the uplink physical signal(s) described herein may be assumed to be included in an uplink signal (i.e. an UL signal(s)) in some implementations for the sake of simple descriptions.

The UE operations module 124 may provide information 148 to the one or more receivers 120. For example, the UE operations module 124 may inform the receiver(s) 120 when to receive retransmissions.

The UE operations module 124 may provide information 138 to the demodulator 114. For example, the UE operations module 124 may inform the demodulator 114 of a modulation pattern anticipated for transmissions from the gNB 160.

The UE operations module 124 may provide information 136 to the decoder 108. For example, the UE operations module 124 may inform the decoder 108 of an anticipated encoding for transmissions from the gNB 160.

The UE operations module 124 may provide information 142 to the encoder 150. The information 142 may include data to be encoded and/or instructions for encoding. For example, the UE operations module 124 may instruct the encoder 150 to encode transmission data 146 and/or other information 142. The other information 142 may include PDSCH HARQ-ACK information.

The encoder 150 may encode transmission data 146 and/or other information 142 provided by the UE operations module 124. For example, encoding the data 146 and/or other information 142 may involve error detection and/or correction coding, mapping data to space, time and/or frequency resources for transmission, multiplexing, etc. The encoder 150 may provide encoded data 152 to the modulator 154.

The UE operations module 124 may provide information 144 to the modulator 154. For example, the UE operations module 124 may inform the modulator 154 of a modulation type (e.g., constellation mapping) to be used for transmissions to the gNB 160. The modulator 154 may modulate the encoded data 152 to provide one or more modulated signals 156 to the one or more transmitters 158.

The UE operations module 124 may provide information 140 to the one or more transmitters 158. This information 140 may include instructions for the one or more transmitters 158. For example, the UE operations module 124 may instruct the one or more transmitters 158 when to transmit a signal to the gNB 160. For instance, the one or more transmitters 158 may transmit during a UL subframe. The one or more transmitters 158 may upconvert and transmit the modulated signal(s) 156 to one or more gNBs 160.

Each of the one or more gNBs 160 may include one or more transceivers 176, one or more demodulators 172, one or more decoders 166, one or more encoders 109, one or more modulators 113, a data buffer 162 and a gNB operations module 182. For example, one or more reception and/or transmission paths may be implemented in a gNB 160. For convenience, only a single transceiver 176, decoder 166, demodulator 172, encoder 109 and modulator 113 are illustrated in the gNB 160, though multiple parallel elements (e.g., transceivers 176, decoders 166, demodulators 172, encoders 109 and modulators 113) may be implemented.

The transceiver 176 may include one or more receivers 178 and one or more transmitters 117. The one or more receivers 178 may receive signals from the UE 102 using one or more physical antennas 180a-n. For example, the receiver 178 may receive and downconvert signals to produce one or more received signals 174. The one or more received signals 174 may be provided to a demodulator 172. The one or more transmitters 117 may transmit signals to the UE 102 using one or more physical antennas 180a-n. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The gNB 160 may use the decoder 166 to decode signals. The decoder 166 may produce one or more decoded signals 164, 168. For example, a first eNB-decoded signal 164 may include received payload data, which may be stored in a data buffer 162. A second eNB-decoded signal 168 may include overhead data and/or control data. For example, the second eNB decoded signal 168 may provide data (e.g., PDSCH HARQ-ACK information) that may be used by the gNB operations module 182 to perform one or more operations.

In general, the gNB operations module 182 may enable the gNB 160 to communicate with the one or more UEs 102. The gNB operations module 182 may include one or more of a gNB scheduling module 194. The gNB scheduling module 194 may perform scheduling of downlink and/or uplink transmissions as described herein. For example, the gNB scheduling module 182 may perform one or more operations for SPS configuration(s) and/or CG configuration(s) activation and/or release/deactivation.

The gNB operations module 182 may provide information 188 to the demodulator 172. For example, the gNB operations module 182 may inform the demodulator 172 of a modulation pattern anticipated for transmissions from the UE(s) 102.

The gNB operations module 182 may provide information 186 to the decoder 166. For example, the gNB operations module 182 may inform the decoder 166 of an anticipated encoding for transmissions from the UE(s) 102.

The gNB operations module 182 may provide information 101 to the encoder 109. The information 101 may include data to be encoded and/or instructions for encoding. For example, the gNB operations module 182 may instruct the encoder 109 to encode information 101, including transmission data 105.

The encoder 109 may encode transmission data 105 and/or other information included in the information 101 provided by the gNB operations module 182. For example, encoding the data 105 and/or other information included in the information 101 may involve error detection and/or correction coding, mapping data to space, time and/or frequency resources for transmission, multiplexing, etc. The encoder 109 may provide encoded data 111 to the modulator 113. The transmission data 105 may include network data to be relayed to the UE 102.

The gNB operations module 182 may provide information 103 to the modulator 113. This information 103 may include instructions for the modulator 113. For example, the gNB operations module 182 may inform the modulator 113 of a modulation type (e.g., constellation mapping) to be used for transmissions to the UE(s) 102. The modulator 113 may modulate the encoded data 111 to provide one or more modulated signals 115 to the one or more transmitters 117.

The gNB operations module 182 may provide information 192 to the one or more transmitters 117. This information 192 may include instructions for the one or more transmitters 117. For example, the gNB operations module 182 may instruct the one or more transmitters 117 when to (or when not to) transmit a signal to the UE(s) 102. The one or more transmitters 117 may upconvert and transmit the modulated signal(s) 115 to one or more UEs 102.

It should be noted that a DL subframe may be transmitted from the gNB 160 to one or more UEs 102 and that a UL subframe may be transmitted from one or more UEs 102 to the gNB 160. Furthermore, both the gNB 160 and the one or more UEs 102 may transmit data in a standard special subframe.

It should also be noted that one or more of the elements or parts thereof included in the eNB(s) 160 and UE(s) 102 may be implemented in hardware. For example, one or more of these elements or parts thereof may be implemented as a chip, circuitry or hardware components, etc. It should also be noted that one or more of the functions or methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

FIG. 2 shows examples of multiple numerologies. As shown in FIG. 2, multiple numerologies (e.g., multiple subcarrier spacing) may be supported. For example, μ (e.g., a subcarrier space configuration) and a cyclic prefix (e.g., the μ and the cyclic prefix for a carrier bandwidth part) may be configured by higher layer parameters (e.g., a RRC message) for the downlink and/or the uplink. In some examples, 15 kHz may be a reference numerology. For example, an RE of the reference numerology may be defined with a subcarrier spacing of 15 kHz in a frequency domain and 2048 Ts+CP length (e.g. 160 Ts or 144 Ts) in a time domain, where Ts denotes a baseband sampling time unit defined as 1/(15000*2048) seconds.

Additionally or alternatively, a number of OFDM symbol(s) per slot ($N_{symb}^{slot}$) may be determined based on the μ (e.g., the subcarrier space configuration). In some examples, a slot configuration 0 (e.g., the number of OFDM symbols per slot may be 14) and/or a slot configuration (e.g., the number of OFDM symbols per slot may be 7) may be defined.

Figure 3:
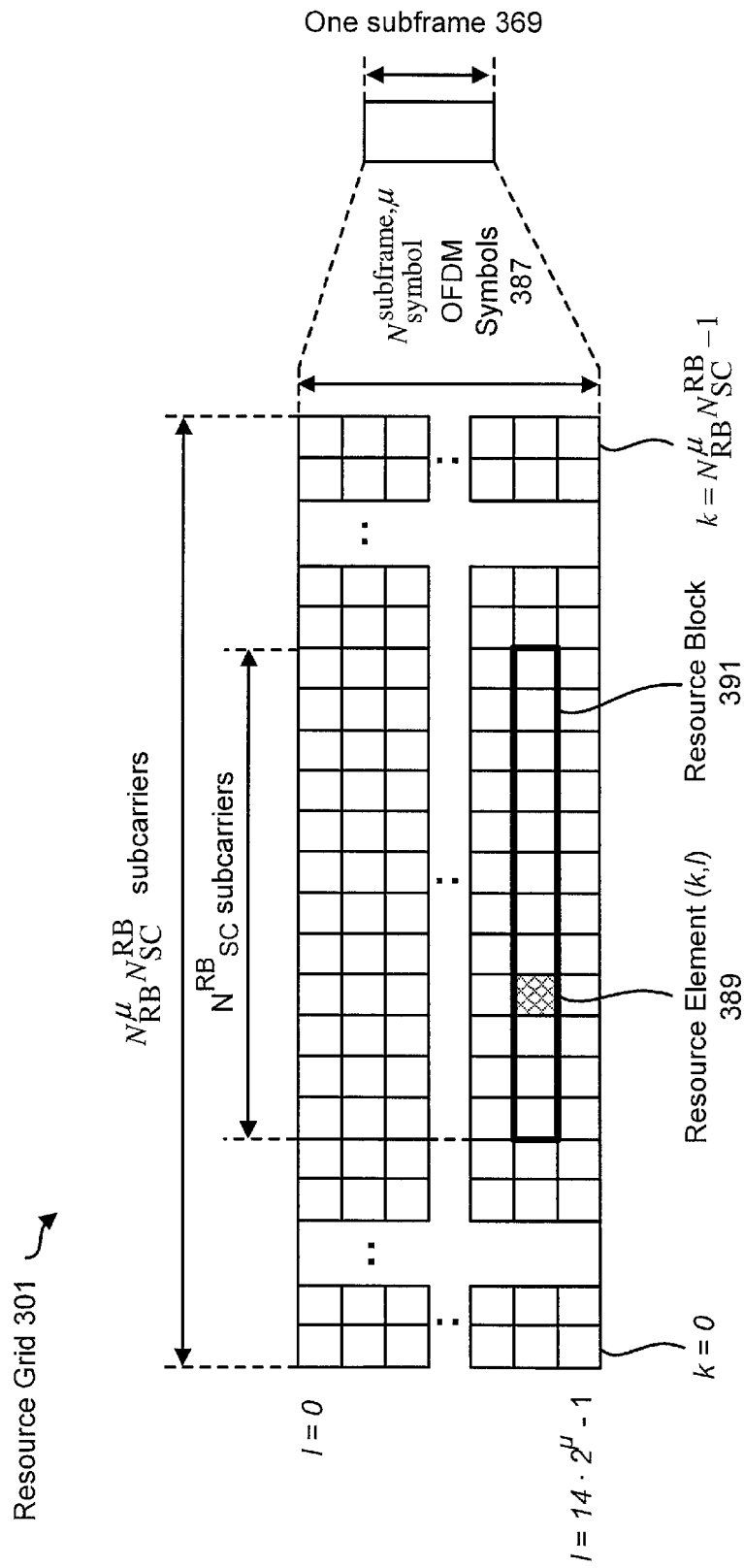
FIG. 3 is a diagram illustrating one example of a resource grid and resource block.

FIG. 3 is a diagram illustrating one example of a resource grid 301 and resource block 391 (e.g., for the downlink and/or the uplink). The resource grid 301 and resource block 391 illustrated in FIG. 3 may be utilized in some implementations of the systems and methods disclosed herein.

In FIG. 3, one subframe 369 may include $N_{symbol}^{subframe,\mu}$ symbols 387. Additionally or alternatively, a resource block 391 may include a number of resource elements (RE) 389. In some examples, in the downlink, the OFDM access scheme with cyclic prefix (CP) may be employed, which may be also referred to as CP-OFDM. A downlink radio frame may include multiple pairs of downlink resource blocks (RBs) 391 which are also referred to as physical resource blocks (PRBs). The downlink RB pair is a unit for assigning downlink radio resources, defined by a predetermined bandwidth (RB bandwidth) and a time slot. The downlink RB pair may include two downlink RBs 391 that are continuous in the time domain. Additionally or alternatively, the downlink RB 391 may include twelve sub-carriers in frequency domain and seven (for normal CP) or six (for extended CP) OFDM symbols in time domain. A region defined by one sub-carrier in frequency domain and one OFDM symbol in time domain is referred to as a resource element (RE) 389 and is uniquely identified by the index pair (k,l), where k and l are indices in the frequency and time domains, respectively.

Additionally or alternatively, in the uplink, in addition to CP-OFDM, a Single-Carrier Frequency Division Multiple Access (SC-FDMA) access scheme may be employed, which is also referred to as Discrete Fourier Transform-Spreading OFDM (DFT-S-OFDM). An uplink radio frame may include multiple pairs of uplink resource blocks 391. The uplink RB pair is a unit for assigning uplink radio resources, defined by a predetermined bandwidth (RB bandwidth) and a time slot. The uplink RB pair may include two uplink RBs 391 that are continuous in the time domain. The uplink RB may include twelve sub-carriers in frequency domain and seven (for normal CP) or six (for extended CP) OFDM/DFT-S-OFDM symbols in time domain. A region defined by one sub-carrier in the frequency domain and one OFDM/DFT-S-OFDM symbol in the time domain is referred to as a resource element (RE) 389 and is uniquely identified by the index pair (k,l) in a slot, where k and l are indices in the frequency and time domains respectively.

Each element in the resource grid 301 (e.g., antenna port p) and the subcarrier configuration μ is called a resource element 389 and is uniquely identified by the index pair (k,l) where k=0, ..., $N_{RB}^{\mu} N_{SC}^{RB}-1$ is the index in the frequency domain and l refers to the symbol position in the time domain. The resource element (k,l) on the antenna port p and the subcarrier spacing configuration μ is denoted (k,l)p,μ. The physical resource block 391 is defined as $N_{SC}^{RB}=12$ consecutive subcarriers in the frequency domain. The physical resource blocks 391 are numbered from 0 to $N_{RB}^{\mu}-1$ in the frequency domain. The relation between the physical resource block number $n_{PRB}$ in the frequency domain and the resource element (k,l) is given by $$n_{PRB} = \left\lfloor \frac{k}{N_{SC}^{RB}} \right\rfloor.$$

Figure 4:
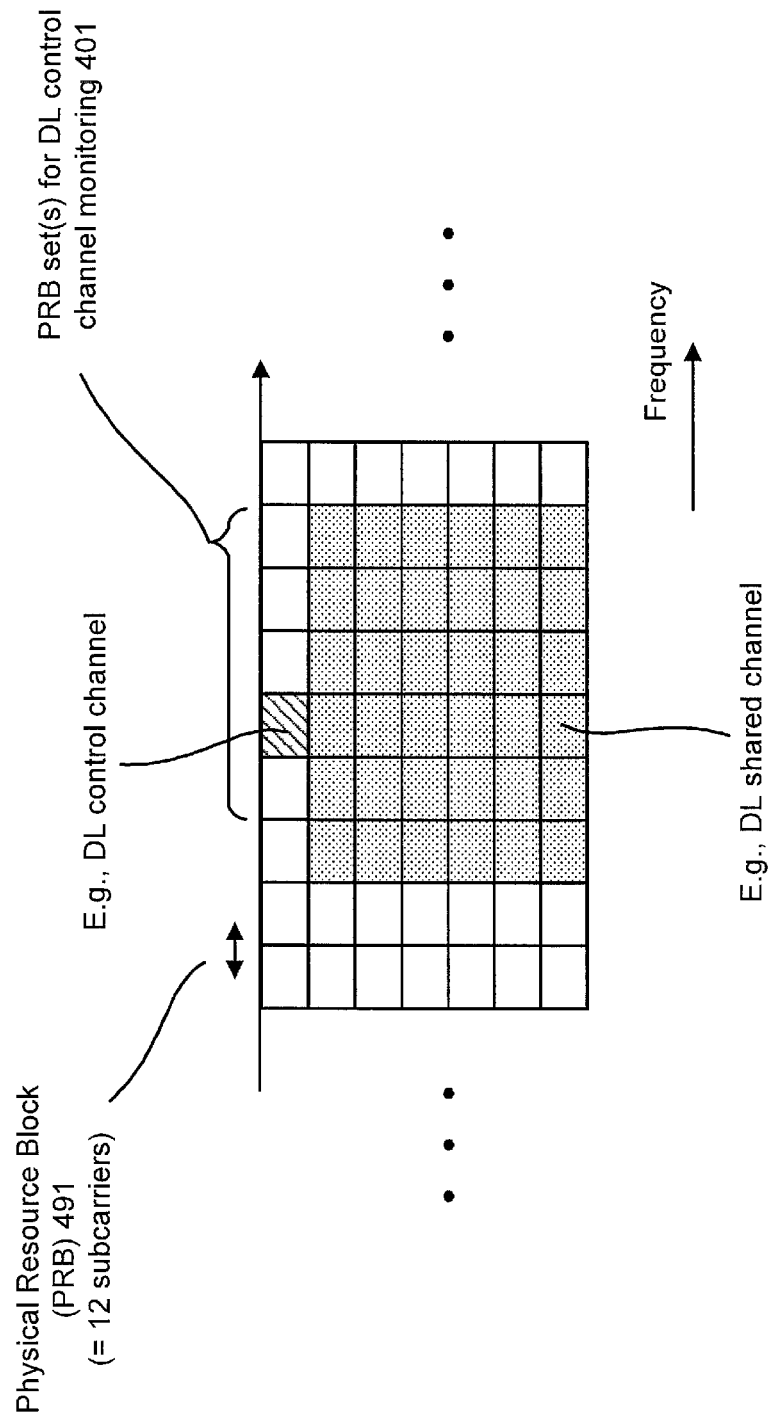
FIG. 4 shows examples of resource regions.

FIG. 4 shows examples of resource regions (e.g., resource region of the downlink). One or more sets 401 of PRB(s) 491 (e.g., a control resource set (e.g., CORESET)) may be configured for DL control channel monitoring (e.g., the PDCCH monitoring). For example, the CORESET is, in the frequency domain and/or the time domain, a set 401 of PRBs 491 within which the UE 102 attempts to decode the DCI (e.g., the DCI format(s), the PDCCH(s)), where the PRBs 491 may or may not be frequency contiguous and/or time contiguous, a UE 102 may be configured with one or more control resource sets (e.g., the CORESETs) and one DCI message may be mapped within one control resource set. In the frequency-domain, a PRB 491 is the resource unit size (which may or may not include DM-RS) for the DL control channel.

The UE 102 may monitor a set of candidates of the PDCCH in one or more control resource sets (e.g., CORESETs) on the active DL bandwidth part (BWP) on each activated serving cell according to corresponding search space sets. In some examples, the term "monitor" may imply that the UE 102 attempts to decode each PDCCH (e.g., the set of candidates of the PDCCH) according to the monitored DCI format(s). Also, the candidates of the PDCCH may be candidates for which the DL control channel(s) may possibly be mapped, assigned, and/or transmitted.

The set of candidates of the PDCCH for the UE 102 to monitor may be defined in terms of a search space set(s) (e.g., also referred to simply as a search space(s)). The UE 102 may monitor the set of candidates of the PDCCH in the search space(s). The search space set(s) may include a common search space(s) (CSS(s), UE-common search space(s)) and/or a user equipment-specific search space(s) (USS, UE-specific search space(s)).

For instance, the CSS and/or the USS may be defined (e.g., configured) in a region(s) of DL control channel(s). For example, the CSS may be used for transmission of DCI to a plurality of the UEs 102. For example, a Type0-PDCCH common search space may be defined for the DCI format(s) with CRC scrambled by the SI-RNTI. Additionally or alternatively, a Type1-PDCCH common search space may be defined for the DCI format(s) with CRC scrambled by the RA-RNTI, the Temporary C-RNTI, and/or the C-RNTI. Additionally or alternatively, a Type3-PDCCH common search space may be defined for the DCI format(s) with CRC scrambled by the C-RNTI, and/or the CS-RNTI.

The USS may be used for transmission of DCI to a specific UE 102. For example, the USS may be determined based on a Radio Network Temporary Identifier (RNTI) (e.g., the C-RNTI). For instance, the USS may be defined for the DCI format(s) with CRC scrambled by the C-RNTI, and/or the CS-RNTI.

In some examples, the gNB 160 may transmit, by using the RRC message, first information used for configuring (e.g., determining) one or more CORESETs. For example, for each of DL BWPs (e.g., each of DL BWPs in the serving cell), the gNB 106 may transmit, by using the RRC message, the first information used for configuring the one or more CORESET. For example, the first information may include information used for configuring an index of the CORESET. Also, the first information may include information used for configuring a number of consecutive symbols for the CORESET. Also, the first information may include information used for configuring a set of resource blocks for the CORESET.

Additionally or alternatively, the gNB 160 may transmit, by using the RRC message, second information used for configuring the search space set(s). For example, the second information may be configured for each search space set. For example, the second information may include information used for configuring an index of the search space set(s). Additionally or alternatively, the second information may include information used for configuring the index of the CORESET(s) associated with the search space set(s). Additionally or alternatively, the second information may include information used for indicating a PDCCH monitoring periodicity and/or a PDCCH monitoring offset where the UE 102 monitors the PDCCH(s) in the search space set(s). Additionally or alternatively, the second information may include information used for indicating a PDCCH monitoring pattern within a slot. For example, the information used for indicating the PDCCH monitoring pattern may be used for indicating first symbol(s) within a slot for the PDCCH monitoring. For instance, the UE 102 may determine a PDCCH monitoring occasion(s) based on the PDCCH monitoring periodicity, the PDCCH monitoring offset, and/or the PDCCH monitoring pattern within a slot.

Additionally or alternatively, the second information may include information used for indicating a type of the search space set (e.g., information used for indicating that the search space set is either the CSS or the USS). Additionally or alternatively, the second information may include information used for indicating one or more DCI formats which accordingly the UE 102 monitors the PDCCH in the search space set(s). For example, if the search space set is the CSS (e.g., if the search space set is configured as the CSS), the DCI format 0_0 and/or the DCI format 1_0 may be configured to monitor the PDCCH (e.g., the candidate(s) of the PDCCH(s)). In some examples, the DCI format(s) for monitoring the PDCCH in the CSS may be scrambled by the C-RNTI, the CS-RNTI, the RA-RNTI, the Temporary C-RNTI, and/or the SI-RNTI.

Additionally or alternatively, if the search space set is the USS (e.g., if the search space set is configured as the USS), the DCI format 0_0 and/or the DCI format 1_0 may be configured to monitor the PDCCH (e.g., the candidate(s) of the PDCCH(s)). Additionally or alternatively, if the search space set is the USS, the DCI format 0_1 and/or the DCI format 1_1 may be configured to monitor the PDCCH (e.g., the candidate(s) of the PDCCH(s)). Additionally or alternatively, if the search space set is the USS, the DCI format 0_2 and/or the DCI format 1_2 may be configured to monitor the PDCCH (e.g., the candidate(s) of the PDCCH(s)). For example, if the search space set is the USS, a first set of DCI formats (e.g., the DCI format 0_0 and/or the DCI format 1_0) and/or a second set of DCI formats (e.g., the DCI format 0_1 and/or the DCI format 1_1) and/or a third set of DCI formats (e.g., the DCI format 0_2 and/or the DCI format 1_2) may be configured to monitor the PDCCH (e.g., the candidate(s) of the PDCCH(s)). In some examples, the DCI format(s) for monitoring the PDCCH in the USS may be scrambled by the C-RNTI and/or the CS-RNTI. For example, the second information may be configured per search space set. For instance, the second information may be configured for each of search space sets.

In some examples, for the serving cell(s), the gNB 160 may configure, by using the RRC message, a set of four DL BWPs (e.g., at most four DL BWPs, a DL BWP set) (e.g., for receptions by the UE 102). Additionally or alternatively, the gNB 160 may indicate, by using the DCI format(s) for the downlink, an active DL BWP(s). For example, for each DL BWP in the set of DL BWPs, the gNB 160 may configure, by using the RRC message, the subcarrier spacing, the cyclic prefix, a number of contiguous PRBs 491 (e.g., a bandwidth of PRBs), and/or an index (e.g., the index of the DL BWP(s)) in the set of DL BWPs.

Additionally or alternatively, for the serving cell(s), the gNB 160 may configure, by using the RRC message, a set of four UL BWP(s) (e.g., at most four UL BWPs, a UL BWP set) (e.g., for transmissions by the UE 102). Additionally or alternatively, the gNB 160 may indicate, by using the DCI format(s) for the uplink, an active UL BWP(s). Additionally or alternatively, for each UL BWP in the set of UL BWPs, the gNB 160 may configure, by using the RRC message, the subcarrier spacing, the cyclic prefix, a number of contiguous PRBs 491 (e.g., a bandwidth of PRBs), an index (e.g., the index of the UL BWP(s)) in the set of UL BWPs.

Additionally or alternatively, the UE 102 may perform, based on the configuration(s) for the DL BWP(s), reception(s) on the PDCCH in the DL BWP(s) and/or reception(s) on the PDSCH in the DL BWP(s). Additionally or alternatively, the UE 102 may perform, based on the configuration(s) for the UL BWP(s).

Figure 5:
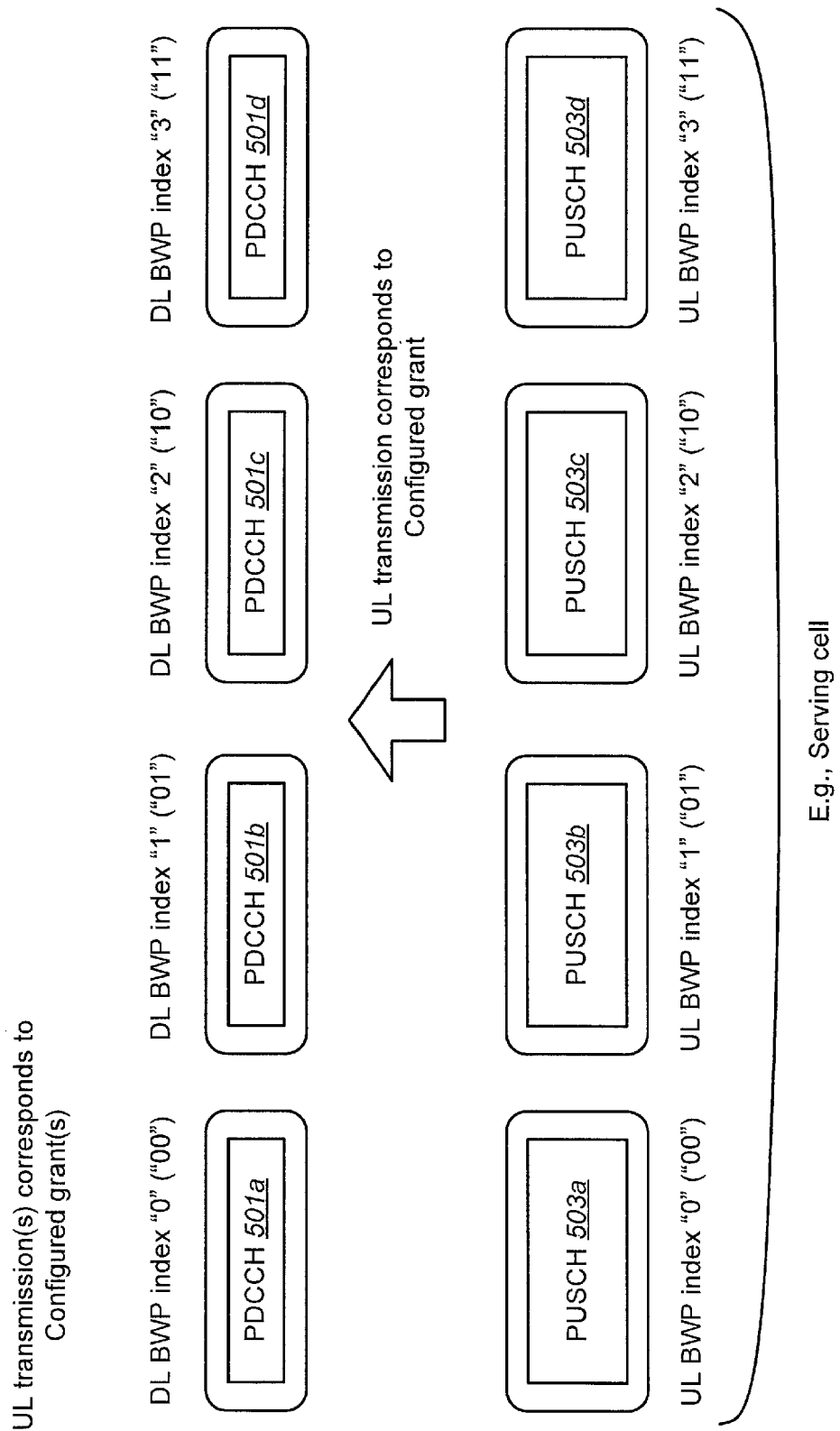
FIG. 5 illustrates an example of an UL transmission(s) corresponding to a configured grant(s).

FIG. 5 illustrates an example of an UL transmission(s) corresponding to a configured grant(s). As described as FIG. 5, the UE 102 may perform the UL transmission(s) (e.g., the (re)transmission(s) on the UL-SCH, and/or the (re)transmission(s) on the PUSCH 503a-d). For example, the UE 102 may perform the UL transmission(s) on the PUSCH 503a-d on the UL BWP(s) in the serving cell. In some examples, the DL BWP(s) and the UL BWP(s) is linked in a case that the index of the DL BWP and the index of the UL BWP are the same. And, based on the detection of the downlink signal (e.g., the PDCCH 501a-d) on the DL BWP(s) (e.g., on the active DL BWP(s)), the UE 102 performs the UL transmission corresponding to the configured grant on the UL BWP(s) (e.g., on the active UL BWP(s)) linked with the DL BWP(s) on which the downlink signal is detected.

For example, the UL transmission(s) may be dynamically scheduled by an uplink grant in a DCI (e.g., the DCI format(s) for the uplink with the CRC scrambled by the C-RNTI). Additionally or alternatively, the UL transmission(s) may correspond to a configured grant Type 1 and/or a configured grant Type 2. The transmission corresponds to the configured grant Type 1 may be semi-statically configured to operate upon the reception of a parameter(s) of ConfiguredGrantConfig including rrc-ConfiguredUplinkGrant without the detection of an uplink grant in a DCI (e.g., the DCI format(s) for the uplink). The transmission corresponds to the configured grant Type 2 may be scheduled by an uplink grant in a valid activation DCI (e.g., the activation DCI format(s) for the uplink with the CRC scrambled by the CS-RNTI) after the reception of the parameter(s) of the ConfiguredGrantConfig not including rrc-ConfiguredUplinkGrant.

For instance, the UL transmission(s) corresponding to the configured grant(s) may be scheduled (e.g., activated) by using the DCI format(s) with the CRC scrambled by the CS-RNTI. And, two types of the UL transmission(s) correspond to the configured grant(s). For example, one of the two types of the UL transmission(s) may be referred to as a transmission corresponding to a configured grant Type 1 (e.g., a configured grant Type 1 transmission, UL transmission for the configured grant Type 1). Also, one of the two types of the UL transmission(s) may be referred to as a transmission corresponding to a configured grant Type 2 (e.g., a configured grant Type 2 transmission, UL transmission for the configured grant Type 2).

In some examples, for the configured grant Type 1 transmission, an uplink grant may be provided by the RRC (e.g., the RRC layer). For example, in a case that the UE 102 receives the RRC message including the uplink grant (e.g., the configuration(s) for the configured grant Type 1 transmission), the UE 102 may store the uplink grant as a configured grant.

Also, for the configured grant Type 2, an uplink grant may be provided by the PDCCH 501 (e.g., the activation DCI format(s) to be used for indicating the activation, a configured grant activation, and/or an activation of a configured grant (e.g., a configured grant corresponding to a configured grant configuration)). For example, in a case that the UE 102 receives the uplink grant (e.g., the activation DCI format(s)), the UE 102 may store the uplink grant as the configured grant. Also, in a case that the UE 102 receives the uplink grant (e.g., a deactivation DCI format(s) to be used for indicating the deactivation, a configured grant deactivation, and/or a deactivation of a configured grant (e.g., a configured grant corresponding to a configured grant configuration)), the UE 102 clear the configured uplink grant (e.g., a configured grant(s) corresponding to a deactivated configured grant configuration with an index). For instance, the uplink grant provided by the PDCCH 501 may be stored as the configured grant based on the DCI format (e.g., L1 signaling) indicating the configured grant activation (e.g., the DCI format(s) used for indicating an activation of a configured grant). Additionally or alternatively, the uplink grant provided by the PDCCH 501 may be cleared based on the DCI format (e.g., L1 signaling) indicating the configured grant deactivation (e.g., the DCI format(s) used for indicating a deactivation of a configured grant).

For instance, for the configured grant type 2 transmission, the DCI format(s) with CRC scrambled by the CS-RNTI may be used for indicating the activation (e.g., the configured grant activation). Also, for the configured grant Type 2 transmission, the DCI format(s) with CRC scrambled by the CS-RNTI may be used for indicating a deactivation (e.g., the configured grant deactivation).

In some examples, the DCI format(s) with CRC scrambled by the CS-RNTI may be used for indicating a retransmission(s) (e.g., the retransmission(s) of the TB(s) (e.g., the retransmission of the TB(s) transmitted by the configured grant Type 1 transmission, and/or the configured grant Type 2 transmission)). For example, the retransmission(s) may be indicated by using the NDI set to "1" (i.e., the NDI field set to "1", the NDI="1"). In some examples, as described above, the NDI (i.e., the NDI field) may be included in the DCI format(s) with CRC scrambled by the CS-RNTI. For instance, the PUSCH retransmission may be scheduled by using the PDCCH 501 (e.g., the DCI format(s) for the uplink) with the CRC scrambled by the CS-RNTI with NDI set to "1".

In some examples, for the configured grant Type 1 transmission, based on configuration(s) of the configured grant Type 1 (e.g., for the serving cell(s)), the UE 102 may store the uplink grant as the configured grant (e.g., for the serving cell(s)). Also, the UE 102 may initialize (if not active) or re-initialize (if already active) the configured grant to start in the symbol according to the parameter(s) (e.g., timeDomainoffset) and reoccur with the parameter (e.g., periodicity). And, after the uplink grant is configured for the configured grant Type 1, the UE 102 may consider sequentially that the Nth uplink grant occurs associated with the symbol for which:

$$[(SFN*numberOfSlotsPerFrame*numberOfSymnbolsPerSlot)+ \\ (\text{slot number in the frame}*numberOfSymbolsPerSlot)+\text{symbol number in the slot}]=(timeDomainOffset+ \\ N*periodicity) \bmod 1024. \quad (1)$$

Also, for example, for the configured grant Type 2 transmission, after the uplink grant is configured for the configured grant Type 2, the UE 102 may consider sequentially that the Nth uplink grant occurs associated with the symbol for which:

$$[(SFN*numberOfSlotsPerFrame*numberOfSymbolsPerSlot)+ \\ (\text{slot number in the frame}*numberOfSymbolsPerSlot)+\text{symbol number in the slot}]=[(SFN_{start\ time}* \\ numberOfSlotsPerFrame*numberOfSymbolsPerSlot+ \\ slot_{start\ time}*numberOfSymbolsPerSlot+ \\ symbol_{start\ time})+N*periodicity] \bmod 1024. \quad (2)$$

In some examples, $SFN_{start\ time}$, $slot_{start\ time}$, and $symbol_{start\ time}$ are the SFN (i.e., System Frame Number), slot, and symbol, respectively, at the time the configured uplink grant was (re-)initialised. Also, for example, the parameter (e.g., periodicity) may be configured by the gNB 160 by using the RRC message.

For instance, for the configured grant Type 1 transmission, the UE 102 may initiate the uplink transmission based on the reception of the parameter(s) included in the RRC message. Also, for the configured grant type 2 transmission, the UE 102 may initiate the uplink transmission based on the reception of the DCI format(s) for the uplink with the CRC scrambled by the C-RNTI. Also, the UE 102 may perform the retransmission of the TB(s) (e.g., the retransmission on the UL-SCH, the retransmission on the PUSCH 503) based on the reception of the DCI format(s) for the uplink with the CRC scrambled by the C-RNTI, where the NDI included in the DCI format(s) for the uplink is set to "1".

For example, the gNB 160 may transmit, by using the RRC message (e.g., the dedicated RRC message, a UE-specific RRC message), the parameter(s) used for the configured grant Type 1 transmission. And, the UE 102 may perform the configured grant Type 1 transmission based on the parameter(s) included in the RRC message. Also, the gNB 160 may transmit, by using the RRC message (e.g., the dedicated RRC message, the UE-specific RRC message), the parameter(s) for the configured grant Type 2 transmission.

And, the UE 102 may perform the configured grant Type 2 transmission based on the parameter(s) included in the RRC message.

In some examples, for the transmission(s) corresponding to the configured grant(s) the configured grant Type 1 transmission and/or the configured grant Type 2 transmission), the following parameters may be configured. For example, the parameters may be included ConfiguredGrantConfig in ConfiguredGrantConfig information element (IE). For instance, the RRC message may include the ConfiguredGrantConfig IE.

frequencyhopping: the value "intraSlot" enables "Intra-slot frequency hopping and the value "interSlot" enables "Inter-slot frequency hopping"

mcs-Table: indicates a MCS table the UE 102 shall use for the PUSCH (e.g., the PUSCH transmission) (e.g., without transform precoding)

mcs-TableTransformPrecoder: indicates a MCS table the UE 102 shall use for the PUSCH (e.g., the PUSCH transmission) (e.g., with transform precoding)

powerControlLoopToUse: closed control loop to apply. A parameter(s) used to determine a transmission power for the PUSCH transmission (e.g., the transmission(s) corresponding to the configured grant(s))

p0-PUSCH-Alpha: an index of P0-PUSCH-AlphaSet to be used for this configuration. A parameter(s) used to determine the transmission power for the PUSCH transmission (e.g., the transmission(s) corresponding to the configured grant(s))

transformPrecoder: enables or disables transform precoding for the transmission(s) corresponding to the configured grant(s) (i.e., the configured grant Type1 transmission and/or the configured grant Type2 transmission)

nrofHARQ-Processes: the number of HARQ processes configured for the configured grant Type 1 transmission and/or the configured grant Type 2 transmission repK: the number of repetitions to be applied for the configured grant Type 1 transmission and/or the configured grant Type 2 transmission repK-RV: the redundancy version sequence to be applied for the configured grant Type 1 transmission and/or the configured grant Type 2 transmission Additionally or alternatively, for the configured grant Type 1 transmission, the following parameter(s) may be configured. For example, the flowing parameters may be included in rrc-ConfiguredUplinkGrant in the ConfiguredGrantConfig IE.

timeDomainOffset: an offset value(s) related to System Frame Number (SFN)=0. For instance, an offset value(s) used for indicating a timing(s) for the configured grant Type 1 transmission.

timeDomainAllocation: indicates a combination of start symbol and length and PUSCH mapping type frequencyDomainAllocation: indicates the frequency domain resource allocation antenna port: indicates the antenna port(s) to be used for this configuration mcsAndTBS: indicates the modulation order, target code rate and/or TB size frequencyHoppingOffset: frequency hopping offset used when frequency hopping is enabled pathlossReferenceIndex: a parameter(s) for a power control for the configured grant Type 1 transmission (i.e., to be used for this configuration)

In some examples, multiple configurations of ConfiguredGrantConfig may be supported. For instance, one or more configurations of ConfiguredGrantConfig may be configured. Also, multiple configurations of rrc-ConfiguredUplinkGrant may be supported. For instance, one or more configurations of rrc-ConfiguredUplinkGrant may be configured. In some examples, the configuration(s) of ConfiguredGrantConfig and/or the configuration(s) of rrc-ConfiguredUplinkGrant may be referred to as the configuration(s) of the configured grant. For instance, a single configuration of the configured grant may be supported. Also, multiple configurations of the configured grant may be supported.

For example, the gNB 160 may transmit, by using the RRC message, third information used for configuring that the multiple configurations of the configured grant are enabled (e.g., allowed). For instance, the gNB 160 may transmit, by using the RRC message, the third information used for indicating whether the single configuration of the configured grant or the multiple configurations of the configured grant is used for the transmission(s) that corresponds to the configured grant(s).

For instance, in a case that the single configuration of the configured grant is configured, the single configuration of the configured grant may be used for the transmission(s) corresponding to the configured grant(s). Also, in a case that the multiple configurations of the configured grant are configured, the multiple configurations of the configured grant may be used for the transmission(s) corresponding to the configured grant(s). Also, in a case that the multiple configurations of the configured grant are not configured, the single configuration of the configured grant may be used for the transmission(s) corresponding to the configured grant(s).

In some examples, the third information may be configured per serving cell. For example, the third information may be configured for each of serving cells (e.g., the primary cell and/or the one or more secondary cells). Additionally or alternatively, the third information may be configured per UL bandwidth part (UL BWP). For example, the third information may be configured for each of UL BWPs (e.g., each of UL BWPs in the serving cell). Additionally or alternatively, the third information may be configured for the configured grant Type 1 transmission and/or the configured grant Type 2 transmission. For example, the third information may be commonly configured for the configured grant Type 1 transmission and the configured grant Type 2 transmission. Additionally or alternatively, the third information may be separately configured for the configured grant Type 1 transmission and the configured grant Type 2 transmission.

For example, as described below, in a case that the third information is commonly configured for the configured grant Type 1 transmission and the configured grant Type 2 transmission, an index of the configuration(s) may be configured for the ConfiguredGrantConfig. Additionally or alternatively, in a case that the third information is separately configured for the configured grant Type 1 transmission and the configured grant Type 2 transmission, an index of the configuration(s) index may be configured for the ConfiguredGrantConfig and/or an index of the configuration(s) may be configured for the rrc-ConfiguredUplinkGrant.

Additionally or alternatively, the single configuration of the configured grant may be activated. For instance, the single active configuration of the configured grant may be supported. Additionally or alternatively, the multiple configurations of the configured grant may be activated. For instance, the multiple active configurations of the configured grant may be supported. For example, the multiple active configurations of the configured grant for a given BWP (e.g., an UL BWP) of the serving cell may be supported at lease for different services/traffic type and/or for enhancing reliability and reducing latency.

For instance, the single configuration of the configured grant may be configured (and/or activated) for a given BWP (e.g., an UL BWP) of a single serving cell. Additionally or alternatively, the multiple configurations of the configured grant may be configured (and/or activated) for a given BWP (e.g., an UL BWP) of a single serving cell.

The UE 102 may perform the configured grant Type 1 transmission based on the single configuration of the configured grant (if the single configuration of the configured grant is used) and/or the multiple configurations of the configured grant (if the multiple configurations of the configured grant are used).

Additionally or alternatively, for the transmission on the PUSCH 503, the following parameter(s) may be configured. For example, the flowing parameters may be included in PUSCH-Config in PUSCH-Config IE (e.g., included in BWP-Uplink Dedicated IE). The IE PUSCH-Config may be used for configuring UE-specific parameters applicable to a particular BWP (e.g., the UL BWP). Also, the IE BWP-Uplink Dedicated may be used for configuring the dedicated parameters (i.e., UE specific parameters) of the UL BWP. For instance, the gNB 160 may transmit, by using the RRC message (e.g., the dedicated RRC message, the UE-specific RRC message), the parameter(s) used for the transmission on the PUSCH 503. For example, the following parameter(s) may be used for the transmission on the PUSCH 503 scheduled by using the DCI format(s) with the CRC scrambled by the C-RNTI.

dataScramblingIdentityPUSCH: identifier used to initiate data scrambling for the PUSCH (e.g., the PUSCH transmission)

txConfig: indicates whether the UE uses codebook based transmission or non-codebook based transmission PUSCH-PowerControl: the parameter(s) used to determine the transmission power for the PUSCH transmission frequencyHopping: the value "intraSlot" enables "Intra-slot frequency hopping and the value "interSlot" enables "Inter-slot frequency hopping"

pusch-TimeDomainAllocationList: list of time domain resource assignment for timing of the DCI format(s) for the uplink and the UL transmission pusch-AggregationFactor: the number of repetitions for the UL transmission(s) (e.g., the PUSCH transmission(s))

mcs-Table: indicates which MCS table the UE shall use for the PUSCH transmission (e.g., without transform precoding)

mcs-TableTransformPrecoder: indicates which MCS table the UE shall use for the PUSCH transmission (e.g., with transform precoding)

transformPrecoder: UE-specific selection of transformer precoder for the PUSCH transmission scaling of UCI-OnPUSCH: indicates a scaling factor to limit the number of resource elements assigned to UCI transmitted on the PUSCH In some examples, the parameter PUSCH-PowerControl may include the following parameters.

tpc-Accumulation: if enabled, the UE 102 applies transmission power (TPC) command via accumulation. If not enabled, the UE 102 applies the TPC command without accumulation. A parameter indicates a configuration for the TPC command (e.g., whether the TPC command is accumulated or nor accumulated (i.e., an absolute value is used as the TPC command))

p0-NominalWithoutGrant: the parameter(s) used to determine the transmission power for the transmission(s) corresponding to the configured grant(s)

p0-Alpha: the parameter(s) used to determine the transmission power for the PUSCH transmission In some examples, multiple configurations of PUSCH-Config may be supported. For instance, one or more configurations of PUSCH-Config may be configured. In some examples, the configuration(s) of PUSCH-Config may be referred to as the configuration(s) of the PUSCH 503. For instance, a single configuration of the PUSCH 503 may be supported. Also, multiple configurations of the PUSCH 503 may be supported.

For example, the multiple configurations of the PUSCH 503 may be configured in a case that the multiple configurations of the configured grant are configured. For instance, in a case that the gNB 160 configure the multiple configuration of the configured grant, the gNB 160 may always configure the multiple configurations of the PUSCH 503. For example, the single configuration of the PUSCH 503 may be configured in a case that the single configuration of the configured grant is configured. For instance, in a case that the gNB 160 configure the single configuration of the configured grant, the gNB 160 may always configure the single configuration of the PUSCH 503.

In some examples, in a case that the multiple configurations of the configured grant are configured, the index of the configuration(s) may be configured. For example, the index of the configuration may be included in the ConfiguredGrantConfig (e.g., or the ConfiguredGrantConfig IE). Additionally or alternatively, the index of the configuration(s) may be included in the rrc-ConfiguredUplinkGrant (e.g., in the ConfiguredGrantConfig IE). Additionally or alternatively, the index of the configuration(s) may be included in the PUSCH-config.

In some examples, the index of the configuration may be the index of the configuration for the ConfiguredGrantConfig. Additionally or alternatively, the index of the configuration may be the index of the configuration for the rrc-ConfiguredUplinkGrant. Additionally or alternatively, the index of the configuration may be the index of the configuration for the PUSCH-Config.

For instance, each of the multiple configurations of the configured grant may be identified by using the index of the configuration(s) (e.g., the index of the configured grant configuration(s)). Also, each of the multiple configurations of the PUSCH 503 may be identified by using the index of the configuration(s) (e.g., the index of the PUSCH configuration(s)). Also, a linkage between each of the multiple configurations of the configured grant and each of the multiple configurations of the PUSCH 503 (e.g., a correspondence for the each of the multiple configurations of the configured grant and the each of the multiple configurations of the PUSCH 503) may be identified by using the index of the configuration(s).

For example, in a case that the multiple configurations of the configured grant (e.g., four configurations of the configured grant) are configured for the configured grant transmission, the index "0" (e.g., the value "0"), the index "1" (e.g., the value "1"), the index "2" (e.g., the value "2") and/or the index "3" (e.g., the value "3") may be configured as the index of the configuration(s) for the each of the multiple configurations of the configured grant.

For example, the index "0" may be configured for a first configuration of the multiple configurations of the configured grant (e.g., as the configuration index #0). Also, the index "1" may be configured for a second configuration of the multiple configurations of the configured grant (e.g., as the configuration index #1). Also, the index "2" may be configured for a third configuration of the multiple configurations of the configured grant (e.g., as the configuration index #2). Also, the index "1" may be configured for a fourth configuration of the multiple configurations of the configured grant (e.g., as the configuration index #3).

For example, in a case that the multiple configurations of the PUSCH (e.g., four configurations of the PUSCH) are configured, the index "0", the index "1", the index "2" and/or the index "3" may be configured as the index of the configuration(s) for the each of the multiple configurations of the PUSCH 503. For instance, in a case the multiple configurations of the PUSCH 503 (e.g., four configurations of the PUSCH 503) are configured, the index "0", the index "1", the index "2" and/or the index "3" may be configured as the index of the configuration(s) for the each of the multiple configurations of the PUSCH 503.

For example, the index "0" may be configured for a first configuration of the multiple configurations of the PUSCH (e.g., as the configuration index #0). Also, the index "1" may be configured for a second configuration of the multiple configurations of the PUSCH (e.g., as the configuration index #1). Also, the index "2" may be configured for a third configuration of the multiple configurations of the PUSCH (e.g., as the configuration index #2). Also, the index "1" may be configured for a fourth configuration of the multiple configurations of the PUSCH (e.g., as the configuration index #3).

And, in a case that the index of the configuration of the configured grant and the index of the configuration of the PUSCH 503 is the same, the configuration of the configured grant may be linked with the configuration of the PUSCH 503. For instance, the configuration of the configured grant and the configuration of the PUSCH 503 may be linked in a case that the index of the configuration of the configured grant and the index of the configuration of the PUSCH 503 is the same.

In some examples, one of the multiple configurations of the configured grant (e.g., the configuration of the configured grant with the index "X (X=0, 1, 2, or 3)" (e.g., an index corresponding to the one of the multiple configurations of the configured grant)) may be defined, in advance, by the specification, and may be known information between the gNB 160 and the UE 102. Additionally or alternatively, the one of the multiple configurations of the configured grant may be configured by the gNB 160. For example, the gNB 160 may transmit, by using the RRC message, information used for configuring the one of the multiple configurations of the configured grant (e.g., the index corresponding to the one or the multiple configurations of the configured grant). The UE 102 may identify the one of the multiple configurations of the configured grant (e.g., the index corresponding to the one of the multiple configurations of the configured grant) based on the information. In some examples, the one of the multiple configurations of the configured grant may be referred to as a configuration with the index "X". For instance, the index corresponding to the one of the multiple configurations of the configured grant may be referred to as the index "X".

As described above, the configuration with the index "X" may be the configuration with the index "0". Additionally or alternatively, the configuration with the index "X" may be the configuration with the index "1". Additionally or alternatively, the configuration with the index "X" may be the configuration with the index "2". Additionally or alternatively, the configuration with the index "X" may be the configuration with the index "3". For instance, the configuration with the index "X" may be the configuration with the index of "a predetermined value".

Additionally or alternatively, the index of the configuration of the configured grant may not be configured for (e.g., applied for) the configuration with the index "X". For example, the index of the configuration of the configured grant may be configured only for (e.g., applied only for) the configuration of the configured grant other than the configuration with the index "X".

Additionally or alternatively, in a case that the single configuration of the configured grant is used, the single configuration of the configured grant may correspond to the configuration with the index "X". Additionally or alternatively, in a case that the single configuration of the configured grant is used, the single configuration of the PUSCH 503 may be linked with the configuration with the index "X". Additionally or alternatively, in a case that the single configuration of the PUSCH 503 is used, the single configuration of the PUSCH 503 may be linked with the configuration with the index "X".

In some examples, the configuration of the configured grant other than the configuration with the index "X" may include a part of the parameters included in the PUSCH-config. And, the configuration with the index "X" may not include a part of the parameters included in the PUSCH-config.

For instance, the configuration of the configured grant other than the configuration with the index "X" may include dataScramblingIdentityPUSCH, txConfig, PUSCH-PowerControl, frequencyHopping, pusch-TimeDomainAllocationList, pusch-AggregationFactor, mcs-Table, mcs-TableTransformPrecoder, and/or scaling of UCI-OnPUSCH.

For example, the configuration of the configured grant other than the configuration with the index "X" may include dataScramblingIdentityPUSCH, txConfig, and/or scaling of UCI-OnPUSCH. And, the configuration of the configured grant other than the configuration with the index "X" may not include PUSCH-PowerControl, frequencyHopping, pusch-TimeDomainAllocationList, pusch-AggregationFactor, mcs-Table, and/or mcs-TableTransformPrecoder.

For instance, in a case that the multiple configurations of the configured grant are configured, a part of the parameters (e.g., described as the parameter(s) included in the PUSCH-config) may be configured in the ConfiguredGrantConfig IE (e.g., the ConfiguredGrantConfig and/or the rrc-ConfiguredUplinkGrant).

Additionally or alternatively, the configuration of the PUSCH 503 linked with the configuration of the configured grant other than the configuration with the index "X" may include a part of the parameter(s) (e.g., a part of the parameters included in the PUSCH-config). And, the configuration of the PUSCH 503 linked with the configuration with the index "X" may include the parameter(s) (e.g., the all parameters included in the PUSCH-config described above).

For instance, the configuration of the PUSCH 503 linked with the configuration of the configured grant other than the configuration with the index "X" may not include dataScramblingIdentityPUSCH, txConfig, PUSCH-PowerControl, frequencyHopping, pusch-TimeDomainAllocationList, pusch-AggregationFactor, mcs-Table, mcs-TableTransformPrecoder, and/or scaling of UCI-OnPUSCH.

For example, the configuration of the PUSCH 503 linked with the configuration of the configured grant other than the configuration with the index "X" may include dataScramblingIdentityPUSCH, txConfig tpc-Accumulation, and/or scaling of UCI-OnPUSCH. And, the configuration of the PUSCH 503 linked with the configuration of the configured grant other than the configuration with the index "X" may not include p0-NominalWithoutGrant, p0-Alpha, frequencyHopping, pusch-TimeDomainAllocationList, pusch-AggregationFactor, mcs-Table, and/or mcs-TableTransformPrecoder.

For instance, only a part of the parameters (e.g., the parameters included in the PUSCH-config) may be configured to the multiple configurations (e.g., the multiple configurations of the PUSCH 503). For instance, based on that the multiple configurations of the configured grant are configured, a part of the parameters (e.g., a part of the parameters included in the PUSCH-config) may be configured to the multiple configurations.

In some examples, in a case that the single configuration of the configured grant is configured (i.e., in a case that the multiple configurations of the configured grant are not configured), the UE 102 may perform the transmission(s) corresponding to the configured grant(s) based on the single configuration of the configured grant(s).

For example, for the configured grant Type 1 transmission, in a case that the configuration of the configured grant with the index "1" is configured, the UE 102 may perform the transmission corresponding to the configured grant based on the configuration of the configured grant with the index "1" (i.e., the parameter(s) included in the configuration of the configured grant with the index "1"). Additionally or alternatively, as described above, for the configured grant Type 1 transmission, in a case that the single configuration of the configured grant is configured, the UE 102 may perform the transmission corresponding to the configured grant based on the configuration with the index "X". For instance, in a case that the single configuration of the configured grant is configured, the configuration with the index "X" may be always applied for the transmission corresponding to the configured grant.

Additionally or alternatively, for the configured grant Type 2 transmission, in a case that the single configuration of the configured grant is configured, the UE 102 may identify the index of the configuration of the configured grant (i.e., the index of the configuration of the configured grant to be applied for the transmission) based on the information included in the DCI format(s) with the CRC scrambled by the CS-RNTI (e.g., the DCI format(s) used for indicating the activation of the configured grant). For instance, the DCI format(s) may include the information used for indicating the index of the configuration of the configured grant.

For example, for the configured grant Type 2 transmission, in a case that the single configuration of the configured grant is configured and the configuration of the configured grant with the index "1" is indicated by using the DCI format(s) with the CRC scrambled by the CS-RNTI, the UE 102 may perform the transmission corresponding to the configured grant based on the configuration of the configured grant with the index "1" (i.e., the parameter(s) included in the configuration of the configured grant with the index "1"). For instance, the configuration of the configured grant with the index "1" may be activated by using the DCI format(s) with the CRC scrambled by the CS-RNTI. Additionally or alternatively, as described above, for the configured grant Type 2 transmission, in a case that the single configuration of the configured grant is configured, the UE 102 may perform the transmission corresponding to the configured grant based on the configuration with the index "X". For instance, in a case that the single configuration of the configured grant is configured, the configuration with the index "X" may be always applied for the transmission corresponding to the configured grant.

Additionally or alternatively, for the retransmission(s) scheduled by using the DCI format(s) with the CRC scrambled by the CS-RNTI with the NDI set to "1", in a case that the single configuration of the configured grant is configured, the UE 102 may identify the index of the configuration of the PUSCH 503 (i.e., the index of the configuration of the PUSCH 503 to be applied for the transmission) based on the information included in the DCI format(s) with the CRC scrambled by the CS-RNTI with the NDI set to "1". For instance, the DCI format(s) for the uplink may include the information used for indicating the index of the configuration of the PUSCH 503.

For example, in a case that the single configuration of the configured grant is configured and the configuration of the PUSCH 503 with the index "1" is indicated by using the DCI format(s) with the CRC scrambled by the CS-RNTI with the NDI set to "1", the UE 102 may perform the retransmission(s) based on the configuration of the PUSCH 503 with the index "1" (i.e., the parameter(s) included in the configuration of the PUSCH 503 with the index "1"). For instance, the configuration of the PUSCH 503 with the index "1" may be activated by using the DCI format(s) with the CRC scrambled by the CS-RNTI with the NDI set to "1". Additionally or alternatively, as described above, in a case that the single configuration of the configured grant is configured, the UE 102 may perform the retransmission(s) based on the configuration of the PUSCH 503 linked with the configuration with the index "X". For instance, in a case that the single configuration of the configured grant is configured, the configuration of the PUSCH 503 linked with the configuration with the index "X" may be always applied for the retransmission(s).

Additionally or alternatively, only in a case that the multiple configurations of the configured grant are configured, the information used for indicating the index of the configuration of the configured grant may be included in the DCI format(s). For instance, in a case that the single configuration of the configured grant is configured, the information used for indicating the index of the configuration of the configured grant may not be included in the DCI format(s) for the uplink grant. In some examples, as described below, the information used for indicating the index of the configuration of the configured grant may be included in only the DCI format 0_1.

Additionally or alternatively, only in a case that the multiple configurations of the configured grant are configured, the information used for indicating the index of the configuration of the PUSCH 503 may be included in the DCI format(s). For instance, in a case that the single configuration of the configured grant is configured, the information used for indicating the index of the configuration of the PUSCH 503 may not be included in the DCI format(s). In some examples, as described below, the information used for indicating the index of the configuration of the PUSCH 503 may be included in only the DCI format 0_1.

Additionally or alternatively, in a case that the multiple configurations of the configured grant are configured, the UE 102 may perform the transmission(s) corresponding to the configured grant(s) based on the multiple configurations of the configured grant(s).

For example, for the configured grant Type 1 transmission, in a case that the configuration with the index "1" and the configurations with the index with "3" are configured, the UE 102 may perform the transmission corresponding to the configured grant based on the configuration of the configured grant with the index "1" and the configuration of the configured grant with index "3" (i.e., the parameter(s) included in the configuration of the configured grant with the index "1" and the parameter(s) included in the configuration of the configured grant with the index "3").

Additionally or alternatively, for the configured grant Type 2 transmission, in a case that the multiple configurations of the configured grant are configured, the UE 102 may identify the index of the configuration(s) of the configured grant(s) (i.e., the index of the configuration(s) of the configured grant(s) to be applied for the transmission) based on the information included in the DCI format(s) with the CRC scrambled by the CS-RNTI (e.g., the DCI format(s) used for indicating the activation of the configured grant).

For example, for the configured grant Type 2 transmission, in a case that the multiple configurations of the configured grant are configured and the configuration of the configured grant with the index "1" is indicated by using the DCI format(s) with the CRC scrambled by the CS-RNTI, the UE 102 may perform the transmission corresponding to the configured grant based on the configuration with the index "1" (i.e., the parameter(s) included in the configuration of the configured grant with the index "1"). For instance, the configuration of the configured with the index "1" may be activated by using the DCI format(s) with the CRC scrambled by the CS-RNTI. Also, in a case that the multiple configurations of the configured grant are configured and the configuration of the configured grant with the index "3" is indicated by the DCI format(s) with the CRC scrambled by the CS-RNTI, the UE 102 may perform the transmission corresponding to the configured grant based on the configuration with the index "3" (i.e., the parameter(s) included in the configuration of the configured grant with the index "3"). For instance, the configuration of the configured grant with the index "3" may be activated by using the DCI format(s) with the CRC scrambled by the CS-RNTI.

In some examples, the multiple configurations of the configured grant may be activated concurrently (e.g., in overlapping time periods, simultaneously, or at the same time) by using the single DCI format with the CRC scrambled by the CS-RNTI. For instance, the single DCI format may include the information used for indicating one or more indices of the configuration(s) of the configured grant to be applied for the transmission corresponding to the configured grant. For example, in a case that the multiple configurations are configured, and the configuration of the configured grant with the index "1" and the configuration of the configured grant with the index "3" are indicated, the UE 102 may perform the transmission corresponding to the configured grant based on the configuration of the configured grant with the index "1" and the configuration of the configured grant with the index "3".

Additionally or alternatively, for the retransmission(s) scheduled by using the DCI format(s) with the CRC scrambled by the CS-RNTI with the NDI set to "1", in a case that the multiple configurations of the configured grant are configured, the UE 102 may identify the index of the configuration of the PUSCH 503 (i.e., the index of the configuration of the PUSCH 503 to be applied for the transmission) based on the information included in the DCI format(s) with the CRC scrambled by the CS-RNTI with the NDI set to "1". For instance, the DCI format(s) for the uplink may include the information used for indicating the index of the configuration of the PUSCH 503.

For example, in a case that the multiple configurations of the configured grant are configured and the configuration of the PUSCH 503 with the index "1" is indicated by using the DCI format(s) with the CRC scrambled by the CS-RNTI with the NDI set to "1", the UE 102 may perform the retransmission(s) based on the configuration of the PUSCH 503 with the index "1" (i.e., the parameter(s) included in the configuration of the PUSCH 503 with the index "1"). For instance, the configuration of the PUSCH 503 with the index "1" may be activated by using the DCI format(s) with the CRC scrambled by the CS-RNTI with the NDI set to "1". Also, in a case that the multiple configurations of the configured grant are configured and the configuration of the PUSCH 503 with the index "3" is indicated by using the DCI format(s) with the CRC scrambled by the CS-RNTI with the NDI set to "1", the UE 102 may perform the retransmission(s) based on the configuration of the PUSCH 503 with the index "3" (i.e., the parameter(s) included in the configuration of the PUSCH 503 with the index "3"). For instance, the configuration of the PUSCH 503 with the index "3" may be activated by using the DCI format(s) with the CRC scrambled by the CS-RNTI with the NDI set to "1".

In some examples, the multiple configurations of the PUSCH 503 may be activated concurrently (e.g., in overlapping time periods, simultaneously, or at the same time) by using the single DCI format with the CRC scrambled by the CS-RNTI with the NDI set to "1". For instance, the single DCI format may include the information used for indicating one or more indices of the configuration(s) of the PUSCH 503 to be applied for the retransmission(s). For example, in a case that the multiple configurations are configured, and the configuration of the PUSCH 503 with the index "1" and the configuration of the PUSCH 503 with the index "3" are indicated, the UE 102 may perform the retransmission(s) based on the configuration of the PUSCH 503 with the index "1" and the configuration of the PUSCH 503 with the index "3".

Additionally or alternatively, for the transmission(s) corresponding to the configured grant(s) (i.e., the configured grant Type 1 and/or the configured grant Type 2), the UE 102 may apply the parameter(s) provided by the ConfiguredGrantConfig expect for dataScramblingIdentityPUSCH, txConfig, and/or scaling of UCI-OnPUSCH, which are provided by the PUSCH-config. For instance, for the transmission(s) corresponding to the configured grant(s), the UE 102 may apply a part of the parameter(s) included in the ConfiguredGrantConfig. Also, for the transmission(s) corresponding to the configured(s), the UE 102 may apply a part of the parameter(s) (e.g., dataScramblingIdentityPUSCH, txConfig, and/or scaling of UCI-OnPUSCH) included in the PUSCH-config.

Additionally or alternatively, for the retransmission(s) scheduled by using the DCI format(s) with the CRC scrambled by the CS-RNTI with the NDI set to "1", the UE 102 may apply the parameter(s) provided the PUSCH-config expect for p0-NominalWithoutGrant, p0-PUSCH-Alpha, mcs-Table, mcs-TableTransformPrecoder, and/or transformPrecoder.

For example, for the retransmission(s) scheduled by using the DCI format(s) with the CRC scrambled by the CS-RNTI with the NDI set to "1", the UE 102 may apply the parameter(s) provides the PUSCH-config expect for p0-NominalWithoutGrant, p0-PUSCH-Alpha, mcs-Table, mcs-TableTransformPrecoder, and/or transformPrecoder. And, instead of p0-NominalWithoutGrant, p0-PUSCH-Alpha, mcs-Table, mcs-TableTransformPrecoder, and/or transformPrecoder included in the PUSCH-config, p0-PUSCH- Alpha, mcs-Table, mcs-TableTransformPrecoder, and/or transformPrecoder included in the ConfiguredGrantConfig may be applied for the retransmission(s). For instance, for the retransmission(s) scheduled by using the DCI format(s) with the CRC scrambled by the CS-RNTI with the NDI set to "1", the UE 102 may apply a part of the parameter(s) (e.g., p0-PUSCH-Alpha, mcs-Table, mcs-TableTransformPrecoder, and/or transformPrecoder) included in the ConfiguredGrantConfig. Also, for the retransmission(s) scheduled by using the DCI format(s) with the CRC scrambled by the CS-RNTI with the NDI set to "1", the UE 102 may apply a part of the parameter(s) included in the PUSCH-config.

In some examples, in a case that the UE 102 applies a part of parameter(s) included in the ConfiguredGrantConfig and a part of parameter(s) included in the PUSCH-config, the configuration of the configured grant and the configuration of the PUSCH 503 that are linked may be used for the (re)transmission.

For instance, for the (re)transmission(s), in a case that the configuration of the configured grant with the index "0" is applied (i.e., in a case that a part of the parameter(s) of the configuration of the configured grant with the index "0" is applied), the configuration of the PUSCH 503 with the index "0" (i.e., a part of the parameter(s) of the configuration of the PUSCH 503 with the index "0") may be applied. Also, for the (re)transmission(s), in a case that the configuration of the configured grant with the index "1" is applied (i.e., in a case that a part of the parameter(s) of the configuration of the configured grant with the index "1" is applied), the configuration of the PUSCH 503 with the index "1" (i.e., a part of the parameter(s) of the configuration of the PUSCH 503 with the index "1") may be applied. Also, for the (re)transmission(s), in a case that the configuration of the configured grant with the index "2" is applied (i.e., in a case that a part of the parameter(s) of the configuration of the configured grant with the index "2" is applied), the configuration of the PUSCH 503 with the index "2" (i.e., a part of the parameter(s) of the configuration of the PUSCH 503 with the index "2") may be applied. Also, for the (re)transmission(s), in a case that the configuration of the configured grant with the index "3" is applied (i.e., in a case that a part of the parameter(s) of the configuration of the configured grant with the index "3" is applied), the configuration of the PUSCH 503 with the index "3" (i.e., a part of the parameter(s) of the configuration of the PUSCH 503 with the index "3") may be applied.

Also, for the (re)transmission(s), in a case that the configuration of the configured grant with the index "X" is applied (i.e., in a case that a part of the parameter(s) of the configuration of the configured grant with the index "X" is applied), the configuration of the PUSCH 503 linked with the configured with the index "X" (i.e., a part of the parameter(s) of the configuration of the PUSCH 503 linked with the configuration with the index "X") may be applied.

Additionally or alternatively, for the (re)transmission(s), in a case that the configuration of the PUSCH 503 with the index "0" is applied (i.e., in a case that a part of the parameter(s) of the configuration of the PUSCH 503 with the index "0" is applied), the configuration of the configured grant with the index "0" (i.e., a part of the parameter(s) of the configuration of the configured grant with the index "0") may be applied. Also, for the (re)transmission(s), in a case that the configuration of the PUSCH 503 with the index "1" is applied (i.e., in a case that a part of the parameter(s) of the configuration of the PUSCH 503 with the index "1" is applied), the configuration of the configured grant with the index "1" (i.e., a part of the parameter(s) of the configuration of the configured grant with the index "1") may be applied. Also, for the (re)transmission(s), in a case that the configuration of the PUSCH 503 with the index "2" is applied (i.e., in a case that a part of the parameter(s) of the configuration of the PUSCH 503 with the index "2" is applied), the configuration of the configured grant with the index "2" (i.e., a part of the parameter(s) of the configuration of the configured grant with the index "2") may be applied. Also, for the (re)transmission(s), in a case that the configuration of the PUSCH 503 with the index "3" is applied (i.e., in a case that a part of the parameter(s) of the configuration of the PUSCH 503 with the index "3" is applied), the configuration of the configured grant with the index "3" (i.e., a part of the parameter(s) of the configuration of the configured grant with the index "3") may be applied.

Also, for the (re)transmission(s), in a case that the configuration of the PUSCH 503 linked with the configuration with the index "X" is applied (i.e., in a case that a part of the parameter(s) of the configuration of the PUSCH 503 linked with the configuration with the index "X" is applied), the configuration with the index "X" (i.e., a part of the parameter(s) of the configuration with the index "X") may be applied.

Additionally or alternatively, the single configuration of the configured grant and/or the single configuration of the PUSCH 503 described herein may be assumed to be included in a single configuration "A" in some implementations for the sake of simple descriptions. Also, the multiple configurations of the configured grant and/or the multiple configurations of the PUSCH 503 described herein may be assumed to be included in multiple configurations "B" in some implementations for the sake of simple descriptions.

As described above, the information used for indicating the index of the configuration of the configured grant may be included in only the DCI format 0_1 (i.e., the DCI format 0_1 with the CRC scrambled by the CS-RNTI). For instance, the DCI format 0_0 may not include the information used for indicating the index of the configuration of the configured grant.

For example, in a case that the multiple configurations of the configured grant are configured, based on the detection (e.g., detection, decoding) of the DCI format 0_1 with the CRC scrambled by the CS-RNTI (e.g., with the NDI set to "0"), the UE 102 may perform the transmission corresponding to the configured grant based on the multiple configurations "B" (e.g., as described above).

Additionally or alternatively, in a case that the multiple configurations of the configured grant, based on the detection of the DCI format 0_1 with the CRC scrambled by the CS-RNTI (e.g., with the NDI set to "1"), the UE 102 may perform the retransmission (e.g., the retransmission of the TB(s)) based on the multiple configurations "B" (e.g., as described above).

Additionally or alternatively, in a case that the DCI format 0_0 with the CRC scrambled by the CS-RNTI (e.g., with the NDI set to "0") is detected, the UE 102 may perform the transmission corresponding to the configured grant based on the single configuration "A" (e.g., as described above). For instance, even if the multiple configurations of the configured grant are configured, in a case that the DCI format 0_0 with the CRC scrambled by the CS-RNTI (e.g., with the NDI set to "0") is detected, the UE 102 may perform the transmission corresponding to the configured grant based on the single configuration "A".

For example, in a case that the DCI format 0_0 with the CRC scrambled by the CS-RNTI (e.g., with the NDI set to "0") is detected, the UE 102 may perform the transmission corresponding to the configured grant based on the configuration with the index "X" and/or the configuration of the PUSCH 503 linked with the configuration with the index "X".

Additionally or alternatively, in a case that the DCI format 0_0 with the CRC scrambled by the CS-RNTI (e.g., with the NDI set to "1") is detected, the UE 102 may perform the retransmission (e.g., the retransmission of the TB(s)) based on the single configuration "A" (e.g., as described above). For instance, even if the multiple configurations of the configured grant are configured, in a case that the DCI format 0_0 with the CRC scrambled by the CS-RNTI (e.g., with the NDI set to "1") is detected, the UE 102 may perform the retransmission based on the single configuration "A".

For example, in a case that the DCI format 0_0 with the CRC scrambled by the CS-RNTI (e.g., with the NDI set to "1") is detected, the UE 102 may perform the retransmission based on the configuration with the index "X" and/or the configuration of the PUSCH 503 linked with the configuration with the index "X".

Additionally or alternatively, in a case that the DCI format(s) (e.g., the DCI format 0_0 and/or the DCI format 0_1) with the CRC scrambled by the CS-RNTI (e.g., with the NDI set to "0") is detected in the CSS (i.e., the CSS set), the UE 102 may perform the transmission corresponding to the configured grant based on the single configuration "A" (e.g., as described above). For instance, even if the multiple configurations of the configured grant are configured, in a case that the DCI format(s) (e.g., the DCI format 0_0 and/or the DCI format 0_1) with the CRC scrambled by the CS-RNTI (e.g., with the NDI set to "0") is detected in the CSS, the UE 102 may perform the transmission corresponding to the configured grant based on the single configuration "A". For instance, in a case that the DCI format(s) (e.g., the DCI format 0_0 and/or the DCI format 0_1) with the CRC scrambled by the CS-RNTI (e.g., with the NDI set to "0") is detected in the USS (i.e., the USS set), the UE 102 may perform the transmission corresponding to the configured grant based on the multiple configurations "B" (e.g., as described above).

For example, in a case that the DCI format(s) (e.g., the DCI format 0_0 and/or the DCI format 0_1) with the CRC scrambled by the CS-RNTI (e.g., with the NDI set to "0") is detected in the CSS (i.e., the CSS set), the UE 102 may perform the transmission corresponding to the configured grant based on the configuration with the index "X" and/or the configuration of the PUSCH 503 linked with the configuration with the index "X".

Additionally or alternatively, in a case that the DCI format(s) (e.g., the DCI format 0_0 and/or the DCI format 0_1) with the CRC scrambled by the CS-RNTI (e.g., with the NDI set to "0") is detected in the CSS (i.e., the CSS set), the UE 102 may perform the retransmission (e.g., the retransmission of the TB(s)) based on the single configuration "A" (e.g., as described above). For instance, even if the multiple configurations of the configured grant are configured, in a case that the DCI format(s) (e.g., the DCI format 0_0 and/or the DCI format 0_1) with the CRC scrambled by the CS-RNTI (e.g., with the NDI set to "0") is detected in the CSS (i.e., the CSS set), the UE 102 may perform the retransmission based on the single configuration "A".

For example, in a case that the DCI format(s) (e.g., the DCI format 0_0 and/or the DCI format 0_1) with the CRC scrambled by the CS-RNTI (e.g., with the NDI set to "0") is detected in the CSS (i.e., the CSS set), the UE 102 may perform the retransmission based on the configuration with the index "X" and/or the configuration of the PUSCH 503 linked with the configuration with the index "X".

Additionally or alternatively, in a case that the DCI format(s) (e.g., the DCI format 0_0 and/or the DCI format 0_1) with the CRC scrambled by the CS-RNTI (e.g., with the NDI set to "0") is detected in the CORESET #0, the UE 102 may perform the transmission corresponding to the configured grant based on the single configuration "A" (e.g., as described above). For instance, even if the multiple configurations of the configured grant are configured, in a case that the DCI format(s) (e.g., the DCI format 0_0 and/or the DCI format 0_1) with the CRC scrambled by the CS-RNTI (e.g., with the NDI set to "0") is detected in the CORESET #0, the UE 102 may perform the transmission corresponding to the configured grant based on the single configuration "A". For instance, in a case that the DCI format(s) (e.g., the DCI format 0_0 and/or the DCI format 0_1) with the CRC scrambled by the CS-RNTI (e.g., with the NDI set to "0") is detected in the CORESET(s) other than the CORESET #0, the UE 102 may perform the transmission corresponding to the configured grant based on the multiple configurations "B" (e.g., as described above).

For example, in a case that the DCI format(s) (e.g., the DCI format 0_0 and/or the DCI format 0_1) with the CRC scrambled by the CS-RNTI (e.g., with the NDI set to "0") is detected in the CORESET #0, the UE 102 may perform the transmission corresponding to the configured grant based on the configuration with the index "X" and/or the configuration of the PUSCH 503 linked with the configuration with the index "X".

Additionally or alternatively, in a case that the DCI format(s) (e.g., the DCI format 0_0 and/or the DCI format 0_1) with the CRC scrambled by the CS-RNTI (e.g., with the NDI set to "0") is detected in the CORESET #0, the UE 102 may perform the retransmission (e.g., the retransmission of the TB(s)) based on the single configuration "A" (e.g., as described above). For instance, even if the multiple configurations of the configured grant are configured, in a case that the DCI format(s) (e.g., the DCI format 0_0 and/or the DCI format 0_1) with the CRC scrambled by the CS-RNTI (e.g., with the NDI set to "0") is detected in the CORESET #0, the UE 102 may perform the retransmission based on the single configuration "A".

For example, in a case that the DCI format(s) (e.g., the DCI format 0_0 and/or the DCI format 0_1) with the CRC scrambled by the CS-RNTI (e.g., with the NDI set to "0") is detected in the CORESET #0, the UE 102 may perform the retransmission based on the configuration with the index "X" and/or the configuration of the PUSCH 503 linked with the configuration with the index "X".

Additionally or alternatively, in a case that the DCI format(s) (e.g., the DCI format 0_0 and/or the DCI format 0_1) with the CRC scrambled by the CS-RNTI (e.g., with the NDI set to "0") is detected in the search space set with the index "0" (i.e., a search space set #0), the UE 102 may perform the transmission corresponding to the configured grant based on the single configuration "A" (e.g., as described above). For instance, even if the multiple configurations of the configured grant are configured, in a case that the DCI format(s) (e.g., the DCI format 0_0 and/or the DCI format 0_1) with the CRC scrambled by the CS-RNTI (e.g., with the NDI set to "0") is detected in the search space set #0, the UE 102 may perform the transmission corresponding to the configured grant based on the single configuration "A". For instance, in a case that the DCI format(s) (e.g., the DCI format 0_0 and/or the DCI format 0_1) with the CRC scrambled by the CS-RNTI (e.g., with the NDI set to "0") is detected in the search space other than the search space set #0, the UE 102 may perform the transmission corresponding to the configured grant based on the multiple configurations "B" (e.g., as described above).

For example, in a case that the DCI format(s) (e.g., the DCI format 0_0 and/or the DCI format 0_1) with the CRC scrambled by the CS-RNTI (e.g., with the NDI set to "0") is detected in the search space set #0, the UE 102 may perform the transmission corresponding to the configured grant based on the configuration with the index "X" and/or the configuration of the PUSCH 503 linked with the configuration with the index "X".

Additionally or alternatively, in a case that the DCI format(s) (e.g., the DCI format 0_0 and/or the DCI format 0_1) with the CRC scrambled by the CS-RNTI (e.g., with the NDI set to "0") is detected in the search space set #0, the UE 102 may perform the retransmission (e.g., the retransmission of the TB(s)) based on the single configuration "A" (e.g., as described above). For instance, even if the multiple configurations of the configured grant are configured, in a case that the DCI format(s) (e.g., the DCI format 0_0 and/or the DCI format 0_1) with the CRC scrambled by the CS-RNTI (e.g., with the NDI set to "0") is detected in the search space set #0, the UE 102 may perform the retransmission based on the single configuration "A".

For example, in a case that the DCI format(s) (e.g., the DCI format 0_0 and/or the DCI format 0_1) with the CRC scrambled by the CS-RNTI (e.g., with the NDI set to "0") is detected in the search space set #0, the UE 102 may perform the retransmission based on the configuration with the index "X" and/or the configuration of the PUSCH 503 linked with the configuration with the index "X".

Also, a grouping of the configuration(s) of the configured grant may be supported. For example, the gNB 160 may transmit, by using the RRC message, information used for configuring a correspondence of a configured grant configuration group (e.g., a configured grant configuration group with an index) and the configuration(s) of the configured grant (e.g., the configuration(s) of the configured grant with an index). For example, the configuration of the configured grant with the index "0" may be corresponding to the configured grant configuration group with the index "0". Also, the configuration of the configured grant with the index "1" may be corresponding to the configured grant configuration group with the index "1". Also, the configuration of the configured grant with the index "2" may be corresponding to the configured grant configuration group with the index "0". For instance, the configuration of the configured grant with the index "0" and the configuration of the configured grant with the index "2" may belong to the same group (i.e., the configured grant configuration group "0"). Also, the configuration of the configured grant with the index "4" may be corresponding to the configured grant configuration group with the index "1". For instance, the configuration of the configured grant with the index "1" and the configuration of the configured grant with the index "4" may belong to the same group (i.e., the configured grant configuration group "1").

Also, a grouping of the configuration(s) of the PUSCH may be supported. For example, the gNB 160 may transmit, by using the RRC message, information used for configuring a correspondence of a PUSCH configuration group (e.g., a PUSCH configuration group with an index) and the configuration(s) of the PUSCH (e.g., the configuration(s) of the PUSCH with an index). For example, the configuration of the PUSCH with the index "0" may be corresponding to the PUSCH configuration group with the index "1". Also, the configuration of the PUSCH with the index "1" may be corresponding to the PUSCH configuration group with the index "0". Also, the configuration of the PUSCH with the index "2" may be corresponding to the PUSCH configuration group with the index "0". For instance, the configuration of the PUSCH with the index "1" and the configuration of the PUSCH with the index "2" may belong to the same group (i.e., the PUSCH configuration group "0"). Also, the configuration of the PUSCH with the index "3" may be corresponding to the PUSCH configuration group with the index "1". For instance, the configuration of the PUSCH with the index "0" and the configuration of the PUSCH with the index "3" may belong to the same group (i.e., the PUSCH configuration group "1").

For instance, in the systems and methods disclosed herein, the configuration(s) of the configured grant (e.g., the configuration of the configured grant with the index) may be replaced by the configured grant configuration group (e.g., the configured grant configured group with the index). In some examples, the configured grant configuration group may include one or more configurations of the configured grant (e.g., one or more configurations of the configured grant with the index). For example, the configuration(s) of the configured grant with the index "X" may be replaced by the configured grant configuration group with the index "X".

Also, in the systems and methods disclosed herein, the configuration(s) of the PUSCH (e.g., the configuration(s) of the PUSCH with the index) may be replaced by the PUSCH configuration group (e.g., the PUSCH configuration group with the index). In some examples, the PUSCH configuration group may include one or more PUSCH configurations (e.g., one or more PUSCH configurations with the index).

Figure 6:
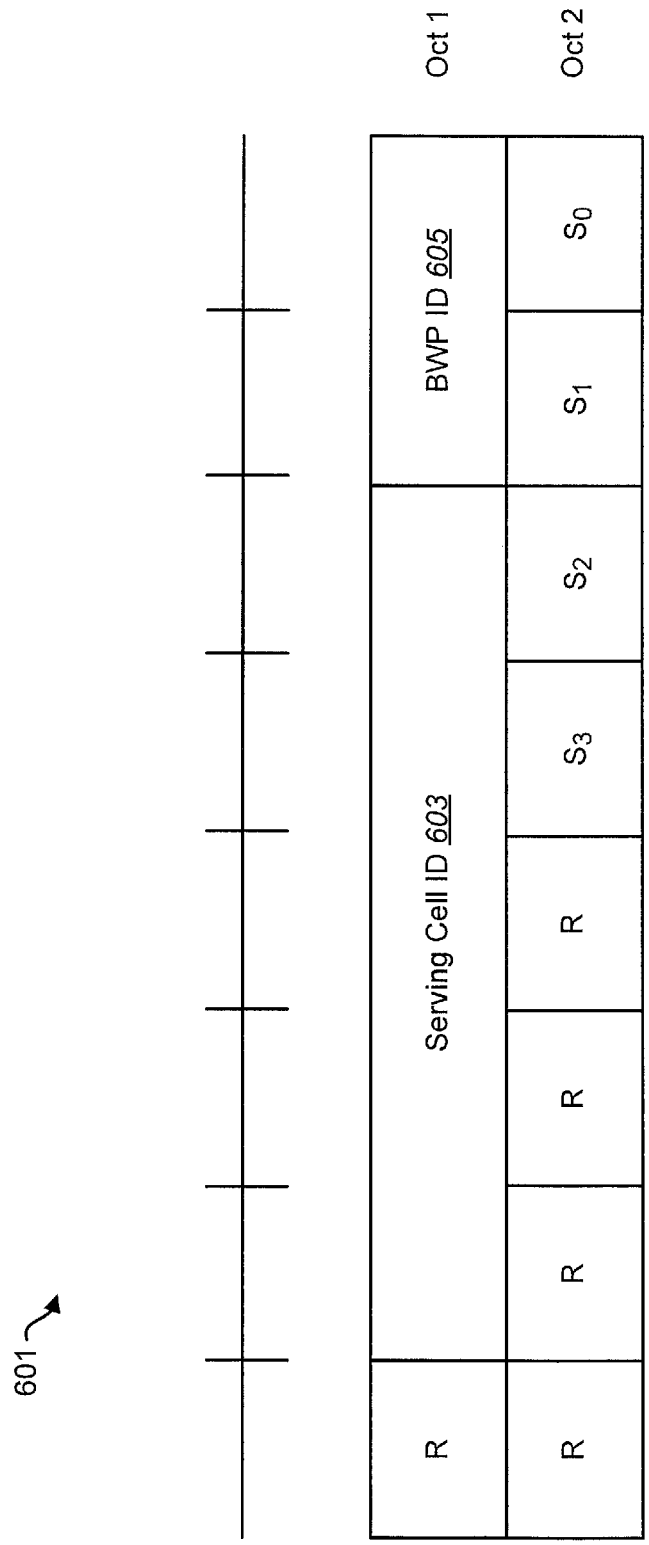
FIG. 6 illustrates an example of a configured grant confirmation medium access control (MAC) control element (CE).

FIG. 6 illustrates an example of a configured grant confirmation medium access control (MAC) control element (CE) 601. As described above, for the configured grant type 2, the gNB 160 may transmit the DCI format(s) (e.g., a second DCI and/or the PDCCH) used for indicating the activation of the configured grant (e.g., the configured grant corresponding to the configuration(s) of the configured grant with the index). For example, based on the reception of the DCI format(s) (e.g., the second DCI and/or the PDCCH) used for indicating the activation of the configured grant (e.g., the configured grant corresponding to the configuration of the configured grant with the index "2"), the UE 102 may perform a transmission on the PUSCH (e.g., perform the transmission on the PUSCH based on the parameters configured by the configuration of the configured grant with the index "2"). Also, based on the reception of the DCI format(s) used for indicating the activation of the configured grants (e.g., the configured grant corresponding to the configuration of the configured grant with the index "2" and the configured grant corresponding to the configuration of the configured grant with the index "3"), the UE 102 may perform transmission(s) on the PUSCH(s) (e.g., perform the transmission(s) on the PUSCH(s) based on the parameters configured by the configuration of the configured grant with the index "2" and/or the parameters configured by the configuration of the configured grant with the index "3").

Additionally or alternatively, for the configured grant type 2, the gNB 160 may transmit the DCI format(s) (e.g., a first DCI and/or the PDCCH) used for indicating the deactivation of the configured grant (e.g., the configured grant corresponding to the configuration(s) of the configured grant with the index). For example, based on the reception of the DCI format(s) (e.g., the first DCI and/or the PDCCH) used for indicating the deactivation of the configured grant (e.g., the configured grant corresponding to the configuration of the configured grant with the index "2"), the UE 102 may clear the configured grant (e.g., clear the configured grant corresponding to the configurations of the configured grant with the index "2"). Also, based on the reception of the DCI format(s) used for indicating the deactivation of the configured grants (e.g., the configured grant corresponding to the configuration of the configured grant with the index "2" and the configured grant corresponding to the configuration of the configured grant with the index "3"), the UE 102 may clear the configured grants (e.g., clear the configured grant corresponding to the configuration of the configured grant with the index "2" and the configured grant corresponding to the configuration of the configured grant with the index "3"). For instance, based on the reception of the DCI format(s) used for the deactivation of the configured grant corresponding to the configuration of the configured grant with the index, the UE 102 may clear a corresponding configured grant(s) (e.g., clear only a corresponding configured grant(s)), and keep storing the configured grant(s) not corresponding to the configuration of the configured grant with the index.

For instance, for the configured grant type 2, the UE 102 may clear the configured grant(s) (e.g., the corresponding configured grant(s) to the configuration(s) of the configured grant(s) which is deactivated). In some examples, the UE 102 may clear the configured grant(s) immediately after first transmission of configured grant confirmation MAC CE 601. For instance, based on the reception of the DCI format(s) used for the deactivation of the configured grant, the configured grant confirmation MAC CE 601 may be triggered. For example, the UE 102 may trigger the configured grant confirmation MAC CE 601, and clear the configured grant(s) immediately after the first transmission of the configured grant confirmation MAC CE 601. In some examples, in a case that the configured grant confirmation MAC CE 601 is triggered, the UE 102 may transmit the configured grant confirmation MAC CE 601. For example, in a case that the configured grant confirmation MAC CE 601 is triggered and not cancelled, and in a case that UL resources are allocated for new transmission, the configured grant confirmation MAC CE 601 may be transmitted.

Also, as described above, the configuration of the configured grant may be linked with the configuration of the PUSCH. And, the UE 102 may clear the configuration(s) of the PUSCH(s) linked with the configuration(s) of the configured grant(s) which is deactivated. In some examples, the UE 102 may clear the configuration(s) of the PUSCH(s) linked with the configuration(s) of the configured grant(s) immediately after first transmission of configured grant confirmation MAC CE 601. For instance, based on the reception of the DCI format(s) used for the deactivation of the configured grant, the configured grant confirmation MAC CE 601 may be triggered, and/or the configuration(s) of the PUSCH(s) linked with the configuration(s) of the configured grant(s) is cleared. For example, the UE 102 may trigger the configured grant confirmation MAC CE 601, and clear the configured grant(s) immediately after the first transmission of the configured grant confirmation MAC CE 601. Also, the UE 102 may trigger the configured grant confirmation MAC CE 601, and clear the configuration(s) of the PUSCH(s) linked with the configuration(s) of the configured grant(s) immediately after the first transmission of the configured grant confirmation MAC CE 601.

In some examples, the configured grant confirmation MAC CE 601 may be identified by using a MAC subheader with LCID (e.g., Logical Channel Identity) (e.g., a value (e.g., an index) of LCID for the UL-SCH (e.g., 55). Also, the size (e.g., the length) of the configured grant confirmation MAC CE 601 may be defined (e.g., specified) as being fixed. For example, the size (e.g., the length) of the configured grant confirmation MAC CE 601 may be defined as 16 bits. Additionally or alternatively, the size (e.g., the length) of the configured grant confirmation MAC CE 601 may be defined (e.g., specified) as 24 bits.

For example, for the configured grant confirmation MAC CE 601, a field(s) of a serving cell(s) identity (e.g., a serving cell ID) 603 may be defined. For example, the field(s) of the serving cell ID 603 may be used for indicating an index of a serving cell (e.g., an index of the primary cell (e.g., "000" (i.e., zero)) and/or an index of the secondary cell (e.g., a value(s) other than "000") for which the configured grant confirmation MAC CE 601 applies. For example, the size (e.g., the length) of the field(s) of the serving cell ID 603 may be defined as 5 bits.

Additionally or alternatively, for the configured grant confirmation MAC CE 601, a field(s) of a bandwidth part(s) identity (e.g., a BWP ID) 605 may be defined. For example, the field(s) of the BWP ID 605 may be used for indicating an index of an UL BWP for which the configured grant confirmation MAC CE 601 applies. For example, the field(s) of the BWP ID 605 may be used for indicating the index of the UL BWP for which the configured grant confirmation MAC CE 601 applies as a codepoint(s) of the BWP indicator field(s) included in the DCI format(s). For example, the size (e.g., the length) of the field(s) of the BWP ID 605 may be defined (e.g., specified) as 2 bits.

Additionally or alternatively, for the configured grant confirmation MAC CE 601, a field(s) (e.g., $S_i$ (e.g., the maximum number of i=7 (e.g., 0-7), or 15 (e.g., 0-15)) used for indicating an activation status and/or a deactivation status of the configuration(s) of the configured grant (e.g., the activation status and/or the deactivation status for the configured grant configuration with the index). For instance, this field(s) (e.g., $S_i$) may be used for indicating the activation status and/or the deactivation status of the configured grant configuration(s) within the multiple active configurations (e.g., the multiple active configurations configured, by the gNB 160, by using the RRC message). For example, the field (e.g., $S_i$) set to a value of "1" may be used for indicating the status of the corresponding configuration of the configured grant is activate (e.g., activated). Also, the field(s) (e.g., $S_i$) set to a value of "0" may be used for indicating the status of the corresponding configuration of the configured grant is deactivate (e.g., deactivated).

Additionally or alternatively, a size of the field(s) (e.g., $S_i$) may be determined based on the number of the configuration(s) of the configured grant(s). For instance, the size of the field(s) (e.g., $S_i$) may be determined based the number of the configuration(s) of the configured grant(s) within the multiple active configurations (e.g., configured by using the RRC message). For example, in a case that the number of the configuration(s) of the configured grant(s) is configured to "4" (e.g., as the number of multiple active configurations), the size of the field (e.g., $S_i$) may be "4" (e.g., $S_0$, $S_1$, $S_2$, and $S_3$ may be used indicating the activation status and/or the deactivation status). Also, in a case that the number of the configuration(s) of the configured grant(s) is configured to "10" (e.g., as the number of multiple configured grant configurations), the size of the field (e.g., $S_i$) may be "10" (e.g., $S_0$, $S_1$, $S_2$, $S_3$, $S_4$, $S_5$, $S_6$, $S_7$, $S_8$, and $S_9$ may be used indicating the activation status and/or the deactivation status).

Additionally or alternatively, the field(s) (e.g., $S_i$) set to the value (e.g., "0" or "1") used for indicating the activation status and/or the deactivation status may be defined (e.g., specified) in ascending order (e.g., or in descending order) based on the index of the configuration(s) of the configured grant(s). For example, $S_0$ may refer to the configuration of the configured grant with the lowest index (e.g., the configuration of the configured grant with the lowest index within the multiple active configurations (e.g., configured by using the RRC message)). Also, $S_1$ may refer to the configuration of the configured grant with the second lowest index (e.g., the configuration of the configured grant with the second lowest index within the multiple active configurations (e.g., configured by using the RRC message)). Also, $S_2$ may refer to the configuration of the configured grant with the third lowest index (e.g., the configuration of the configured grant with the third lowest index within the multiple active configurations (e.g., configured by using the RRC message)).

For example, in a case that the configuration of the configured grant with the index "1" and the configuration of the configured grant with the index "8" and the configuration of the configured grant with the index "3" are configured (e.g., as the multiple active configurations), $S_0$ may refer to the activation status and/or the deactivation status for the configuration of the configured grant with the index "1", $S_1$ may refer to the activation status and/or the deactivation status for the configuration of the configured grant with the index "3", and $S_2$ may refer to the activation status and/or the deactivation status for the configuration of the configured grant with the index "8".

For instance, the UE 102 may determine, based on the index of the configuration of the configured grant, a correspondence of the field(s) (e.g., $S_i$) and the configurations of the configured grant (e.g., the field(s) (e.g., $S_i$) corresponding to the configuration of the configured grant). And, based on the index of the configuration of the configured grant, the UE 102 may set (e.g., map) to the field(s) (e.g., the determined field(s) "$S_i$") a value(s) used for indicating the activation status or the deactivation status.

As described above, in the systems and methods disclosed herein, the configuration(s) of the configured grant(s) may be replaced by the configured grant configuration group(s). In some examples, the configured grant configuration group(s) may include the one or more configurations of the configured grant(s). As described above, the gNB 160 may transmit, by using the RRC message, the information used for configuring the correspondence of the configured grant configuration group(s) and the one or more configurations of the configured grant(s).

For instance, for the configured grant confirmation MAC CE 601, a field(s) (e.g., $S_i$ (e.g., the maximum number of i=7 (e.g., 0-7), or 15 (e.g., 0-15)) may be used for indicating an activation status and/or a deactivation status of the configured grant configuration group(s) (e.g., the activation status and/or the deactivation status for the configured grant configuration group(s) with the index). For instance, this field(s) (e.g., $S_i$) may be used for indicating the activation status and/or the deactivation status of the configured grant configuration group(s) within the multiple active configurations (e.g., the multiple active configurations configured, by the gNB 160, by using the RRC message). For example, the field (e.g., $S_i$) set to a value of "1" may be used for indicating the status of the corresponding configured grant configuration group(s) is activate (e.g., activated). Also, the field(s) (e.g., $S_i$) set to a value of "0" may be used for indicating the status of the corresponding configured grant configuration group(s) is deactivate (e.g., deactivated).

Additionally or alternatively, a size of the field(s) (e.g., $S_i$) may be determined based on the number of the configured grant configuration group(s). For instance, the size of the field(s) (e.g., $S_i$) may be determined based the number of configured grant configuration group(s) within the multiple active configurations (e.g., configured by using the RRC message). For example, in a case that the number of configured grant configuration group(s) is configured to "4" (e.g., as the number of multiple active configurations), the size of the field (e.g., $S_i$) may be "4" (e.g., $S_0$, $S_1$, $S_2$, and $S_3$ may be used indicating the activation status and/or the deactivation status). Also, in a case that the number of configured grant configuration group(s) is configured to "10" (e.g., as the number of multiple configured grant configurations), the size of the field (e.g., $S_i$) may be "10" (e.g., $S_0$, $S_1$, $S_2$, $S_3$, $S_4$, $S_5$, $S_6$, $S_7$, $S_8$, and $S_9$ may be used indicating the activation status and/or the deactivation status).

Additionally or alternatively, the field(s) (e.g., $S_i$) set to the value (e.g., "0" or "1") used for indicating the activation status and/or the deactivation status may be defined (e.g., specified) in ascending order (e.g., or in descending order) based on the index of the configured grant configuration group(s). For example, $S_0$ may refer to the configured grant configuration group(s) with the lowest index (e.g., the configured grant configuration group(s) with the lowest index within the multiple active configurations (e.g., configured by using the RRC message)). Also, $S_1$ may refer to the configured grant configuration group(s) with the second lowest index (e.g., the configured grant configuration group(s) with the second lowest index within the multiple active configurations (e.g., configured by using the RRC message)). Also, $S_2$ may refer to the configured grant configuration group(s) with the third lowest index (e.g., the configured grant configuration group(s) with the third lowest index within the multiple active configurations (e.g., configured by using the RRC message)).

For example, in a case that the configured grant configuration group(s) with the index "1" and the configured grant configuration group(s) with the index "8" and the configured grant configuration group(s) with the index "3" are configured, $S_0$ may refer to the activation status and/or the deactivation status for the configured grant configuration group(s) with the index "1", $S_1$ may refer to the activation status and/or the deactivation status for the configured grant configuration group(s) with the index "3", and $S_2$ may refer to the activation status and/or the deactivation status for the configured grant configuration group(s) with the index "8". In some examples, the configured grant configuration group(s) with the index "1" may include the configuration of the configured grant with the index "1" and the configuration of the configured grant with the index "8". Also, the configured grant configuration group(s) with the index "8" may include the configuration of the configured grant with the index "6" and the configuration of the configured grant with the index "10" and the configuration of the configured grant with the index "14". Also, the configured grant configuration group(s) with the index "3" may include the configuration of the configured grant with the index "5".

For instance, the UE 102 may determine, based on the index of the configured grant configuration group(s), a correspondence of the field(s) (e.g., $S_i$) and the configured grant configuration group(s) (e.g., the field(s) (e.g., $S_i$) corresponding to the configured grant configuration group(s)). And, based on the index of the configured grant configuration group(s), the UE 102 may set (e.g., map) to the field(s) (e.g., the determined field(s) "$S_i$") a value(s) used for indicating the activation status or the deactivation status.

Additionally or alternatively, for the configured grant confirmation MAC CE 601, a field(s) of a reserved bit(s) (e.g., "R") may be defined. For example, the field(s) of the reserved bit(s) may be set to "0" (i.e., zero).

To support multiple configurations of configured grant, some RRC parameters may be introduced.

A RRC parameter (e.g., UL-Configuredgrantconfig-index) may be introduced to indicate the index of a UL configured grant configuration. The RRC parameter (e.g., UL-Configuredgrantconfig-index) may be included in each RRC configuration of configured grant (e.g., ConfiguredGrantConfig IE). The value of the RRC parameter (e.g., UL-Configuredgrantconfig-index) may be 0, 1, 2, . . . , maxNrofConfiguredgrantconfig-2, or maxNrofConfiguredgrantconfig-1. maxNrofConfiguredgrantconfig is the maximum number of CG (e.g., configured grant) configurations, which may be 12.

A RRC parameter (e.g., UL-Configuredgrantconfig-ToAddModList) may be introduced to configure more than one UL configured grant configurations. The RRC parameter (e.g., UL-Configuredgrantconfig-ToAddModList) may be a list or sequence of elements. The elements here may be configured grant configurations (e.g., ConfiguredGrantConfig) or equivalent mappings. The elements of the list or sequence may contain an identity (INTEGER) (e.g., ElementId) that identifies the elements unambiguously upon addition, modification and removal. The ElementId here may be the index of a UL configured grant configuration (e.g., UL-Configuredgrantconfig-index). For each element (e.g., ConfiguredGrantConfig) in the RRC parameter (e.g., UL-Configuredgrantconfig-ToAddModList), if the current UE configuration includes an element (e.g., ConfiguredGrantConfig) with the given ElementId (e.g., UL-Configuredgrantconfig-index), the UE modifies the configured element (e.g., ConfiguredGrantConfig) in accordance with the received element (e.g., ConfiguredGrantConfig), else, the UE adds received element (e.g., ConfiguredGrantConfig) to the UE configuration. For instance, if UE receives a CG configuration corresponding to an index and the list in UE configuration has a CG configuration corresponding to the index, the UE updates the CG configuration according to the received CG configuration. If UE receives a CG configuration corresponding to an index and the list in UE configuration does not have a CG configuration correspond to the index, the UE adds the CG configuration in the list and/or its configuration according to the received CG configuration. The may RRC parameter (e.g., UL-Configuredgrantconfig-ToAddModList) be 1 to maxNrofConfiguredgrantconfig (e.g., 12) of ConfiguredGrantConfig.

A RRC parameter (e.g., UL-Configuredgrantconfig-ToReleaseList) may be introduced to release more than one UL configured grant configurations. The RRC parameter (e.g., UL-Configuredgrantconfig-ToReleaseList) may be a list or sequence of ElementId (e.g., UL-Configuredgrantconfig-index). For each ElementId (e.g., UL-Configuredgrantconfig-index) in the RRC parameter (e.g., UL-Configuredgrantconfig-ToReleaseList), if the current UE configuration includes an element (UL configured grant configurations, e.g., ConfiguredGrantConfig) with the given ElementId (e.g., UL-Configuredgrantconfig-index), the UE release the element (UL configured grant configurations, e.g., ConfiguredGrantConfig) from the current UE configuration. For instance, if the list includes a configured grant configuration index and the current UE configuration include a configured grant configuration corresponding to the index, the UE release the configured grant configuration corresponding to the index.

To support joint release and/or separate release of multiple configured grant configurations, a DCI field (e.g., HPN field) in the release DCI (e.g., DCI format 0_0, DCI format 0_1 and/or DCI format 0_2) and/or a higher layer configurable table(s) (e.g., CG configuration release table) and/or a fixed/default table(s) may be used for indicating which CG configuration(s) is/are released. For instance, M (e.g., M<=4) bits indication in the Release DCI is used for indicating which CG configuration(s) is/are released, where the association between each state indicated by the indication and the CG configuration(s) is up to $2^M$ states are higher layer configurable, where each of the state can be mapped to a single or multiple CG configurations to be released. In case of no higher layer configured state(s), separate release is used where the release corresponds to the CG configuration index indicated by the indication. M may be determined by the bit length for an HPN field for each DCI format for activation and release of Type 2 CG.

For example, a DCI field (e.g., CG configuration index, which may reuse an HPN field) value m of DCI may provide a row index m+1 to an allocated table. The determination of the used table may be defined below. The indexed row defines which CG configuration(s) is/are released.

The table (e.g., UL-Type2Configuredgrantconfig-ReleaseStateList) may be higher layer configured. The table be UE-specific (e.g., UL-Type2Configuredgrantconfig-ReleaseStateList in pusch-Config) and or commonly configured (e.g., UL-Type2Configuredgrantconfig-ReleaseStateList in pusch-ConfigCommon). The table (e.g., UL-Type2Configuredgrantconfig-ReleaseStateList) may be a list/sequence of CG configuration index set (e.g., UL-Type2Configuredgrantconfig-ReleaseState). Each CG configuration index set may include one or more than one index of CG configuration(s) which may be released. A CG configuration index set may be empty, which means no CG configuration will be released. An example of the RRC configured table is shown in Listing 1. The maximum number (e.g., maxNrofUL-CG-ReleaseState) of entries in the table/sequence/list may be 16 or depend on the number of bits in the DCI field (e.g., CG configuration index).

| Listing 1 |
|---|
| -- ASN1START |
| -- TAG-UL-Type2Configuredgrantconfig-ReleaseStateList-START |
| UL-Type2Configuredgrantconfig-ReleaseStateList ::= |
| SEQUENCE (SIZE(1..maxNrofUL-CG-ReleaseState)) OF |
| UL-Type2Configuredgrantconfig-ReleaseState |
| UL-Type2Configuredgrantconfig-ReleaseState ::= SEQUENCE |
| (SIZE(1..maxNrofConfiguredgrantconfig) ) OF |
| UL-Configuredgrantconfig-index |
| -- TAG-UL-Type2Configuredgrantconfig-ReleaseStateList-STOP |
| -- ASN1STOP |

In some examples, the table may be fixed. For instance, one or more default table(s) may be applied for joint and/or separate release of multiple CG configurations. Some examples are shown in Table 1, Table 2 and Table 3.

TABLE 1

| Row index | CG configuration index set |
|---|---|
| 1 | 0 |
| 2 | 1 |

TABLE 1-continued

| Row index | CG configuration index set |
| --- | --- |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |

TABLE 2

| Row index | CG configuration index set |
| --- | --- |
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 0, 1, 2 |
| 14 | 3, 4, 5 |
| 15 | 6, 7, 8 |
| 16 | 9, 10, 11 |

TABLE 3

| Row index | CG configuration index set |
| --- | --- |
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 0, 1, 2, 3 |
| 14 | 4, 5, 6, 7 |
| 15 | 8, 9, 10, 11 |
| 16 | 0, 1, 2, 3, 4, 5, 6, 7, 8, 9, 10, 11 |

In some examples, more than one table(s) to be used for CG configuration release may be defined and/or configured. In case that more than one table(s) (e.g., CG configuration release table(s), including RRC configured table(s) and/or default table(s)), and/or determination of table is to be used for CG configuration release may depend on DCI format for release DCI, RRC configurations (e.g., whether a UE-specific table and/or commonly configured table is configured or not), PDCCH search space(s) where UE detects the release DCI, and/or CORESET(s) where the UE detects release DCI.

For example, if there is no RRC configured table (e.g., if a parameter(s) used for indicating the table(s) is not configured (e.g., no value(s) of a parameter(s)) used for indicating the table(s) is not configured), a default table (e.g., Table 1, Table 2, Table 3, or any table specified in a specification) may be applied for joint/separate CG configuration release.

In yet another example, if there is no RRC configured table, joint release of multiple CG configurations may not be supported. For instance, only separate release (e.g., only one CG configuration is released by using a single DCI format for release DCI in a certain timing) may be supported. Each value in the DCI field (e.g., CG configuration index) may have one-to-one mapping to the CG configuration which may be released. For example, a DCI field (e.g., CG configuration index) value m of DCI may indicate that CG configuration with index m may be released.

For example, if a UE-specific RRC table (e.g., UL-Type2Configuredgrantconfig-ReleaseStateList in pusch-Config) is configured for the UE and the UE detects the release DCI (e.g., the DCI format 0_2, the DCI format 0_1 and/or the DCI format 0_0) in a UE specific search space, the UE-specific RRC table (e.g., UL-Type2Configuredgrantconfig-ReleaseStateList in pusch-Config) may be applied (e.g., always applied) for joint/separate CG configuration release (e.g., no matter whether other table(s) may be configured and/or provided (e.g., UL-Type2Configuredgrantconfig-ReleaseStateList in pusch-ConfigCommon and/or any default table(s))).

For example, if a common RRC table (e.g., UL-Type2Configuredgrantconfig-ReleaseStateList in pusch-ConfigCommon) is configured (e.g., and there is no UE-specific RRC table (e.g., UL-Type2Configuredgrantconfig-ReleaseStateList in pusch-Config) for UE), the common RRC table (e.g., UL-Type2Configuredgrantconfig-ReleaseStateList in pusch-ConfigCommon) may be applied for joint/separate CG configuration release. For example, if the common RRC table and the UE-specific RRC table are configured, the UE may apply the UE-specific RRC table to be used for CG configuration release. For example, if the common RRC table and the UE-specific RRC table are configured for the UE, the UE-specific RRC table (e.g., a configuration(s) of the UE-specific RRC table) may override the common RRC table (e.g., a configuration(s) of the common RRC table).

For example, if the UE detects the release DCI (e.g., the DCI format 0_2, the DCI format 0_1 and/or the DCI format 0_0) in the common search space associated with the CORESET 0 (e.g., and/or the common search space not associated with the CORESET 0), the default table (e.g., Table 1, Table 2, Table 3, or any table specified in (e.g., defined by) a specification) may be applied for joint/separate CG configuration release. In yet another example, if the UE detects the release DCI (e.g., the DCI format 0_2, the DCI format 0_1 and/or the DCI format 0_0) in the common search space associated with the CORESET 0 (e.g., and/or the common search space not associated with the CORESET 0), joint release of multiple CG configurations may not be supported. For instance, only separate release may be supported. Each value in the DCI field (e.g., CG configuration index) may have one-to-one mapping to the CG configuration which may be released. For example, a DCI field (e.g., CG configuration index) value m of DCI may indicate that CG configuration with index m may be released.

Another example is shown in Table 4. As shown in Table 4, the UE may determine the table (e.g., among from the default table, the common RRC table, and/or the UE-specific RRC table) to be applied for CG configuration release. For instance, as described above, the UE may determine the table (e.g., among from the default table, the common RRC table, and/or the UE-specific RRC table), based on the DCI format(s) for release DCI, the RRC configurations (e.g., whether or not the UE-specific RRC table is configured and/or whether or not the common RRC table is configured table), the PDCCH search space(s) where UE detects the DCI format(s) for the release DCI, and/or the CORESET(s) (e.g., an index of the CORESET) where the UE detects the DCI format(s) for the release DCI.

TABLE 4

| PDCCH search space | pusch-ConfigCommon includes pusch-UL-Type2Configuredg rantconfig-ReleaseStateList | pusch-Config includes pusch-UL-Type2Configuredgra ntconfig-ReleaseStateList | Joint/separate CG configuration release to apply |
|---|---|---|---|
| Any common search space associated with CORESET 0 | No | — | Default Table (e.g., Table 1, Table 2, Table 3, or any table specified in the specification) |
| | Yes | | UL-Type2Configur edgrantconfig-Rele aseStateList provided in pusch-ConfigCommon |
| Any common search space not associated with CORESET 0, UE specific search space | No | No | Default Table (e.g., Table 1, Table 2, Table 3, or any table specified in the specification) |
| | Yes | No | UL-Type2Configur edgrantconfig-Rele aseStateList provided in pusch-ConfigCommon |
| | No/Yes | Yes | UL-Type2Configur edgrantconfig-Rele aseStateList provided in pusch-Config |

If the release DCI is a fallback DCI (e.g., the DCI format 0_0), there may be no DCI field (e.g., CG configuration index) to indicate which CG configuration(s) is/are released, some fallback behaviors may be described here. For example, if the UE detects the DCI format 0_0 for the CG configuration(s) release, the UE may release all the CG configuration(s) (e.g., all the Type 2 CG configuration(s)). In yet another example, if the UE detects the DCI format 0_0 for the CG configuration(s) release, the UE may release a specific configuration(s) (e.g., a specific Type 2 CG configuration(s)) and/or a default configuration(s) (e.g., a default Type 2 CG configuration(s)). For example, if the UE detects the DCI format 0_0 for the CG configuration(s) release, the UE may release a CG configuration with a predetermined index (e.g., a CG configuration with index "0" (e.g., as the specific Type 2 CG configuration(s) and/or the default Type 2 CG configuration(s))). Additionally or alternatively, if the UE detects the DCI format 0_0 for the CG configuration(s) release, the UE may release a CG configuration with the lowest index (e.g., the smallest index). For example, in a case that the CG configuration with the index "1", the CG configuration with the index "3", and the CG configuration with the index "5" are configured, and if the UE detects the DCI format 0_0 for the CG configuration(s) release, the UE may release the CG configuration with "1". Additionally or alternatively, if the UE detects DCI format 0_0 for the CG configuration(s) release, the UE may release a CG configuration with the highest index (e.g., the largest index). For example, in a case that the CG configuration with the index "1", the CG configuration with the index "3", and the CG configuration with the index "5" are configured, and if the UE detects the DCI format 0_0 for the CG configuration(s) release, the UE may release the CG configuration with "5". In some examples, the specific configuration(s) and/or the default configuration(s) may be defined by the specification and known information between the gNB and the UE. For instance, for the detection of the DCI format 0_0 for the CG configuration(s) release, the UE may determine which CG configuration(s) is released based on the index for the CG configuration (e.g., configured by the gNB). In yet another example, UE may not be expected to receive DCI format 0_0 for CG configuration release if multiple CG configurations are configured.

Additionally or alternatively, if the UE detects in the CSS the DCI format 0_0 for the CG configuration(s) release, the UE may release all the CG configuration(s) (e.g., all the Type 2 CG configuration(s)). In yet another example, if the UE detects in the CSS the DCI format 0_0 for the CG configuration(s) release, the UE may release a specific configuration(s) (e.g., a specific Type 2 CG configuration(s)) and/or a default configuration(s) (e.g., a default Type 2 CG configuration(s)). For example, if the UE detects in the CSS the DCI format 0_0 for the CG configuration(s) release, the UE may release a CG configuration with a predetermined index (e.g., a CG configuration with index "0" (e.g., as the specific Type 2 CG configuration(s) and/or the default Type 2 CG configuration(s))). Additionally or alternatively, if the UE detects in the CSS the DCI format 0_0 for the CG configuration(s) release, the UE may release a CG configuration with the lowest index (e.g., the smallest index). For example, in a case that the CG configuration with the index "1", the CG configuration with the index "3", and the CG configuration with the index "5" are configured, and if the UE detects in the CSS the DCI format 0_0 for the CG configuration(s) release, the UE may release the CG configuration with "1". Additionally or alternatively, if the UE detects in the CSS the DCI format 0_0 for the CG configuration(s) release, the UE may release a CG configuration with the highest index (e.g., the largest index). For example, in a case that the CG configuration with the index "1", the CG configuration with the index "3", and the CG configuration with the index "5" are configured, and if the UE detects in the CSS the DCI format 0_0 for the CG configuration(s) release, the UE may release the CG configuration with "5". For instance, for the detection of the DCI format 0_0 for the CG configuration(s) release in the CSS, the UE may determine which CG configuration(s) is released based on the index for the CG configuration (e.g., configured by the gNB).

Additionally or alternatively, if the UE detects, in the CSS associated with the CORESET #0, the DCI format 0_0 for the CG configuration(s) release, the UE may release all the CG configuration(s) (e.g., all the Type 2 CG configuration (s)). In yet another example, if the UE detects, in the CSS associated with the CORESET #0, the DCI format 0_0 for the CG configuration(s) release, the UE may release a specific configuration(s) (e.g., a specific Type 2 CG configuration(s)) and/or a default configuration(s) (e.g., a default Type 2 CG configuration(s)). For example, if the UE detects, in the CSS associated with the CORESET #0, the DCI format 0_0 for the CG configuration(s) release, the UE may release a CG configuration with a predetermined index (e.g., a CG configuration with index "0" (e.g., as the specific Type 2 CG configuration(s) and/or the default Type 2 CG configuration(s))). Additionally or alternatively, if the UE detects, in the CSS associated with the CORESET #0, the DCI format 0_0 for the CG configuration(s) release, the UE may release a CG configuration with the lowest index (e.g., the smallest index). For example, in a case that the CG configuration with the index "1", the CG configuration with the index "3", and the CG configuration with the index "5" are configured, and if the UE detects, in the CSS associated with the CORESET #0, the DCI format 0_0 for the CG configuration(s) release, the UE may release the CG configuration with "1". Additionally or alternatively, if the UE detects, in the CSS associated with the CORESET #0, the DCI format 0_0 for the CG configuration(s) release, the UE may release a CG configuration with the highest index (e.g., the largest index). For example, in a case that the CG configuration with the index "1", the CG configuration with the index "3", and the CG configuration with the index "5" are configured, and if the UE detects, in the CSS associated with the CORESET #0, the DCI format 0_0 for the CG configuration(s) release, the UE may release the CG configuration with "5". For instance, for the detection of the DCI format 0_0 for the CG configuration(s) release in the CSS associated with the CORESET #0, the UE may determine which CG configuration(s) is released based on the index for the CG configuration (e.g., configured by the gNB).

Semi-Persistent Scheduling (SPS) is configured by RRC per Serving Cell and per BWP. Activation and deactivation of the DL SPS may be independent among the Serving Cells. For the DL SPS, a DL assignment is provided by PDCCH (e.g., DCI format 1_0, DCI format 1_1 and/or DCI format 1_2), and stored or cleared based on L1 signalling indicating SPS activation or deactivation/release.

RRC configures the following parameters when SPS is configured (e.g., SPS-Config IE):
cs-RNTI: CS-RNTI for activation, deactivation, and retransmission;
nrofHARQ-Processes: the number of configured HARQ processes for SPS;
periodicity: periodicity of configured downlink assignment for SPS.

When SPS is released by upper layers, all the corresponding configurations shall be released. After a downlink assignment is configured for SPS, the MAC entity shall consider sequentially that the Nth downlink assignment occurs in the slot for which:

(numberOfSlotsPerFrame×SFN+slot number in the frame)=[(numberOfSlotsPerFrame× $SFN_{start\ time}$+$slot_{start\ time}$)+N×periodicity×numberOfSlotsPerFrame/10]modulo(1024×numberOfSlotsPerFrame)

where $SFN_{start\ time}$ and $slot_{start\ time}$ are the SFN and slot, respectively, of the first transmission of PDSCH where the configured downlink assignment was (re-)initialized.

To support multiple configurations of SPS, some RRC parameters may be introduced.

A RRC parameter (e.g., DL-SPSconfig-index) may be introduced to indicate the index of a SPS configuration. The RRC parameter (e.g., DL-SPSconfig-index) may be included in each RRC configuration of SPS (e.g., SPS-Config IE). The value of the RRC parameter (e.g., DL-SPSconfig-index) may be 0, 1, 2, . . . , maxNrofSPSconfig−2, or maxNrofSPSconfig−1. maxNrofSPSconfig is the maximum number of SPS configurations, which may be 8 (12 or 16).

A RRC parameter (e.g., DL-SPSconfig-ToAddModList) may be introduced to configure more than one DL SPS configurations. The RRC parameter (e.g., DL-SPSconfig-ToAddModList) may be a list or sequence of elements. The elements here may be SPS configurations (e.g., SPS-Config) or equivalent mappings. The elements of the list or sequence may contain an identity (INTEGER) (e.g., ElementId) that identifies the elements unambiguously upon addition, modification and removal. The ElementId here may be the index of a DL SPS configuration (e.g., DL-SPSconfig-index). For each element (e.g., SPS-Config) in the RRC parameter (e.g., DL-SPSconfig-ToAddModList), if the current UE configuration includes an element (e.g., SPS-Config) with the given ElementId (e.g., DL-SPSconfig-index), the UE modifies the configured element (e.g., SPS-Config) in accordance with the received element (e.g., SPS-Config), else, the UE adds received element (e.g., SPS-Config) to the UE configuration. For instance, if UE receives a SPS configuration corresponding to an index and the list in UE configuration has a SPS configuration corresponding to the index, the UE updates the SPS configuration according to the received SPS configuration. If UE receives a SPS configuration corresponding to an index and the list in UE configuration does not have a SPS configuration correspond to the index, the UE adds the SPS configuration in the list and/or its configuration according to the received SPS configuration. The may RRC parameter (e.g., DL-SPSconfig-ToAddModList) be 1 to maxNrofSPSconfig (e.g., 8, 12, 16) of SPS-Config.

A RRC parameter (e.g., DL-SPSconfig-ToReleaseList) may be introduced to release more than one DL SPS configurations. The RRC parameter (e.g., DL-SPSconfig-ToReleaseList) may be a list or sequence of ElementId (e.g., DL-SPSconfig-index). For each ElementId (e.g., DL-SPSconfig-index) in the RRC parameter (e.g., DL-SPSconfig-ToReleaseList), if the current UE configuration includes an element (DL SPS configuration(s), e.g., SPS-Config) with the given ElementId (e.g., DL-SPSconfig-index), the UE release the element (DL SPS configuration(s), e.g., SPS-Config) from the current UE configuration. For instance, if the list includes a SPS configuration index and the current UE configuration includes a SPS configuration corresponding to the index, the UE release the SPS configuration corresponding to the index.

To support joint release and/or separate release of multiple SPS configurations, a DCI field (e.g., HPN field) in the release DCI (e.g., DCI format 1_0, DCI format 1_1 and/or DCI format 1_2) and/or a higher layer configurable table(s) (e.g., SPS configuration release table) and/or a fixed/default table(s) may be used for indicating which SPS configuration(s) is/are released. For instance, M (e.g., M<=4) bits indication in the Release DCI is used for indicating which SPS configuration(s) is/are released, where the association between each state indicated by the indication and the SPS configuration(s) is up to $2^M$ states are higher layer configurable, where each of the state can be mapped to a single or multiple SPS configurations to be released. In a case of no higher layer configured state(s), separate release may be used where the release corresponds to the SPS configuration index indicated by the indication. M may be determined by the bit length for HPN field for each DCI format for activation and release of SPS.

For example, a DCI field (e.g., SPS configuration index, which may reuse an HPN field) value m of DCI may provide a row index m+1 to an allocated table. The determination of the used table may be defined below. The indexed row defines which SPS configuration(s) is/are released.

The table (e.g., DL-SPSconfig-ReleaseStateList) may be higher layer configured. The table may be UE-specific (e.g., DL-SPSconfig-ReleaseStateList in pdsch-Config) and or commonly configured (e.g., DL-SPSconfig-ReleaseStateList in pdsch-ConfigCommon). The table (e.g., DL-SPSconfig-ReleaseStateList) may be a list/sequence of SPS configuration index set (e.g., DL-SPSconfig-ReleaseState). Each SPS configuration index set may include one or more than one index of SPS configuration(s) which may be released. An SPS configuration index set may be empty, which means no SPSconfiguration will be released. An example of the RRC configured table is shown in Listing 2. The maximum number (e.g., maxNrofDL-SPS-ReleaseState) of entries in the table/sequence/list may be 16 or may depend on the number of bits in the DCI field (e.g., SPS configuration index).

---
Listing 2
---

-- ASN1START
-- TAG-DL-SPSconfig-ReleaseStateList-START
DL-SPSconfig-ReleaseStateList ::= SEQUENCE
(SIZE(1..maxNrofDL-SPS-ReleaseState) ) OF
DL-SPSconfig-ReleaseState
DL-SPSconfig-ReleaseState ::= SEQUENCE
(SIZE(1..maxNrofSPSconfig)) OF DL-SPSconfig-index
-- TAG-DL-SPSconfig-ReleaseStateList-STOP
-- ASN1STOP

---

The table may be fixed in a specification. For instance, one or more default table(s) may be applied for joint and/or separate release of multiple SPS configurations. Some examples are shown is Table 5, Table 6 and Table 7.

TABLE 5

| Row index | SPS configuration index set |
|---|---|
| 1 | 0 |
| 2 | 1 |
| 3 | 2 |
| 4 | 3 |
| 5 | 4 |
| 6 | 5 |
| 7 | 6 |
| 8 | 7 |

TABLE 6

| Row index | SPS configuration index set |
|---|---|
| 1 | 0 |
| 2 | 1 |
| 3 | 2 |
| 4 | 3 |
| 5 | 4 |
| 6 | 5 |
| 7 | 6 |
| 8 | 7 |
| 9 | 8 |
| 10 | 9 |
| 11 | 10 |
| 12 | 11 |
| 13 | 12 |
| 14 | 13 |
| 15 | 14 |
| 16 | 15 |

TABLE 7

| Row index | SPS configuration index set |
|---|---|
| 1 | 0 |
| 2 | 1 |
| 3 | 2 |
| 4 | 3 |
| 5 | 4 |
| 6 | 5 |
| 7 | 6 |
| 8 | 7 |
| 9 | 0, 1 |
| 10 | 2, 3 |
| 11 | 4, 5 |
| 12 | 6, 7 |
| 13 | 0, 1, 2, 3 |
| 14 | 4, 5, 6, 7 |
| 15 | N/A |
| 16 | 0, 1, 2, 3, 4, 5, 6, 7, 8, 9, 10, 11 |

In some examples, more than one table(s) to be used for SPS configuration release may be defined and/or configured. In case that more than one table(s) (e.g., SPS configuration release table(s), including RRC configured table(s) and/or default table(s)), and/or determination of table is to be used for SPS configuration release may depend on DCI format for release DCI, RRC configurations (e.g., whether a UE-specific table and/or commonly configured table is configured or not), PDCCH search space(s) where UE detects the release DCI, and/or CORESET(s) where the UE detects release DCI.

For example, if there is no RRC configured table (e.g., if a parameter(s) used for indicating the table(s) is not configured (e.g., no value(s) of a parameter(s)) used for indicating the table(s) is not configured), a default table (e.g., Table 5, Table 6, Table 7, or any table specified in the specification) may be applied for joint/separate SPS configuration release. In yet another example, if there is no RRC configured table, joint release of multiple SPS configurations may not be supported. For instance, only separate release (e.g., only one SPS configuration is released by using a single DCI format for release DCI in a certain timing) may be supported. Each value in the DCI field (e.g., SPS configuration index) may have one-to-one mapping to the SPS configuration which may be released. For example, a DCI field (e.g., SPS configuration index) value m of DCI may indicate that SPS configuration with index m may be released.

For example, if a UE-specific RRC table (e.g., DL-SPSconfig-ReleaseStateList in pdsch-Config) is configured for UE and UE detects the release DCI (e.g., the DCI format 1_2, the DCI format 1_1 and/or the DCI format 1_0) in a UE specific search space, the UE-specific RRC table (e.g., DL-SPSconfig-ReleaseStateList in pdsch-Config) may be applied (e.g., always applied) for joint/separate SPS configuration release (e.g., no matter whether other table(s) may be configured and/or provided (e.g., DL-SPSconfig-ReleaseStateList in pdsch-ConfigCommon and/or any default table(s))).

For example, if a common RRC table (e.g., DL-SPSconfig-ReleaseStateList in pdsch-ConfigCommon) is configured (e.g., and there is no UE-specific RRC table (e.g., DL-SPSconfig-ReleaseStateList in pdsch-Config) for UE), the common RRC table (e.g., DL-SPSconfig-ReleaseStateList in pdsch-ConfigCommon) may be applied for joint/separate SPS configuration release. For example, if the common RRC table and the UE-specific RRC table are configured, the UE may apply the UE-specific RRC table to be used for CG configuration release. For example, if the common RRC table and the UE-specific RRC table are configured for the UE, the UE-specific RRC table (e.g., a configuration(s) of the UE-specific RRC table) may override the common RRC table (e.g., a configuration(s) of the common RRC table).

For example, if the UE detects the release DCI (e.g., the DCI format 1_2, the DCI format 1_1 and/or the DCI format 1_0) in the common search space associated with the CORESET 0 (e.g., and/or the common search space not associated with the CORESET 0), the default table (e.g., Table 5, Table 6, Table 7, or any table specified in (e.g., defined by) the specification) may be applied for joint/separate SPS configuration release. In yet another example, if the UE detects the release DCI (e.g., the DCI format 1_2, the DCI format 1_1 and/or the DCI format 1_0) in the common search space associated with the CORESET 0 (e.g., and/or the common search space not associated with the CORESET 0), joint release of multiple SPS configurations may not be supported. For instance, only separate release may be supported. Each value in the DCI field (e.g., SPS configuration index) may have one-to-one mapping to the SPS configuration which may be released. For example, a DCI field (e.g., SPS configuration index) value m of DCI may indicate that SPS configuration with index m may be released.

Another example is shown in Table 8. As shown in Table 8, the UE may determine the table (e.g., among from the default table, the common RRC table, and/or the UE-specific RRC table) to be applied for SPS configuration release. For instance, as described above, the UE may determine the table (e.g., among from the default table, the common RRC table, and/or the UT-specific RRC table), based on the DCI format(s) for release DCI, the RRC configurations (e.g., whether or not the UE-specific RRC table is configured and/or whether or not the common RRC table is configured table), the PDCCH search space(s) where U detects the DCI format(s) for the release DCI, and/or the CORESET(s) (e.g., an index of the CORESET) where the UE detects the DCI format(s) for the release DCI.

TABLE 8

| PDCCH search space | pdsch-ConfigCommon includes DL-SPSconfig-ReleaseStateList | pdsch-Config includes DL-SPSconfig-ReleaseStateList | Joint/separate SPS configuration release to apply |
|---|---|---|---|
| Any common search space associated with CORESET 0 | No | — | Default Table (e.g., Table 5, Table 6, Table 7, or any table specified in the specification) |
|  | Yes |  | DL-SPSconfig-ReleaseStateList provided in pdsch-ConfigCommon |
| Any common search space not associated with CORESET 0, | No | No | Default Table (e.g., Table 5, Table 6, Table 7, or any table specified in the specification) |
|  | Yes | No | DL-SPSconfig-ReleaseStateList provided in pdsch-ConfigCommon |
| UE specific search space | No/Yes | Yes | DL-SPSconfiig-ReleaseStateList provided in pdsch-Config |

If the release DCI is a fallback DCI (e.g., DCI format 1_0), there may be no DCI field (e.g., SPS configuration index) to indicate which SPS configuration(s) is/are released, some fallback behaviors may be described here. For example, if the UE detects the DCI format 1_0 for the SPS configuration(s) release, the UE may release all the SPS configuration(s) (e.g., all the SPS configuration(s)). In yet another example, if the UE detects the DCI format 1_0 for the SPS configuration(s) release, the UE may release a specific configuration(s) (e.g., a specific SPS configuration(s)) and/or a default configuration(s) (e.g., a default SPS configuration(s)). For example, if the UE detects the DCI format 1_0 for the SPS configuration(s) release, the UE may release a SPS configuration with a predetermined index (e.g., a SPS configuration with index "0" (e.g., as the specific SPS configuration(s) and/or the default SPS configuration(s))). Additionally or alternatively, if the UE detects the DCI format 1_0 for the SPS configuration(s) release, the UE may release a SPS configuration with the lowest index (e.g., the smallest index). For example, in a case that the SPS configuration with the index "1", the SPS configuration with the index "3", and the SPS configuration with the index "5" are configured, and if the UE detects the DCI format 1_0 for the SPS configuration(s) release, the UE may release the SPS configuration with "1". Additionally or alternatively, if the UE detects DCI format 1_0 for the SPS configuration(s) release, the UE may release a SPS configuration with the highest index (e.g., the largest index). For example, in a case that the SPS configuration with the index "1", the SPS configuration with the index "3", and the SPS configuration with the index "5" are configured, and if the UE detects the DCI format 0_0 for the SPS configuration(s) release, the UE may release the SPS configuration with "5". In some examples, the specific configuration(s) and/or the default configuration(s) may be defined by the specification and known information between the gNB and the UE. For instance, for the detection of the DCI format 0_0 for the SPS configuration(s) release, the UE may determine which SPS configuration(s) is released based on the index for the SPS configuration (e.g., configured by the gNB). In yet another example, UE may not be expected to receive DCI format 1_0 for SPS configuration release if multiple SPS configurations are configured.

Additionally or alternatively, if the UE detects in the CSS the DCI format 1_0 for the SPS configuration(s) release, the UE may release all the SPS configuration(s) (e.g., all the SPS configuration(s)). In yet another example, if the UE detects in the CSS the DCI format 1_0 for the SPS configuration(s) release, the UE may release a specific configuration(s) (e.g., a specific SPS configuration(s)) and/or a default configuration(s) (e.g., a default SPS configuration(s)). For example, if the UE detects in the CSS the DCI format 1_0 for the SPS configuration(s) release, the UE may release a SPS configuration with a predetermined index (e.g., a SPS configuration with index "0" (e.g., as the specific SPS configuration(s) and/or the default SPS configuration(s))). Additionally or alternatively, if the UE detects in the CSS the DCI format 1_0 for the SPS configuration(s) release, the UE may release a SPS configuration with the lowest index (e.g., the smallest index). For example, in a case that the SPS configuration with the index "1", the SPS configuration with the index "3", and the SPS configuration with the index "5" are configured, and if the UE detects in the CSS the DCI format 1_0 for the SPS configuration(s) release, the UE may release the SPS configuration with "1". Additionally or alternatively, if the UE detects in the CSS the DCI format 1_0 for the SPS configuration(s) release, the UE may release a SPS configuration with the highest index (e.g., the largest index). For example, in a case that the SPS configuration with the index "1", the SPS configuration with the index "3", and the SPS configuration with the index "5" are configured, and if the UE detects in the CSS the DCI format 1_0 for the SPS configuration(s) release, the UE may release the SPS configuration with "5". For instance, for the detection of the DCI format 1_0 for the SPS configuration(s) release in the CSS, the UE may determine which SPS configuration(s) is released based on the index for the SPS configuration (e.g., configured by the gNB).

Additionally or alternatively, if the UE detects, in the CSS associated with the CORESET #0, the DCI format 1_0 for the SPS configuration(s) release, the UE may release all the SPS configuration(s) (e.g., all the SPS configuration(s)). In yet another example, if the UE detects, in the CSS associated with the CORESET #0, the DCI format 1_0 for the SPS configuration(s) release, the UE may release a specific configuration(s) (e.g., a specific SPS configuration(s)) and/or a default configuration(s) (e.g., a default SPS configuration(s)). For example, if the UE detects, in the CSS associated with the CORESET #0, the DCI format 1_0 for the SPS configuration(s) release, the UE may release a SPS configuration with a predetermined index (e.g., a SPS configuration with index "0" (e.g., as the specific SPS configuration(s) and/or the default SPS configuration(s))). Additionally or alternatively, if the UE detects, in the CSS associated with the CORESET #0, the DCI format 1_0 for the SPS configuration(s) release, the UE may release a SPS configuration with the lowest index (e.g., the smallest index). For example, in a case that the SPS configuration with the index "1", the SPS configuration with the index "3", and the SPS configuration with the index "5" are configured, and if the UE detects, in the CSS associated with the CORESET #0, the DCI format 1_0 for the SPS configuration(s) release, the UE may release the SPS configuration with "1". Additionally or alternatively, if the UE detects, in the CSS associated with the CORESET #0, the DCI format 1_0 for the SPS configuration(s) release, the UE may release a SPS configuration with the highest index (e.g., the largest index). For example, in a case that the SPS configuration with the index "1", the SPS configuration with the index "3", and the SPS configuration with the index "5" are configured, and if the UE detects, in the CSS associated with the CORESET #0, the DCI format 1_0 for the SPS configuration(s) release, the UE may release the SPS configuration with "5". For instance, for the detection of the DCI format 1_0 for the SPS configuration(s) release in the CSS associated with the CORESET #0, the UE may determine which SPS configuration(s) is released based on the index for the SPS configuration (e.g., configured by the gNB).

Examples of PDCCH validation for DL SPS and UL configured grant Type 2 are described here. A UE may validate, for scheduling activation or scheduling release, a DL SPS assignment PDCCH or configured UL grant Type 2 PDCCH if the CRC of a corresponding DCI format (e.g., DCI format 0_0, DCI format 0_1, DCI format 0_2, DCI format 1_0, DCI format 1_1 and/or DCI format 0_2) is scrambled with a CS-RNTI provided by cs-RNTI, and the new data indicator (NDI) field for the enabled transport block is set to '0'. Validation of the DCI format (e.g., the DCI format 0_0, the DCI format 0_1, the DCI format 0_2, the DCI format 1_0, the DCI format 1_1 and/or the DCI format 0_2) is achieved if all fields for the DCI format are set according to a predefined rule (e.g., special field(s) in the DCI format may be set to a specific value(s) for DL SPS and UL grant Type 2 scheduling activation PDCCH validation and/or scheduling release PDCCH validation). If validation is achieved, the UE considers the information in the DCI format as a valid activation or valid release of DL SPS or configured UL grant Type 2. If validation is not achieved, the UE discards all the information in the DCI format. For example, if a HARQ process number field in the DCI format is set to all '0's and/or a Redundancy version (RV) field in the DCI format is set to '00', the UE may consider the information in the DCI format as a valid activation of DL SPS or configured UL grant Type 2. In a case that multiple configurations (multiple SPS configurations and/or CG configurations) are supported, configuration index field in the DCI format may be used to indicate which SPS configuration(s) and/or CG configuration(s) are activated. For example, if HARQ process number field in the DCI format is set to all '0's and/or Redundancy version field in the DCI format is set to '00' and/or Modulation and coding scheme field in the DCI format is set to all '1' and/or Frequency domain resource assignment is set to all '1', the UE may consider the information in the DCI format as a valid release of DL SPS or configured UL grant Type 2. In a case that multiple configurations (multiple SPS configurations and/or CG configurations) are supported, a configuration index field in the DCI format may be used to indicate which SPS configuration(s) and/or CG configuration(s) are released/deactivated.

As mentioned above, an HPN field in the DCI format may be reused to indicate which SPS configuration(s) and/or CG configuration(s) are activated and/or released/deactivated. In this case, HPN field in the DCI format may not be used for DL SPS and UL grant Type 2 scheduling activation PDCCH validation and/or scheduling release PDCCH validation. In some examples, only a RV field may be used for DL SPS and UL grant Type 2 scheduling activation PDCCH validation. An example of special field(s) for DL SPS and UL grant Type 2 scheduling activation PDCCH validation is shown in Table 9. An example of special fields for DL SPS and UL grant Type 2 scheduling release PDCCH validation is shown in Table 10.

TABLE 9

|  | DCI format 0_0/0_1/0_2 | DCI format 1_0/1_2 | DCI format 1_1/1_2 |
| --- | --- | --- | --- |
| HARQ process number | to indicate which configuration is to be activated | to indicate which configuration is to be activated | to indicate which configuration is to be activated |
| Redundancy version | set to '00' | set to '00' | For the enabled transport block: set to '00' |

TABLE 10

|  | DCI format 0_0/0_1/0_2 | DCI format 1_0/1_2 | DCI format 1_1/1_2 |
| --- | --- | --- | --- |
| HARQ process number | to indicate which configuration(s) is/are to be released | to indicate which configuration(s) is/are to be released | to indicate which configuration(s) is/are to be released |
| Redundancy version | set to '00' | set to '00' | For the enabled transport block: set to '00' |
| Modulation and coding scheme | set to all '1's | set to all '1's | For the enabled transport block: set to all '1's |
| Frequency domain resource assignment | set to all '1's | set to all '1's | For the enabled transport block: set to all '1's |

In some examples, only using 2-bit RV field for DL SPS and UL grant Type 2 scheduling activation PDCCH validation may not be reliable. In some examples, a new DCI field (e.g., validation) may be introduced for DL SPS and UL grant Type 2 scheduling activation PDCCH validation and/or scheduling release PDCCH validation. The number of bits in the DCI field (e.g., validation) may be configurable or fixed. The number of bits in the DCI field (e.g., validation) may be 1, 2, 3 or 4. For DL SPS and UL grant Type 2 scheduling activation PDCCH validation and/or scheduling release PDCCH validation, the DCI field (e.g., validation) may be set all '0's or all '1's.

In some examples, an existing field(s) or partial bit(s) of existing field(s) in a DCI format (e.g., DCI format 0_0, DCI format 0_1, DCI format 0_2, DCI format 1_0, DCI format 1_1 and/or DCI format 0_2) may be reused for DL SPS and UL grant Type 2 scheduling activation PDCCH validation and/or scheduling release PDCCH validation. The existing field(s) may be Antenna port(s), Transmission configuration indication, Rate matching indicator, SRS request, PRB bundling size indicator, Carrier indicator, CSI request, ZP CSI-RS triggering, Beta offset indicator, SRS resource indicator, Repetition factor, Priority indication, Frequency domain resource assignment, Time domain resource assignment, Frequency hopping flag, TPC command, Padding bits, UL/SUL indicator, Precoding information and number of layers, CBG transmission information (CBGTI), PTRS-DMRS association, DMRS sequence initialization, UL-SCH indicator, CBG flushing out information (CBGFI) and/or any other field(s) in the DCI format (e.g., DCI format 0_0, DCI format 0_1, DCI format 0_2, DCI format 1_0, DCI format 1_1 and/or DCI format 0_2). For DL SPS and UL grant Type 2 scheduling activation PDCCH validation and/or scheduling release PDCCH validation, the reused DCI field(s) or reused bit(s) of the DCI field(s) may be set all '0's or all '1's.

In some examples where a new UL DCI format (e.g., DCI format 0_2) is introduced and/or utilized, a UE may detect the new UL DCI format(s) for different purposes. For example, a UE may detect the new UL DCI format for dynamic grant (e.g., DCI format 0_2 with CRC scrambled by C-RNTI). Additionally or alternatively, a UE may detect the new UL DCI format for activation and/or release of configured grant Type 2 (e.g., DCI format 0_2 with CRC scrambled by CS-RNTI and NDI=0). Additionally or alternatively, a UE may detect the new UL DCI format for retransmission of configured grant (e.g., DCI format 0_2 with CRC scrambled by CS-RNTI and NDI=1). A new UL DCI format (e.g., DCI format 0_2) with CRC scrambled by CS-RNTI and a new UL DCI format (e.g., DCI format 0_2) with CRC scrambled by C-RNTI may have the same total DCI size.

For the PUSCH transmission corresponding to a configured grant (e.g., CG Type 2 activated by DCI format 0_2), the parameters applied for the transmission may be provided by configuredGrantConfig except for dataScramblingIdentityPUSCH, txConfig, codebookSubset, maxRank, scaling of UCI-OnPUSCH, which may be provided by puschConfig. If the UE is provided with transformPrecoder in configuredGrantConfig, the UE may apply the higher layer parameter tp-pi2BPSK, if provided in pusch-Config, according to the procedure for the PUSCH transmission corresponding to a configured grant. If a time domain resource allocation (TDRA) table is RRC configured for DCI format 0_2 (e.g., PUSCH-TimeDomainResourceAllocationList-ForDCIformat0_2 in pusch-Config), the TDRA table may be also applied for the CG Type 2 activated by DCI format 0_2.

Retransmission of the PUSCH scheduled by a new UL DCI format (e.g., DCI format 0_2) with CRC scrambled by CS-RNTI with NDI=1 may follow the same higher layer configuration defined for dynamic PUSCH transmission associated with the new UL DCI format (e.g., DCI format 0_2). In some examples, for the PUSCH retransmission scheduled by a PDCCH (e.g., DCI format 0_2) with CRC scrambled by CS-RNTI with NDI=1, the parameters in pusch-Config may be applied for the PUSCH transmission except for a configured grant specific P0 (e.g., p0-NominalWithoutGrant in PUSCH-PowerControl information element, and/or p0-PUSCH-Alpha, powerControlLoopToUse, mcs-Table, and/or mcs-TableTransformPrecoder in ConfiguredGrantConfig, and/or pathlossReferenceIndex in rrc-ConfiguredUplinkGrant).

Figure 7:
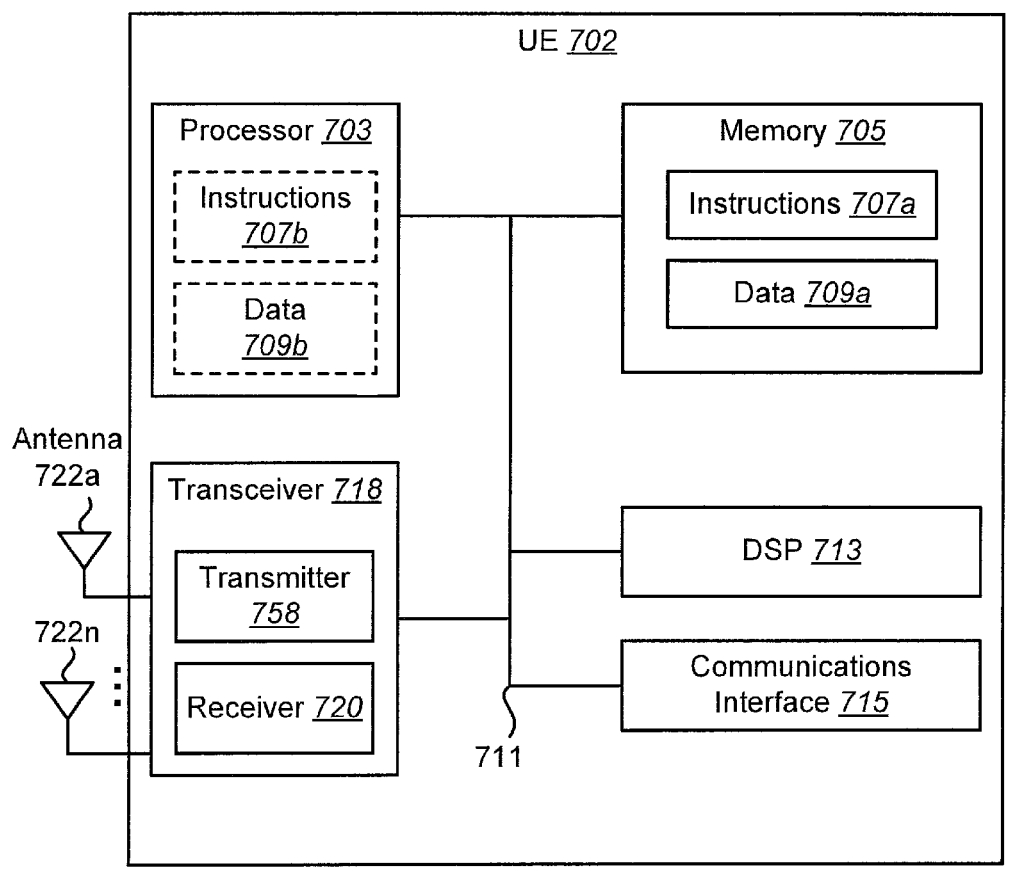
FIG. 7 illustrates various components that may be utilized in a UE.

FIG. 7 illustrates various components that may be utilized in a UE 702. The UE 702 described in connection with FIG. 7 may be implemented in accordance with the UE 102 described in connection with FIG. 1. The UE 702 includes a processor 703 that controls operation of the UE 702. The processor 703 may also be referred to as a central processing unit (CPU). Memory 705, which may include read-only memory (ROM), random access memory (RAM), a combination of the two or any type of device that may store information, provides instructions 707a and data 709a to the processor 703. A portion of the memory 705 may also include non-volatile random access memory (NVRAM). Instructions 707b and data 709b may also reside in the processor 703. Instructions 707b and/or data 709b loaded into the processor 703 may also include instructions 707a and/or data 709a from memory 705 that were loaded for execution or processing by the processor 703. The instructions 707b may be executed by the processor 703 to implement the methods described herein.

The UE 702 may also include a housing that contains one or more transmitters 758 and one or more receivers 720 to allow transmission and reception of data. The transmitter(s) 758 and receiver(s) 720 may be combined into one or more transceivers 718. One or more antennas 722a-n are attached to the housing and electrically coupled to the transceiver 718.

The various components of the UE 702 are coupled together by a bus system 711, which may include a power bus, a control signal bus and a status signal bus, in addition to a data bus. However, for the sake of clarity, the various buses are illustrated in FIG. 7 as the bus system 711. The UE 702 may also include a digital signal processor (DSP) 713 for use in processing signals. The UE 702 may also include a communications interface 715 that provides user access to the functions of the UE 702. The UE 702 illustrated in FIG. 7 is a functional block diagram rather than a listing of specific components.

Figure 8:
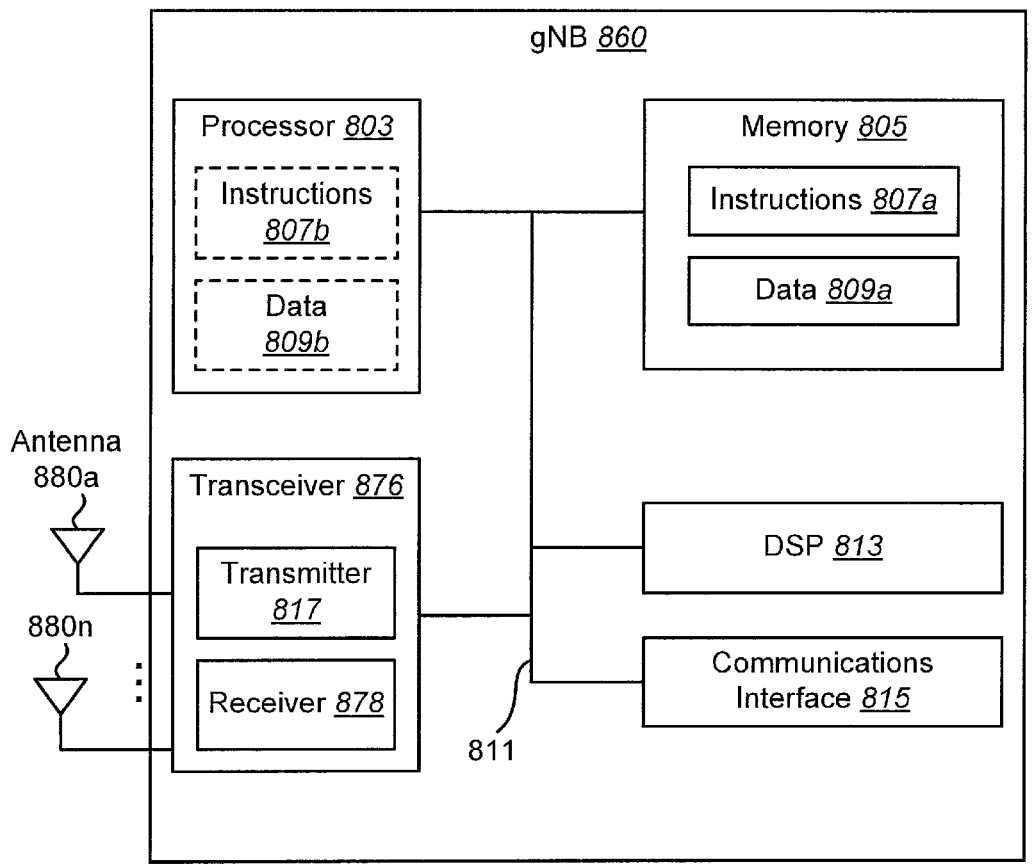
FIG. 8 illustrates various components that may be utilized in a gNB.

FIG. 8 illustrates various components that may be utilized in a gNB 860. The gNB 860 described in connection with FIG. 8 may be implemented in accordance with the gNB 160 described in connection with FIG. 1. The gNB 860 includes a processor 803 that controls operation of the gNB 860. The processor 803 may also be referred to as a central processing unit (CPU). Memory 805, which may include read-only memory (ROM), random access memory (RAM), a combination of the two or any type of device that may store information, provides instructions 807a and data 809a to the processor 803. A portion of the memory 805 may also include non-volatile random access memory (NVRAM). Instructions 807b and data 809b may also reside in the processor 803. Instructions 807b and/or data 809b loaded into the processor 803 may also include instructions 807a and/or data 809a from memory 805 that were loaded for execution or processing by the processor 803. The instructions 807b may be executed by the processor 803 to implement the methods described herein.

The gNB 860 may also include a housing that contains one or more transmitters 817 and one or more receivers 878 to allow transmission and reception of data. The transmitter(s) 817 and receiver(s) 878 may be combined into one or more transceivers 876. One or more antennas 880a-n are attached to the housing and electrically coupled to the transceiver 876.

The various components of the gNB 860 are coupled together by a bus system 811, which may include a power bus, a control signal bus and a status signal bus, in addition to a data bus. However, for the sake of clarity, the various buses are illustrated in FIG. 8 as the bus system 811. The gNB 860 may also include a digital signal processor (DSP) 813 for use in processing signals. The gNB 860 may also include a communications interface 815 that provides user access to the functions of the gNB 860. The gNB 860 illustrated in FIG. 8 is a functional block diagram rather than a listing of specific components.

Figure 9:
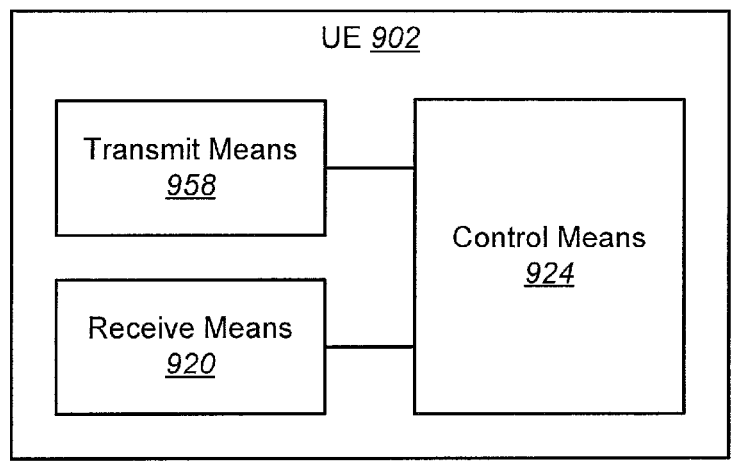
FIG. 9 is a block diagram illustrating one implementation of a UE in which one or more of the systems and/or methods described herein may be implemented.

FIG. 9 is a block diagram illustrating one implementation of a UE 902 in which one or more of the systems and/or methods described herein may be implemented. The UE 902 includes transmit means 958, receive means 920 and control means 924. The transmit means 958, receive means 920 and control means 924 may be configured to perform one or more of the functions described above. FIG. 7 above illustrates one example of a concrete apparatus structure of FIG. 9. Other various structures may be implemented to realize one or more of the functions described herein. For example, a DSP may be realized by software.

Figure 10:
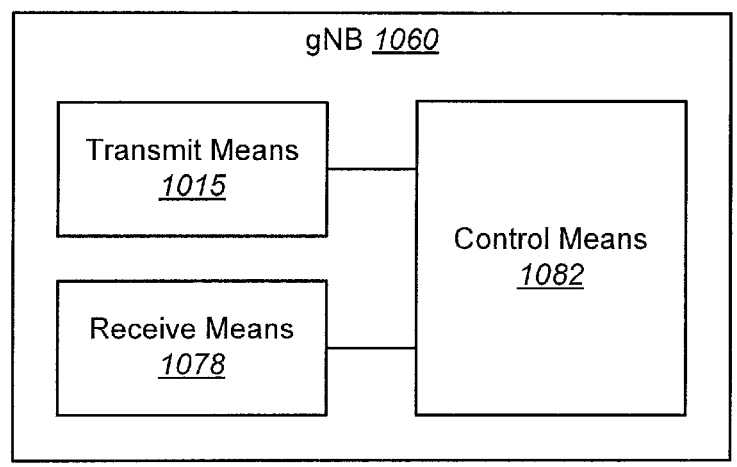
FIG. 10 is a block diagram illustrating one implementation of a gNB in which one or more of the systems and/or methods described herein may be implemented.

FIG. 10 is a block diagram illustrating one implementation of a gNB 1060 in which one or more of the systems and/or methods described herein may be implemented. The gNB 1060 includes transmit means 1017, receive means 1078 and control means 1082. The transmit means 1017, receive means 1078 and control means 1082 may be configured to perform one or more of the functions described above. FIG. 8 above illustrates one example of a concrete apparatus structure of FIG. 10. Other various structures may be implemented to realize one or more of the functions described herein. For example, a DSP may be realized by software.

Figure 11:
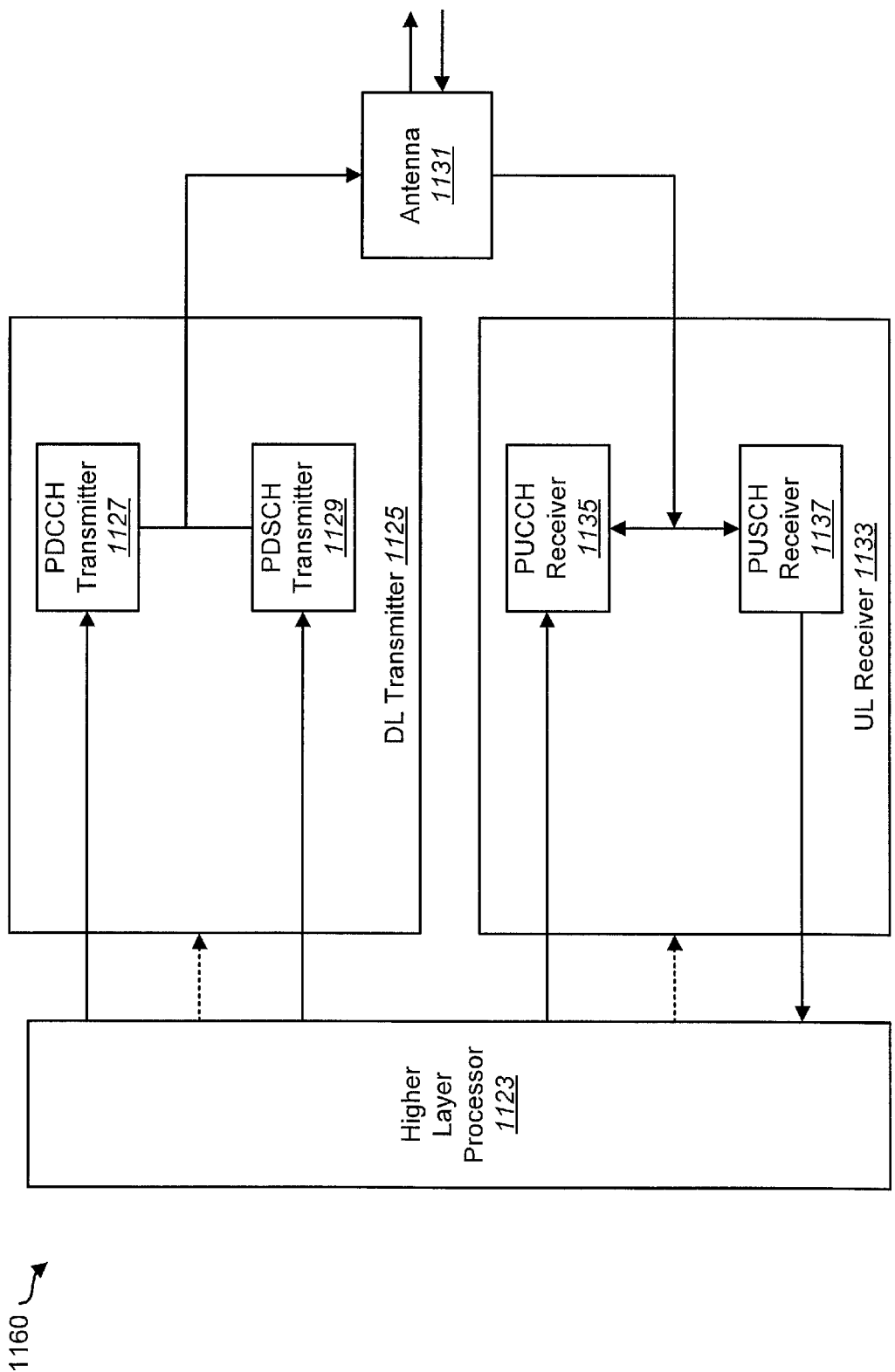
FIG. 11 is a block diagram illustrating one implementation of a gNB.

FIG. 11 is a block diagram illustrating one implementation of a gNB 1160. The gNB 1160 may be an example of the gNB 160 described in connection with FIG. 1. The gNB 1160 may include a higher layer processor 1123, a DL transmitter 1125, a UL receiver 1133, and one or more antenna 1131. The DL transmitter 1125 may include a PDCCH transmitter 1127 and a PDSCH transmitter 1129. The UL receiver 1133 may include a PUCCH receiver 1135 and a PUSCH receiver 1137.

The higher layer processor 1123 may manage physical layer's behaviors (the DL transmitter's and the UL receiver's behaviors) and provide higher layer parameters to the physical layer. The higher layer processor 1123 may obtain transport blocks from the physical layer. The higher layer processor 1123 may send/acquire higher layer messages such as an RRC message and MAC message to/from a UE's higher layer. The higher layer processor 1123 may provide the PDSCH transmitter transport blocks and provide the PDCCH transmitter transmission parameters related to the transport blocks.

The DL transmitter 1125 may multiplex downlink physical channels and downlink physical signals (including reservation signal) and transmit them via transmission antennas 1131. The UL receiver 1133 may receive multiplexed uplink physical channels and uplink physical signals via receiving antennas 1131 and de-multiplex them. The PUCCH receiver 1135 may provide the higher layer processor 1123 UCI. The PUSCH receiver 1137 may provide the higher layer processor 1123 received transport blocks.

Figure 12:
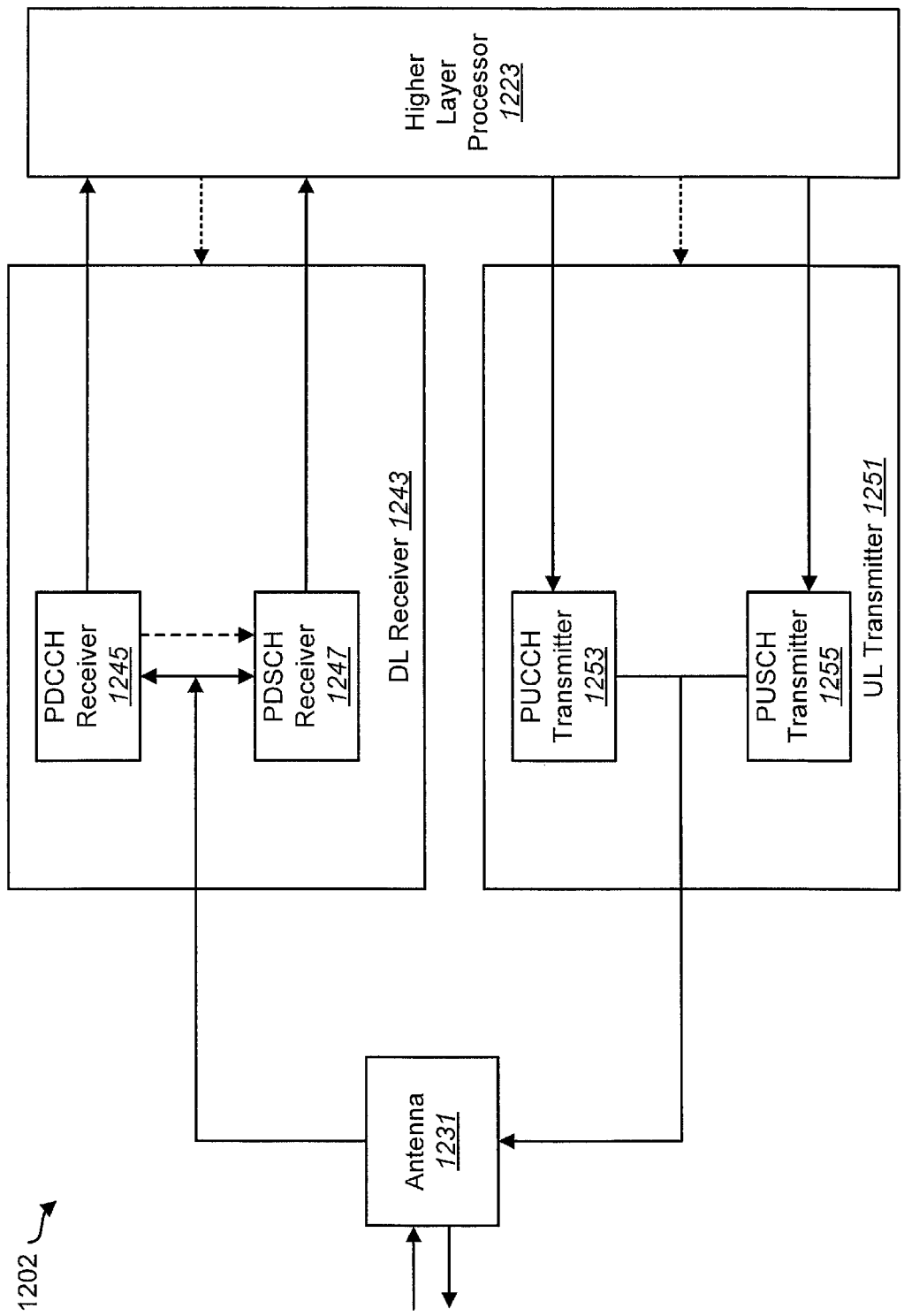
FIG. 12 is a block diagram illustrating one implementation of a UE.

FIG. 12 is a block diagram illustrating one implementation of a UE 1202. The UE 1202 may be an example of the UE 102 described in connection with FIG. 1. The UE 1202 may include a higher layer processor 1223, a UL transmitter 1251, a DL receiver 1243, and one or more antenna 1231. The UL transmitter 1251 may include a PUCCH transmitter 1253 and a PUSCH transmitter 1255. The DL receiver 1243 may include a PDCCH receiver 1245 and a PDSCH receiver 1247.

The higher layer processor 1223 may manage a physical layer's behaviors (the UL transmitter's and the DL receiver's behaviors) and provide higher layer parameters to the physical layer. The higher layer processor 1223 may obtain transport blocks from the physical layer. The higher layer processor 1223 may send/acquire higher layer messages such as an RRC message and MAC message to/from a UE's higher layer. The higher layer processor 1223 may provide the PUSCH transmitter transport blocks and provide the PUCCH transmitter 1253 UCI.

The DL receiver 1243 may receive multiplexed downlink physical channels and downlink physical signals via receiving antennas 1231 and de-multiplex them. The PDCCH receiver 1245 may provide the higher layer processor 1223 DCI. The PDSCH receiver 1247 may provide the higher layer processor 1223 received transport blocks.

As described herein, some methods for the DL and/or UL transmissions may be applied (e.g., specified). In some examples, the combination of one or more of the methods or functions thereof described herein may be applied for the DL and/or UL transmission. The combination of the one or more of the methods or functions thereof described herein may not be precluded in the described systems and methods.

It should be noted that names of physical channels described herein are examples. The other names such as "NRPDCCH, NRPDSCH, NRPUCCH and NRPUSCH," "new Generation-(G)PDCCH, GPDSCH, GPUCCH and GPUSCH" or the like can be used.

The term "computer-readable medium" refers to any available medium that can be accessed by a computer or a processor. The term "computer-readable medium," as used herein, may denote a computer- and/or processor-readable medium that is non-transitory and tangible. By way of example and not limitation, a computer-readable or processor-readable medium may include RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein includes one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods and apparatus described herein without departing from the scope of the claims.

A program running on the gNB 160 or the UE 102 according to the described systems and methods is a program (a program for causing a computer to operate) that controls a CPU and the like in such a manner as to realize the function according to the described systems and methods. Then, the information that is handled in these apparatuses is temporarily stored in a RAM while being processed. Thereafter, the information is stored in various ROMs or HDDs, and whenever necessary, is read by the CPU to be modified or written. As a recording medium on which the program is stored, among a semiconductor (for example, a ROM, a nonvolatile memory card, and the like), an optical storage medium (for example, a DVD, a MO, a MD, a CD, a BD and the like), a magnetic storage medium (for example, a magnetic tape, a flexible disk and the like) and the like, any one may be possible. Furthermore, in some cases, the function according to the described systems and methods described herein is realized by running the loaded program, and in addition, the function according to the described systems and methods is realized in conjunction with an operating system or other application programs, based on an instruction from the program.

Furthermore, in a case where the programs are available on the market, the program stored on a portable recording medium can be distributed or the program can be transmitted to a server computer that connects through a network such as the Internet. In this case, a storage device in the server computer also is included. Furthermore, some or all of the gNB 160 and the UE 102 according to the systems and methods described herein may be realized as an LSI that is an integrated circuit. Each functional block of the gNB 160 and the UE 102 may be individually built into a chip, and some or all functional blocks may be integrated into a chip. Furthermore, a technique of the integrated circuit is not limited to the LSI, and an integrated circuit for the functional block may be realized with a dedicated circuit or a general-purpose processor. Furthermore, if with advances in a semiconductor technology, a technology of an integrated circuit that substitutes for the LSI appears, it is also possible to use an integrated circuit to which the technology applies.

Moreover, each functional block or various features of the base station device and the terminal device used in each of the aforementioned embodiments may be implemented or executed by a circuitry, which is typically an integrated circuit or a plurality of integrated circuits. The circuitry designed to execute the functions described in the present specification may include a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller, or a state machine. The general-purpose processor or each circuit described herein may be configured by a digital circuit or may be configured by an analog circuit. Further, when a technology of making into an integrated circuit superseding integrated circuits at the present time appears due to advancement of a semiconductor technology, the integrated circuit by this technology is also able to be used.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

The invention claimed is:

1. A user equipment (UE) that communicates with a base station, the UE comprising:
   receiving circuitry configured to receive a radio resource control (RRC) message comprising first information used for configuring more than one configured grant (CG) physical uplink shared channel (PUSCH) configuration, the more than one CG PUSCH configuration comprising respective configuration indices, wherein
      the receiving circuitry is configured to receive an RRC configuration for configuring second information indicating a list for CG PUSCH configuration release, and
      the receiving circuity is configured to detect a physical downlink control channel (PDCCH) for a downlink control information (DCI) format with cyclic redundancy check (CRC) scrambled by a first radio network identifier (RNTI), the DCI format being used for an activation or deactivation of at least one of the more than one CG PUSCH configuration;
   processing circuitry configured to determine whether DCI based on the DCI format is first DCI comprising third information or second DCI comprising fourth information, the third information being used for indicating the activation of the at least one of the more than one CG PUSCH configuration, the fourth information being used for indicating release of the at least one of the more than one CG PUSCH configuration; and
   transmitting circuitry configured to perform, based on a detection of the first DCI, an uplink data transmission on CG PUSCH based on the at least one of the more than one CG PUSCH configuration, wherein
   the processing circuitry is configured to release the at least one of the more than one CG PUSCH configuration, based on a detection of the second DCI, the at least one of the more than one CG PUSCH being determined based on the second DCI and the second information, indices of the released CG PUSCH configuration(s) in the list being given by the second DCI,
   the third information comprises Redundancy Version field set to all "0" and HARQ process number field which are used to indicate which CG PUSCH configuration(s) is/are activated, and
   the fourth information comprises Redundancy Version field set to all "0", Modulation and coding scheme field set to all "1", and HARQ process number field which are used to indicate which CG PUSCH configuration(s) is/are released.

2. A base station that communicates with a user equipment (UE), the base station comprising:
   transmitting circuitry configured to transmit a radio resource control (RRC) message comprising first information used for configuring more than one configured grant (CG) physical uplink shared channel (PUSCH) configuration, the more than one CG PUSCH configuration comprising respective configuration indices, wherein
      the transmitting circuitry is configured to transmit an RRC configuration for configuring second information indicating a list for CG PUSCH configuration release, and
      the transmitting circuity is configured to transmit a physical downlink control channel (PDCCH) for a downlink control information (DCI) format with cyclic redundancy check (CRC) scrambled by a first radio network identifier (RNTI), the DCI format being used for an activation or deactivation of at least one of the more than one CG PUSCH configuration;
   receiving circuitry configured to receive, after transmitting first DCI which is generated based on the DCI format and which comprises third information used for indicating the activation of the at least one of the more than one CG PUSCH configuration, an uplink data transmission on CG PUSCH based on the at least one of the more than one CG PUSCH configuration, wherein
   the transmitting circuity is configured to transmit second DCI which is generated based on the DCI format and which comprises fourth information used for indicating release of the at least one of the more than one CG PUSCH configuration, the fourth information is information that causes the UE to release the at least one of the more than one CG PUSCH configuration, the at least one of the more than one CG PUSCH being determined based on the second DCI and the second information, indices of the released CG PUSCH configuration(s) in the list being given by the second DCI, wherein
   the third information comprises Redundancy Version field set to all "0" and HARQ process number field which are used to indicate which CG PUSCH configuration(s) is/are activated, and
   the fourth information comprises Redundancy Version field set to all "0", Modulation and coding scheme field set to all "1", and HARQ process number field which are used to indicate which CG PUSCH configuration(s) is/are released.

3. A method performed by a user equipment (UE) that communicates with a base station, the method comprising:

receiving a radio resource control (RRC) message comprising first information used for configuring more than one configured grant (CG) physical uplink shared channel (PUSCH) configuration, the more than one CG PUSCH configuration comprising respective configuration indices, wherein receiving an RRC configuration for configuring second information indicating a list for CG PUSCH configuration release, and detecting a physical downlink control channel (PDCCH) for a downlink control information (DCI) format with cyclic redundancy check (CRC) scrambled by a first radio network identifier (RNTI), the DCI format being used for an activation or deactivation of at least one of the more than one CG PUSCH configuration;

determining whether DCI based on the DCI format is first DCI comprising third information or second DCI comprising fourth information, the third information being used for indicating the activation of the at least one of the more than one CG PUSCH configuration, the fourth information being used for indicating release of the at least one of the more than one CG PUSCH configuration;

performing, based on a detection of the first DCI, an uplink data transmission on CG PUSCH based on the at least one of the more than one CG PUSCH configuration; and releasing the at least one of the more than one CG PUSCH configuration, based on a detection of the second DCI, the at least one of the more than one CG PUSCH being determined based on the second DCI and the second information, indices of the released CG PUSCH configuration(s) in the list being given by the second DCI, wherein the third information comprises Redundancy Version field set to all "0" and HARQ process number field which are used to indicate which CG PUSCH configuration(s) is/are activated, and the fourth information comprises Redundancy Version field set to all "0", Modulation and coding scheme field set to all "1", and HARQ process number field which are used to indicate which CG PUSCH configuration(s) is/are released.

* * * * *